United States Patent [19]
Hoover et al.

[11] Patent Number: 5,560,005
[45] Date of Patent: Sep. 24, 1996

[54] METHODS AND SYSTEMS FOR OBJECT-BASED RELATIONAL DISTRIBUTED DATABASES

[75] Inventors: Michael K. Hoover, Roswell; Barrick H. Miller, Marietta; Kurt Schurenberg, Roswell; Richard A. Daigle, Atlanta, all of Ga.

[73] Assignee: ActaMed Corp., Atlanta, Ga.

[21] Appl. No.: 202,493

[22] Filed: Feb. 25, 1994

[51] Int. Cl.$^6$ .......................... G06F 17/30; G06F 15/163
[52] U.S. Cl. ..................... 395/600; 364/DIG. 1; 364/283.4; 364/228; 364/229.5; 364/284.4
[58] Field of Search ......................... 395/200.03, 200.09, 395/200.1, 600, 700

[56] References Cited

U.S. PATENT DOCUMENTS

| | | | |
|---|---|---|---|
| 5,093,911 | 3/1992 | Parks et al. | 395/600 |
| 5,136,716 | 8/1992 | Harvey et al. | 364/DIG. 1 |
| 5,317,742 | 5/1994 | Bapat | 395/700 |
| 5,408,619 | 4/1995 | Oran | 364/DIG. 1 |
| 5,426,747 | 6/1995 | Weinreb et al. | 395/600 X |

OTHER PUBLICATIONS

J. Joseph et al., "Object–Oriented Databases: Design and Implementation", *Proceedings of the IEEE*, vol. 79, No. 1, Jan. 1991, pp. 42–64.

B. Liskov et al., "Programming Methodology Group Memo 77: Distributed Object Management in Thor", Jun. 1993.

M. Day et al., "Programming Methodology Group Memo 79: References to Remote Mobile Objects in Thor", Dec. 1993.

F. Brazier et al., "Distributed Open Systems", Table of Contents only (IEEE Computer Society Press 1994).

A. Hurson et al., "Multidatabase Systems: An Advanced Solution for Global Information Sharing", Table of Contents only (IEEE Computer Society Press 1994).

A. Ananda et al., "Distributed Computing Systems: Concepts and Structures", Table of Contents only (IEEE Computer Society Press 1991).

E. Nahouraii et al., "Object–Oriented Databases", Table of Contents only (IEEE Computer Society Press 1991).

T. Casavant et al., "Readings in Distributed Computing Systems", Table of Contents only (IEEE Computer Society Press 1994).

P. Sinha et al., "The Architectural Overview of the Galaxy Distributed Operating System" (published in T. Casavant et al., Readings in Distributed Computing Systems (IEEE Comp. Soc. Press 1994).

M. Özsu et al., "Distributed Data Management: Unsolved Problems and New Issues" (published in T. Casavant et al., Readings in Distributed Computing Systems (IEEE Comp. Soc. Press 1994).

X. Jia et al., "Highly Concurrent Directory Management in the Galaxy Distributed System", *Proc. 10th Int'l Conf. Distributed Computing Systems*, IEEE Computer Society Press, 1990, pp. 416–423.

(List continued on next page.)

*Primary Examiner*—Thomas M. Heckler
*Attorney, Agent, or Firm*—Jones & Askew

[57] ABSTRACT

An object-based relational distributed database system and associated methods of operation that transforms data stored in a plurality of remote, heterogeneous user databases into a homogeneous data model is disclosed. Data stored in distributed, heterogeneous user database structures is homogenized by mapping into object attributes of predetermined instances of objects forming to a conceptual model that relates the various heterogeneous databases. The object attributes are stored in remote databases at client sites, which can be separate computer systems from the heterogeneous user databases or separate processes running on a computer system that maintains the heterogeneous user databases. The system stores location information and status information relating to the homogenized data in a centralized object broker for object management, thereby facilitating location and retrieval of data items from one or more of the remote, heterogeneous user databases.

85 Claims, 32 Drawing Sheets

OTHER PUBLICATIONS

D. Cheriton et al., "Decentralizing a Global Naming Service for Improved Performance and Fault Tolerance", *ACM Trans. Computer Systems,* vol. 7, No. 2, May 1989, pp. 147–183.

Videotape, Barbara Liskov, "Thor: An Object–Oriented Database System", The Distinguished Lecture Series VII (Nov. 29, 1993).

MAP TABLE 120

| OBJECT IDENTIFIER (OBJID) | TABLE_NAME | STATUS | LOCATION |
|---|---|---|---|
| 0011 | OAT1 | Date n | RDB1 |
| 0011 | OAT2 | Date n | RDB1 |
| 0011 | OAT2 | Date n+1 | RDB3 |
| 0012 | OAT4 | Date n+3 | RDB2 |
| 0012 | OAT3 | Date n+1 | RDB1 |
| 0012 | OAT3 | Date n+1 | RDB4 |
| 0015 | OAT2 | Date n | RDB2 |
| 0017 | OAT3 | Date n+3 | RDB3 |
| 0017 | OAT3 | Date n+3 | RDB4 |
| ... | ... | ... | ... |

*FIG. 7*

OBJECT INDEX TABLES

PERSON_IDX TABLE — 130a

| first_name | last_name | person (OBJID) | phone | ssn | birth_date | address_1 |
|---|---|---|---|---|---|---|
| ~ | ~ | ~ | ~ | ~ | ~ | ~ |
| ~ | ~ | ~ | ~ | ~ | ~ | ~ |
| John | Doe | 0012 | 555-5555 | 123-45-6789 | 7/24/67 | 123 Cherry St. |
| ~ | ~ | ~ | ~ | ~ | ~ | ~ |

EMPLOYER_IDX TABLE — 130b

| employer (OBJID) | Name | address_1 |
|---|---|---|
| ~ | ~ | ~ |
| ~ | ~ | ~ |
| 7351 | Acme Metals | 456 Peach St. |
| ~ | ~ | ~ |

EMPLOYEE_IDX TABLE — 130c

| employee (OBJID) | employer (OBJID) | person (OBJID) |
|---|---|---|
| ~ | ~ | ~ |
| ~ | ~ | ~ |
| 1456 | 7351 | 0012 |
| ~ | ~ | ~ |

VISIT_IDX TABLE — 130d

| person (OBJID) | provider (OBJID) | visit (OBJID) | admit_date |
|---|---|---|---|
| 0012 | 91011 | 111213 | 10/12/93 |
| 0012 | 91015 | 111315 | 11/9/93 |
| ~ | ~ | ~ | ~ |
| ~ | ~ | ~ | ~ |

FIG. 8

MAPPING OF DATA ITEMS FROM HETEROGENEOUS MODEL TO
HOMOGENEOUS MODEL

| Field Name/ Description | Field Name in Customer DB | Field Name in Remote DB |
|---|---|---|
| Patient's name | PAT1-NAME | person.first_name<br>person.middle_name<br>person.last_name |
| Patient's address | P-PAT-ADDRESS-1<br>P-PAT-ADDRESS-2<br>P-PAT-CITY-ST | person.address_1<br>person.address_2<br>person.city<br>person.state |
| Length of residence | P-PAT-CO-LOR | — |
| Date of admission | PATI-ADMIT-DATE | visit.admit_date |
| Discharge time | PATI-DISCHG-TIME | visit.discharge_time |
| Reason for visit | PATI-DIAG1 | visit.principal_diagnosis |
| Attending physician id | PATI-ATT-PHYS-ID | physician.other_id |
| Responsible person | P-RESP-NAME | person.first_name<br>person.last_name<br>person.middle_name |
| Employment status | P-PAT-EMPLOYER-NAME | employer.name |

*FIG. 17*

FIG. 18A

PERSON
PATIENT

| Row | Offset | Length | Table | Column-name | Key | Conjunct | Conjunct Table | Conjunct Row | Conjunct Column | Function In | Function Out | Default |
|---|---|---|---|---|---|---|---|---|---|---|---|---|
| 0 | 1034 | 24 | PERSON | last_name | 3 | 0 | n/a | n/a | n/a | subset(0) | none | none |
| 0 | 1034 | 24 | PERSON | first_name | 3 | 0 | n/a | n/a | n/a | subset(1) | none | none |
| 0 | 1034 | 24 | PERSON | middle_name | 0 | 0 | n/a | n/a | n/a | subset(2) | none | none |
| 0 | 1058 | 24 | PERSON | address_1 | 0 | 0 | n/a | n/a | n/a | none | none | none |
| 0 | 1082 | 24 | PERSON | address_2 | 0 | 0 | n/a | n/a | n/a | none | none | none |
| 0 | 1106 | 16 | PERSON | city | 0 | 0 | n/a | n/a | n/a | none | none | none |
| 0 | 1122 | 2 | PERSON | state | 0 | 0 | n/a | n/a | n/a | none | none | none |
| 0 | 1160 | 1 | PERSON | sex | 0 | 0 | n/a | n/a | n/a | none | none | none |
| 0 | 1142 | 9 | PERSON | zip | 0 | 0 | n/a | n/a | n/a | none | none | none |
| 0 | 1124 | 18 | PERSON | country | 0 | 0 | n/a | n/a | n/a | none | none | none |
| 0 | 1175 | 10 | PERSON | phone | 0 | 0 | n/a | n/a | n/a | none | none | none |
| 0 | 1151 | 9 | PERSON | ssn | 3 | 0 | n/a | n/a | n/a | none | none | none |
| 0 | 1162 | 8 | PERSON | birth_date | 0 | 0 | n/a | n/a | n/a | none | none | none |
| 0 | 1161 | 1 | PERSON | race | 0 | 0 | n/a | n/a | n/a | none | none | none |
| 0 | 2863 | 1 | PERSON | marital_sta | 0 | 0 | n/a | n/a | n/a | none | none | none |

FIG. 18B

PERSON
RESPONSIBLE  PERSON

| Row | Offset | Length | Table | Column-name | Key | Conjunct | Conjunct Table | Conjunct Row | Conjunct Column | Function In | Function Out | Default |
|---|---|---|---|---|---|---|---|---|---|---|---|---|
| 1 | 1547 | 24 | PERSON | last_name | 3 | 0 | n/a | n/a | n/a | subset(0) | none | none |
| 1 | 1547 | 24 | PERSON | first_name | 3 | 0 | n/a | n/a | n/a | subset(1) | none | none |
| 1 | 1547 | 24 | PERSON | middle_name | 0 | 0 | n/a | n/a | n/a | subset(2) | none | none |
| 1 | 1571 | 24 | PERSON | address_1 | 0 | 0 | n/a | n/a | n/a | none | none | none |
| 1 | 1595 | 24 | PERSON | address_2 | 0 | 0 | n/a | n/a | n/a | none | none | none |
| 1 | 1619 | 16 | PERSON | city | 0 | 0 | n/a | n/a | n/a | none | none | none |
| 1 | 1635 | 2 | PERSON | state | 0 | 0 | n/a | n/a | n/a | none | none | none |
| 1 | 1673 | 1 | PERSON | sex | 0 | 0 | n/a | n/a | n/a | none | none | none |
| 1 | 1655 | 9 | PERSON | zip | 0 | 0 | n/a | n/a | n/a | none | none | none |
| 1 | 1637 | 18 | PERSON | country | 0 | 0 | n/a | n/a | n/a | none | none | none |
| 1 | 1688 | 10 | PERSON | phone | 0 | 0 | n/a | n/a | n/a | none | none | none |
| 1 | 1664 | 9 | PERSON | ssn | 3 | 0 | n/a | n/a | n/a | none | none | none |

FIG. 18C

PERSON_CONTACT
NICE (Notify in Case of Emergency)

| Row | Off-set | Length | Table | Column-name | Key | Con-junct | Con-junct Table | Con-junct Row | Con-junct Column | Func-tion In | Func-tion Out | De-fault |
|---|---|---|---|---|---|---|---|---|---|---|---|---|
| 5 | 3432 | 2 | PERSON_CONTACT | relationship | 3 | 0 | n/a | n/a | n/a | none | none | none |
| 5 | 1034 | 24 | PERSON_CONTACT | person | 3 | 1 | person | 1 | last_name | subset(0) | none | none |
| 5 | 3434 | 24 | PERSON_CONTACT | contact_person | 3 | 2 | person | 3 | last_name | subset(0) | none | none |
| 5 | 8532 | 1 | PERSON_CONTACT | emerg_guaran | 3 | 0 | n/a | n/a | n/a | none | none | e |

NOK (Next of Kin)

| Row | Off-set | Length | Table | Column-name | Key | Con-junct | Con-junct Table | Con-junct Row | Con-junct Column | Func-tion In | Func-tion Out | De-fault |
|---|---|---|---|---|---|---|---|---|---|---|---|---|
| 6 | 3553 | 2 | PERSON_CONTACT | relationship | 3 | 0 | n/a | n/a | n/a | none | none | none |
| 6 | 1034 | 24 | PERSON_CONTACT | person | 3 | 1 | person | 0 | last_name | subset(0) | none | none |
| 6 | 3555 | 24 | PERSON_CONTACT | contact_person | 3 | 2 | person | 4 | last_name | subset(0) | none | none |
| 6 | 8532 | 1 | PERSON_CONTACT | emerg_guaran | 3 | 0 | n/a | n/a | n/a | none | none | e |

EMPLOYER
PATIENT

| Row | Off-set | Length | Table | Column-name | Key | Con-junct | Con-junct Table | Con-junct Row | Con-junct Column | Func-tion In | Func-tion Out | De-fault |
|---|---|---|---|---|---|---|---|---|---|---|---|---|
| 7 | 1223 | 24 | EMPLOYER | name | 3 | 0 | n/a | n/a | n/a | none | none | none |
| 7 | 1247 | 24 | EMPLOYER | address_1 | 0 | 0 | n/a | n/a | n/a | none | none | none |
| 7 | 1271 | 24 | EMPLOYER | address_2 | 0 | 0 | n/a | n/a | n/a | none | none | none |
| 7 | 1295 | 16 | EMPLOYER | city | 0 | 0 | n/a | n/a | n/a | none | none | none |
| 7 | 1311 | 2 | EMPLOYER | state | 0 | 0 | n/a | n/a | n/a | none | none | none |
| 7 | 1313 | 9 | EMPLOYER | zip | 0 | 0 | n/a | n/a | n/a | none | none | none |
| 7 | 1330 | 15 | EMPLOYER | employer_code | 0 | 0 | n/a | n/a | n/a | none | none | none |

300

PERSON PUT SPECIFICATION

| New State # | From State # | SSN Request | SSN DB Image | SSN Matching | Request Name | Last/first name Matching | Birth-date Request | Birth_Date DB Image |
|---|---|---|---|---|---|---|---|---|
| 1 | 1 | null | X | match | not null | match | null | x |
| 2 | 12 | not null | null | no match | not null | match | not null | not null |
| 3 | 14 | not null | not null | no match | not null | match | null | x |
| 4 | 16 | null | X | match | not null | match | not null | not null |
| 5 | 22 | not null | null | no match | not null | match | null | x |
| 6 | 24 | not null | not null | nomatch | not null | match | not null | not null |
| 7 | 7 | null | X | match | null | no match | X | x |
| 8 | 8 | not null | null | no match | null | no match | X | x |
| 9 | 9 | not null | not null | match | null | no match | X | x |
| 10 | 10 | not null | not null | no match | null | no match | X | x |
| 11 | 1 | null | X | match | not null | match | null | x |
| 12 | 2 | null | X | match | not null | match | null | x |
| 13 | 3 | not null | null | no match | not null | match | not null | null |
| 14 | 4 | not null | not null | match | not null | match | not null | not null |
| 15 | 5 | not null | not null | match | not null | match | not null | not null |
| 16 | 6 | not null | not null | no match | not null | match | not null | not null |
| 17 | 7 | null | X | match | not null | no match | X | x |
| 18 | 8 | not null | null | no match | not null | no match | X | x |
| 19 | 9 | not null | not null | match | not null | no match | X | x |
| 20 | 10 | not null | not null | no match | not null | no match | X | x |
| 21 | 11 | null | X | match | not null | match | not null | null |
| 22 | 12 | not null | null | no match | not null | match | not null | not null |
| 23 | 13 | not null | not null | match | not null | match | not null | not null |
| 24 | 14 | not null | not null | no match | not null | match | null | x |
| 25 | 15 | null | X | match | not null | match | not null | not null |
| 26 | 16 | null | X | match | not null | match | not null | not null |
| 27 | 17 | not null | null | no match | not null | match | not null | not null |
| 28 | 18 | not null | not null | match | not null | match | null | x |
| 29 | 19 | not null | not null | match | not null | match | null | x |
| 30 | 20 | not null | not null | no match | not null | match | not null | null |
| 31 | 21 | null | X | match | not null | match | not null | not null |
| 32 | 22 | not null | null | no match | not null | match | null | x |
| 33 | 23 | not null | not null | match | not null | match | not null | null |
| 34 | 24 | not null | not null | no match | not null | match | not null | not null |

FIG. 19A

→ match line     PERSON PUT SPECIFICATION (cont)

| New State # | Birth_Date Matching | Search yields >1 | Complete Record | Action | Comments |
|---|---|---|---|---|---|
| 1 | match | TRUE | undefined | error msg | must provide ssn or birth date |
| 2 | match | TRUE | undefined | sys err | found by last/fst nm & birth |
| 3 | match | TRUE | undefined | error msg | must provide birth date |
| 4 | match | TRUE | undefined | sys err | found by last/fst nm & birth |
| 5 | match | TRUE | undefined | error msg | must provide ssn or birth date |
| 6 | match | TRUE | undefined | sys err | found by last/fst nm & birth |
| 7 | X | FALSE | undefined | error msg | must provide ssn or name |
| 8 | X | FALSE | undefined | error msg | must provide name |
| 9 | X | FALSE | no match | update | found by ssn |
| 10 | X | FALSE | undefined | error msg | must provide name |
| 11 | match | FALSE | match | no action | found by last/first name |
| 12 | match | FALSE | no match | update | found by last/first name |
| 13 | no match | FALSE | undefined | add | not found - assume new person |
| 14 | match | FALSE | match | no action | found by ssn |
| 15 | match | FALSE | no match | update | found by ssn |
| 16 | no match | FALSE | undefined | add | not found - birth date |
| 17 | X | FALSE | undefined | add | not found |
| 18 | X | FALSE | undefined | add | not found |
| 19 | X | FALSE | no match | update | found by ssn |
| 20 | X | FALSE | undefined | add | not found |
| 21 | no match | FALSE | undefined | add | not found - assume new person |
| 22 | match | FALSE | no match | update | found by last/fst nm & birth |
| 23 | no match | FALSE | no match | update | found by ssn |
| 24 | match | FALSE | no match | add | found by last/first name |
| 25 | match | FALSE | match | no action | found by last/fst nm & birth |
| 26 | match | FALSE | no match | update | found by last/fst nm & birth |
| 27 | no match | FALSE | undefined | add | not found - birth date |
| 28 | match | FALSE | match | no action | found by ssn |
| 29 | match | FALSE | no match | update | found by ssn |
| 30 | no match | FALSE | no match | add | not found - assume new person |
| 31 | no match | FALSE | undefined | add | not found -birth date |
| 32 | match | FALSE | no match | add | found by last/first name |
| 33 | no match | FALSE | no match | update | found by ssn |
| 34 | match | FALSE | no match | update | found by last/fst nm & birth |

→ match line

```
                    ActaMed Corporation
File  Edit  Window  Help
```

Certification - Patient Demographics

| | prefix | first | middle | last | suffix |
|---|---|---|---|---|---|
| Name | Mr. | JAKE | MICHAEL | SIMON | |

Address: 1753 barrier parkway ne
appt. 372
Birth Date: 03/20/1975
Nickname: bucky
City/ St/ Zi: atlanta  GA  30278
Country: U.S.A.

Diabetic: N  Sex: M  Soc. Sec.: #30-55-9345  Phone: (404)972-2864
Height: 5 9  Marital: S  Smoker: N  Driver's Lic: 45-73-3665
Weight: 170  Medicare ID:  Medicaid ID:
Allergies: NONE
Mother's Name: susan  Father's Name: michael

| Insured | Referring Physician | Certification Info |
| Attending Physician | Facility | UR Firm |

| Send | | Pend | | | Exit |

Form View                                          NUM

FIG. 26

Scenario: John Doe appears for admission to hospital.

*Step 1.* Admissions clerk enters a SEARCH request to determine John Doe's object ID:

| search_PERSON(sec. parameters, name = John Doe, B-day = 7/24/67) | — 701

*Step 2.* Request transmitted to Object Broker, which consults the PERSON_IDX table to retrieve object ID associated with John Doe:

PERSON_IDX TABLE — 130a

| first_name | last_name | person (OBJID) | phone | ssn | birth_date | address_1 |
|---|---|---|---|---|---|---|
| ~ | ~ | ~ | ~ | ~ | ~ | ~ |
| ~ | ~ | ~ | ~ | ~ | ~ | ~ |
| John | Doe | 0012 | 555-5555 | 123-45-6789 | 7/24/67 | 123 Cherry St. |
| ~ | ~ | ~ | ~ | ~ | ~ | ~ |

*Step 3.* Object Broker returns John Doe has object ID 0012 and all index data.

*Step 4.* PDB issues a GET request to retrieve demographic data in system on John Doe:

| get_PERSON(0012) | — 705

*Step 5.* GET message transmitted to Object Broker, which consults the map table to determine in which location the most current demographic data for John Doe is stored.

MAP TABLE — 120

| Inst. | OBJID | Location | Status | Table Name |
|---|---|---|---|---|
| 1 | 0011 | RDB1 | Date n | OAT 3 |
| 2 | 0012 | RDB2 | Date n+1 | OAT 2 |
| 3 | 0012 | RDB1 | Date n+2 | OAT 1 |

*Step 6.* Request transmitted to PDB1, where object attribute table (OAT) index provides pointer to the object attribute table(s) in which the demographic data for Object ID 0012 is stored:

OAT Index (at PDB1) — 150

| OBJID | RAD |
|---|---|
| 0011 | RAD1 |
| 0012 | RAD2 |
| 0013 | RAD3 |
| 0014 | RAD4 |
| 0015 | RAD5 |

OBJECT ATTRIBUTE TABLE 1 (at PDB1) — 140

| OBJID | Last_Name | MI | First_Name | B-day | Marital Status | Address |
|---|---|---|---|---|---|---|
| ~ | ~ | ~ | ~ | ~ | ~ | ~ |
| ~ | ~ | ~ | ~ | ~ | ~ | ~ |
| 0012 | Doe | S. | John | 7/24/67 | M | 123 Cherry St. |
| ~ | ~ | ~ | ~ | ~ | ~ | ~ |

*Step 7.* Demographic data for Object ID 0012 is transmitted back to Object Broker and then back to admission clerk's screen.

*FIG. 28*

Step 1. Patient admitted to hospital at PDB3
Step 2. Admissions clerk logs on to system to retrieve patient information
Initial system state:
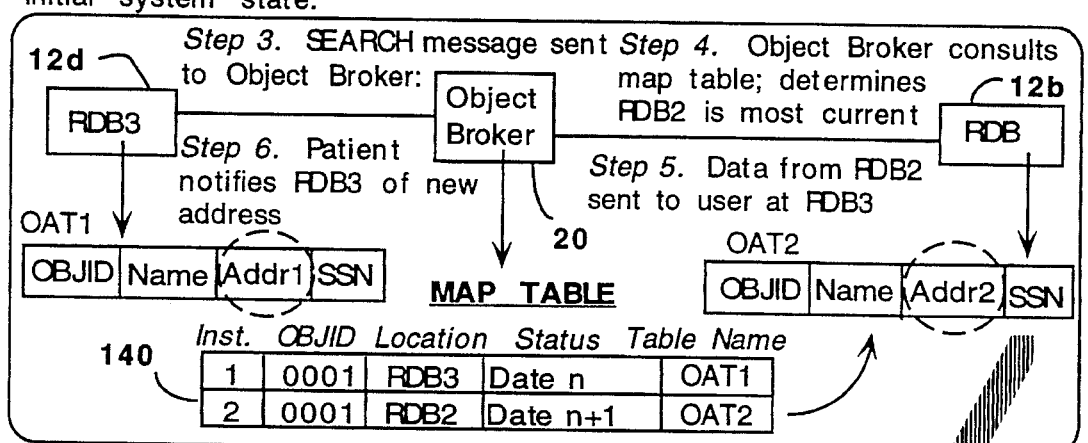
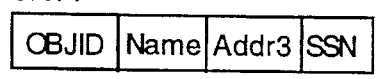
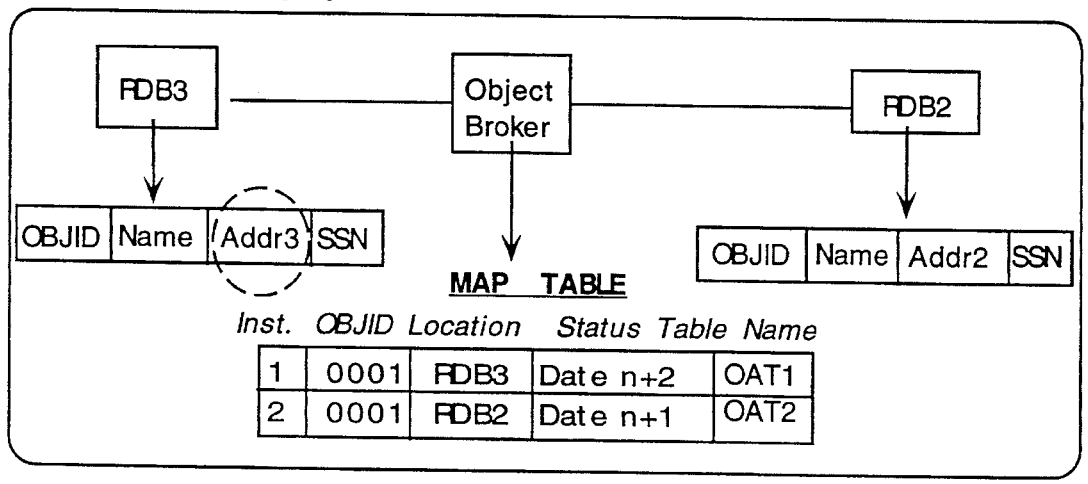
FIG. 29

METHODS AND SYSTEMS FOR OBJECT-BASED RELATIONAL DISTRIBUTED DATABASES

TECHNICAL FIELD

The present invention relates generally to distributed computing systems, and relates more particularly to an object-oriented distributed database system that transforms data stored in a plurality of remote, possibly heterogeneous user database structures into a homogeneous data model, stores location information and status information relating to the heterogeneous data via a centralized object broker for object management, thereby facilitating location and retrieval of data items from one or more of the remote, heterogeneous user databases.

BACKGROUND OF THE INVENTION

In a complex technological society, there is an ever-increasing need to store and retrieve information "globally", i.e., so as to allow access and use by a number of different societal entities. Because information is often accumulated in various. geographically dispersed sites, however, it is extremely difficult to synchronize and coordinate the information stored in dispersed sites. Therefore, traditional information processing systems rarely make information available on a global basis, without first centralizing it.

In response to the growing demand for a more efficient means to globally share information that is geographically dispersed, distributed computing systems have become a much more attractive means of information processing. A "distributed computing system" can be defined as a collection of multiple autonomous processors, usually with data stored in associated databases, typically located in geographically remote sites, that are inter-connected by data communications links.

Because of technological advances in communications and microelectronics, as well as a decline in hardware costs, distributed computing systems have experienced prolific growth in the last decade. Distributed computing systems are now being utilized in complex system design and application-oriented issues, including such well known examples as automated teller machine networks, airline reservation systems, and on-line validation of credit card transactions.

While substantial research has been devoted recently to distributed computing systems, much work remains to facilitate efficient data storage and retrieval, especially in view of the problems resultant from storage in geographically dispersed databases. One of the most difficult problems associated with distributed computing systems is the heterogeneous nature of the multiple processors or databases.

The autonomous processors in a distributed computing system can be homogeneous or heterogeneous. "Homogeneous" processors or databases are of the same kind, with the same data structures, and utilize the same data communications protocols. On the other hand, "heterogeneous" processors or databases are of different kinds, with different data models or structures, and they generally do not share information. Therefore, problems associated with intercommunication between heterogeneous processors and databases are much more complex and difficult than with homogeneous processors or databases.

Because the application programs for various known data processing systems are usually developed to meet the specific needs of different groups of users and without regard to compatibility with other data processing systems, most existing database systems are heterogeneous. Therefore, there is a general lack of coordination between heterogeneous databases, often leading to the duplication of data as well as a lack of data consistency among the files of different users.

Application of Distributed Database to Health Care Industry

A good example of a heterogeneous database environment is found in the health care industry. The health care industry is comprised of a wide variety of interrelated organizations, such as hospitals, insurance companies, health maintenance organizations (HMO's), testing labs, utilization review firms, and insurance payors and administrators. Many hospitals and hospital-management companies manage and run their own data processing systems, which often do not communicate between systems within the same company, let alone with systems of unrelated organizations. Some health care organizations run the same type of computer system at different geographical sites, and are therefore homogeneous in this respect, but cannot communicate the data between different sites. This lack of distributed homogeneity results in isolated homogeneous "islands" of information.

Even among organizations with homogeneous systems, it is possible that different entities (e.g. different hospitals that treat the same patient at different times) will store different information about the same person, or may store the same information using a different key identifier. Such occurrences introduce a degree of heterogeneity into a generally homogeneous computing environment.

A heterogeneous database environment is even more problematic than a homogeneous environment, and also does not provide optimum information processing to the health care community. For example, a given person may be a patient at more than one hospital during a given period of time. The identity of that person is a global fact—it is the same person that visits the hospital, although at different times, perhaps, and with different maladies. Because information about that person is entered and stored in more than one data processing system, there is duplication of information, and there is the undesirable possibility that inconsistent data will be accumulated about a particular person.

It is desirable that remotely located autonomous databases interact with others to share information. For instance, an insurance company may want to access patient records found in a hospital database. The hospital may likewise want to access information found in the insurance company database, such as whether and to what extent a particular patient has insurance coverage. Furthermore, it may be useful, or even life-critical, for information acquired at one hospital to be provided to the other, for example, the fact that a person is known to be allergic to certain medications.

Currently, such information is typically exchanged manually, e.g., a hospital administrator may telephone a patient's insurance carrier to determine information relating to the patient's insurance benefits. Alternatively, an insurance company may maintain a dedicated terminal at the hospital for remote access to the insurance company's database. Both of these methods, however, lack the level of automation necessary to support the global exchange of medical information across multiple heterogeneous databases. In addition, these known methods are error-prone since they do not provide a system for tracking the success or failure of information processing, such as adding and updating information in the global system.

As alluded to above, under conventional systems of information processing in the health care industry, it is often the case that information about a given patient is stored in multiple locations. For example, both a hospital and an insurance company may have the same information stored in their computer databases for the same patient, such as his or her address, telephone number, birthdate and other demographic information. The duplicative storage of information in autonomous databases is inefficient because it requires the expenditure of extra resources (in terms of human effort) to enter the information twice. There is also an increased probability of error because of the potential for inconsistent updating of information. Thus the risk that a user may access and rely on old information is greater, a situation that could be particularly dangerous or even life-threatening in the health care industry.

Accordingly, there is a need for methods and systems that provide for the global exchange of medical information within a health care community or other similar environment. The systems should provide a seamless interface between a plurality of remotely located, heterogeneous databases and a corresponding homogeneous data model so as to allow the retrieval and storage of information on a global basis. Such a system should also provide a mechanism for monitoring the status of the data within the system to ensure that users have access to the most current information available on the network.

Prior Art—The Galaxy Distributed Operating System

One approach to certain problems with distributed database systems is that in the Galaxy distributed operating system, which employs an object-oriented database model. See Sinha et al., "The Architectural Overview of the Galaxy Distributed Operating System", READINGS IN DISTRIBUTED COMPUTING SYSTEMS, IEEE Computer Society Press (edited by Casavant & Singhal, 1994), p. 327. (There is more discussion about object-oriented programming methodologies hereinbelow.) In the Galaxy system, a mapping table, also called an "ID table", is utilized for object locating, where each entry in the mapping table consists of locating information for an object. An ID table entry (IDTE) contains information about the type of the object, an access control list for the object, locations of the object's replicas, and locations where the copies of this IDTE exist (called a copy list). The replica list helps in returning all the locations of the desired object as a result of an object-locating operation. The Galaxy system uses the copy list to link together all IDTE's of the same object so that any modification can be made consistently to all copies. Given an object's ID, the Galaxy system can know that object's physical locations by searching the given ID in the ID table, and extracting the physical locations of its replicas from the ID table. However, choosing the method of maintaining the mapping table has proven to be a difficult task.

Specifically, object-locating mechanisms that were proposed and rejected in the Galaxy system include broadcasting, hint cache and broadcasting, chaining, centralized server (in which the entire ID table is kept on a single node), and replication (in which the entire ID table is replicated on all nodes). However, the Galaxy system designers apparently decided that all these mechanisms suffer from one or more common limitations of poor reliability, poor scalability, and poor efficiency. Thus, the Galaxy system uses a mechanism unlike any of those mentioned above. Rather, the Galaxy system keeps on a particular node only the locating information for those objects that have some possibility of being accessed from the concerned node.

It is clear from the literature, that the Galaxy operating system is optimized for a homogeneous data model, since the architecture chosen for maintaining ID's in a directory located in each particular node can only operate for objects that can be accessed from the concerned node, which implies homogeneity.

Object-oriented database models incur other difficulties as a result of global object identity and object sharing. Global object identity is believed by those skilled in the art to be expensive because of lack of global virtual address space. The article by Özsu and Valduriez, "Distributed Data Management—Unsolved Problems and New Issues", READINGS IN DISTRIBUTED COMPUTING SYSTEMS, supra, mentions this on page 531. The literature suggests that managing distributed shared objects is difficult, since inconsistencies can occur when a shared object is moved and updated at another site. Solutions suggested in the literature include the use of an indirection table or the avoidance of problems at compile time.

According to the literature, with the indirection table approach, the problem of distributed "garbage collection" is purportedly an open problem. However, the notion of garbage collection implies that a given object only exists in a single instance, and if outmoded (as when updated) the object is transformed into a different conceptual entity, with a different object ID. Thus, one would discard an outdated object in favor of a newer, updated object, necessarily having a different object ID. But this approach suffers from the disadvantage of excessive use of object identifiers. Excessive use of object identifiers is inefficient and costly, and is conceptually flawed since there is generally no need to discard an object merely because its data is outdated. It would be more efficient from a resources standpoint to maintain an object's identifier for so long as the need for any information whatsoever about the object exists.

It is therefore apparent that the literature teaches away from the use of a centralized server for purposes of object management. It also apparent that there is a need for cross-platform, distributed database systems and methods that operate to transform data from heterogeneous data structures into a homogeneous data structure efficiently.

Other Approaches to Distributed Database Systems

Certain prior approaches to data storage and retrieval in distributed systems are concerned with optimization of read latency and data availability associated with objects resident on the distributed system. Some approaches concentrate on how to distribute updates or transaction activity to all of the copies of an object resident in the network. Usually, many copies are kept to enhance data availability should certain nodes on network or communication links fail. The more copies that are made, the more likely it is that a given object will be available for reading and will require less latency to obtain data associated with the object. Significant effort is thus required to keep copies of objects equal at the distributed locations.

One approach to maintenance of data in a distributed system is found in the SYBASE REPLICATION SERVER, a software database product made by Sybase, Inc., Emeryville, Calif. This system envisions maintaining multiple copies of a set of data on multiple servers, perhaps at multiple sites. Each copy at a remote site "subscribes" to a subset of data maintained at another site. The replication service keeps the multiple copies updated by replicating transactions initiated at a particular site directed against tables or data of interest, copying those transactions, and forwarding the copy of the transactions to remote destinations that apply these transactions to local copies of the data maintained at the remote sites. Thus, this system is essentially a "transaction store and forward" system based on subscription information.

Yet another approach to heterogeneous distributed database systems is the Thor object-oriented database management system being developed at Massachusetts Institute of Technology (MIT). See Liskov, et al., "Distributed Object Management in Thor", Programming Methodology Group Memo 77, to appear in "Distributed Object Management" by Özsu, et al. (June 1993). (Some of the "object oriented" terms used here are defined later in this application.) The Thor system is a distributed system in which objects are stored at server nodes. Object repositories are provided for storing and managing persistent objects, and, ostensibly, indexes to find objects. Users interact with the distributed system at a front end computer system such as a terminal or personal computer (PC) that communicates with an object repository.

It appears that the Thor system requires significant processing overhead for object maintenance. The Thor authors specifically rejected use of a name service, and thus rejected use of logical references or pointers. Instead, Thor uses physical references or pointers to optimize read operations. Any object that is referred to by another related object appears to have some type of physical reference or link to other objects that have need of the data in the first object. If this is the case, then moving an object requires that all physical links or references from the referencing objects be updated so that such referencing objects can always "find" the object containing the data of interest. Although such a scheme may conceptually eliminate object replication and optimize read operations, it is complicated to maintain all of the physical pointers or links between related objects. Moreover, it appears that there is no client ownership of objects— all servers are equal and any client can update any object it can find, which creates complications of data security at distributed sites.

SUMMARY OF THE INVENTION

Briefly described, the present invention provides methods for operating a distributed data processing system including a plurality of independent remotely located user computers that process user data in user databases and at least one object broker computer. The user computers are interconnected with the object broker computer by data communication hardware over a data communication network. The laser computers are operative to perform data operations of storing, updating, and retrieving user data items in response to user commands. The method comprising the steps of:

(a) for a subject at one of the user computers for which data is to be processed in the system, creating a new object instance by assigning a unique object identifier to data items associated with the subject;

(b) storing the data items associated with the subject at the user computer site in association with the object identifier;

(c) at the object broker computer, storing the locations of the user computers in a map table in association with object identifiers;

(d) in response to a query to the object broker computer for data relating to a particular subject in question, retrieving an object identifier for the subject in question;

(e) in response to retrieval of an object identifier for the subject in question in the preceding step, retrieving the location of a remote user computer associated with the retrieved object identifier; and (f) retrieving data stored at the remote user computer associated with the object identifier via the data communication network.

More particularly described, each of the remotely located user computers comprises a heterogeneous data structure, and data is "homogenized" by mapping predetermined data fields items stored in the heterogeneous user computers to corresponding object attributes associated with a predetermined instance of an object, where the object is determined by an object model that relates to all of the heterogeneous user computers connected to the system. The object attributes are stored in an object attribute table in the remote user computers in association with object identifiers.

Preferably, the data items associated with the subject are stored in a separate, homogenized object-based remote database physically located at the customer's site, in association with the object identifier stored in the object attribute table. The object attribute tables are indexed at the remote databases for rapid searching and access by object identifier.

The object broker computer is preferably located in a central location. Functions carried out by the object broker computer include maintenance of a map table, one or more object index tables, and a global address space manager. Other functions include redirection of requests to the remote sites, and combining results from multiple remotes sites into a single response to a request from a remote site. The map table relates object identifiers to object attribute tables, locations of remote databases that contain the object attribute tables, and status information indicative of the currency of object attributes at each location. Since attributes of an object can exist in one or more remote locations, consultation to the map table by object identifier permits assembly or joining of data to construct a current complete set of object attributes associated with any given object. The object index tables relate predetermined search terms to object identifiers, to permit rapid searching to find an object identifier associated with the predetermined search terms. The global address space manager is responsible for providing a global object identification address space corresponding to a range of object identifiers for association with a plurality of subjects, and allocating a predetermined range of object identifiers within the global object identification address space to each remotely located user computer, for object control.

The remote databases, which can be separate computers from the customer database computers or a process within a customer database computer, maintain object attribute tables containing data items associated with each object class. The data items comprise attributes of object instances in association with object identifiers. These object attributes are obtained as a result of a homogenization operation, which occurs when data in the heterogeneous user databases is imported into the object model and thence into the remote databases. The homogenization operation involves mapping fields or data items in the heterogeneous data structures into object attributes in the object attribute tables, and then performing an "add" operation. Object attribute table indexes are also maintained at the remote databases to allow rapid searching, by object identifier, for the particular object attributes stored in the respective remote database.

Accordingly, it is an objective of the present invention to provide a distributed database computer system that overlays a homogeneous data model upon a plurality of possibly remotely located and possibly heterogeneous database systems or structures, so as to facilitate the retrieval and synchronization of information in a global fashion.

it is another objective of the present invention to provide a centralized server-based distributed database system that effects the retrieval of current data from one or more distributed heterogeneous databases that may store data in varying degrees of currency.

It is another objective of the present invention to reduce the expense of administration of various interrelated entities or organizations that need to communicate data, through process automation, information flow, personnel utilization and integrated systems use.

It is another objective of the present invention to increase the quality of medical care by providing the health care industry with shared clinical diagnosis and report information, thus reducing duplication efforts that result from maintenance of plural, heterogeneous databases associated with health care providers.

It is another objective of the present invention to provide a distributed database system that allows system users to have access to new data sources as they come on-line, without requiring the users or their systems to know the routing address or other identifying information about the new data source.

It is another objective of the present invention to provide object-oriented distributed database systems and methods that assign a persistent object identifier to a conceptual object in an object model used to impose homogeneity to heterogeneous data structures, where the object identifier is global throughout the entire system and persists so long as any information about that object :must be retained.

It is another objective of the present invention to provide an object-based distributed relational database system and methods for use in the health care industry, that is operative to maintain information about particular patients, insurance carriers, hospitals, medical records, etc. that is accumulated from a plurality of distributed, heterogeneous, remotely located computer systems, in a homogeneous manner, thereby allowing information to be efficiently communicated, shared, and updated amongst the various heterogeneous users participating in the system.

These and other objectives, features, and advantages of the present invention may be more clearly understood and appreciated from a review of the following detailed description of the disclosed embodiments and by reference to the appended drawings and claims.

BRIEF DESCRIPTION OF THE DRAWINGS

FIG. 7 illustrates the map table in provided in the object broker constructed in accordance with the preferred embodiment of the present invention.

FIG. 8 shows exemplary object index tables provided in the object broker constructed in accordance with the preferred embodiment of the present invention.

FIG. 17 illustrates selected specific field names utilized in an exemplary remote, heterogeneous database structure and their corresponding field names in a homogeneous data model at the remote databases as utilized in conjunction with the present invention.

FIG. 18, consisting of FIGS. 18A, 18B, and 18C illustrates portions of the file structure used by an applications program interface (API) to transform data from an exemplary remote heterogeneous database structure to a homogeneous data structure in the remote database.

FIG. 19, consisting of FIGS. 19A and 19B joined at a match line to create a single figure, illustrate a PERSON Put Specification Table provided at the applications program interface (API) constructed in accordance with the present invention.

FIG. 26 is the Certification-Patient Demographics display screen generated by the Patient Information Application software.

FIG. 28 illustrates the state of various data tables in the object broker and in the remote databases in conjunction with exemplary SEARCH and GET messages.

FIG. 29 illustrates the state of various data tables in the object broker and in the remote databases in conjunction with an exemplary UPDATE message.

DETAILED DESCRIPTION OF THE PREFERRED EMBODIMENTS

Figure 1:
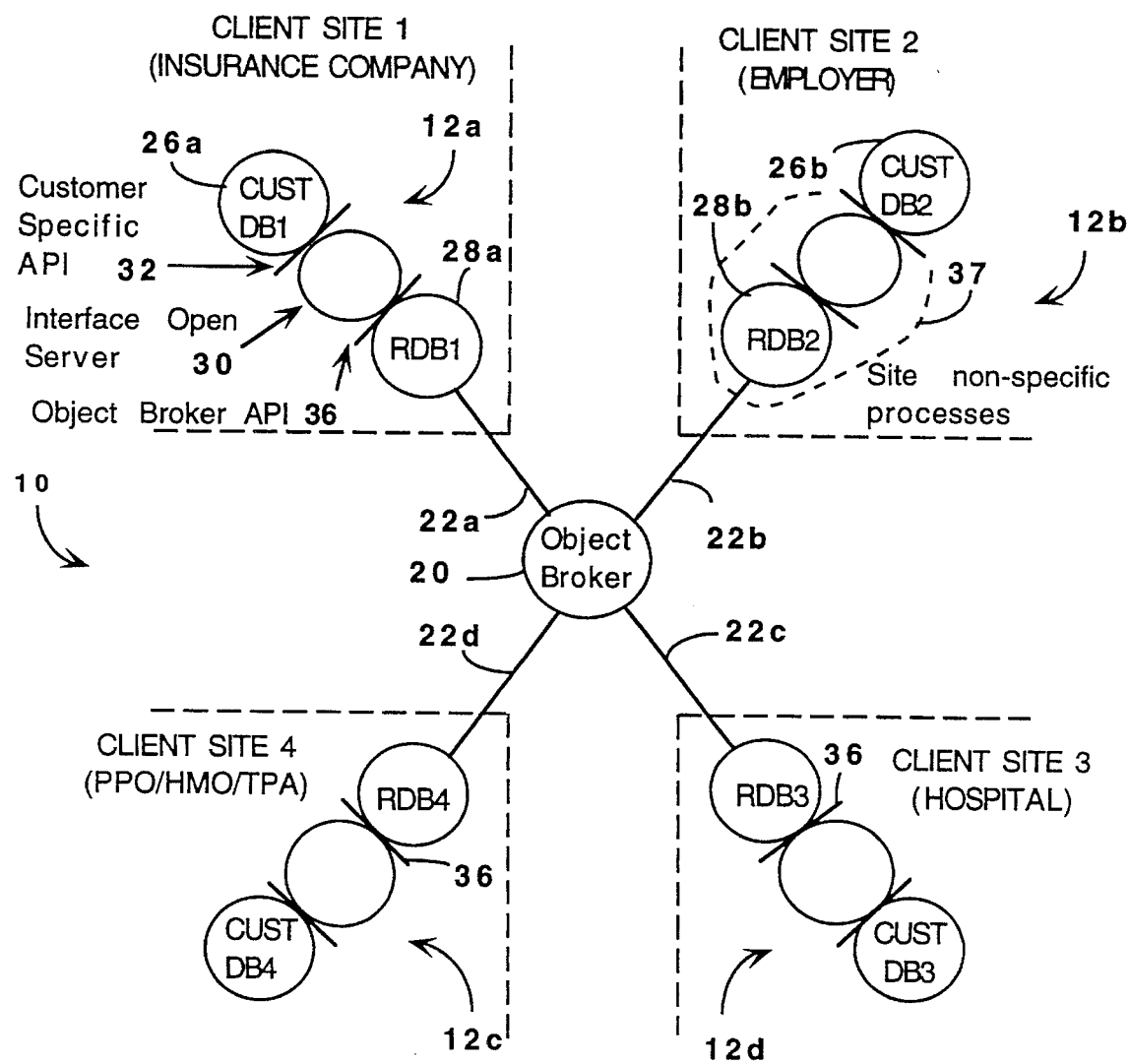
FIG. 1 is a block process diagram of the preferred embodiment of an object-based relational distributed computer system constructed in accordance with the present invention.

Referring now to the drawings, in which like numerals indicate like elements throughout the several views and drawing figures, the preferred embodiment of an object-based relational distributed database system 10 constructed in accordance with the present invention will be described in connection with FIG. 1.

Overview of Preferred System

FIG. I shows the preferred system 10 comprising a plurality of remotely located client sites 12a–12d, identified as client site 1—client site 4, respectively, that are interconnected for data communications with an object broker 20. The object broker 20 preferably comprises a separate central stand-alone computer system that operates in the manner to be described. The user computers 12 communicate with the object broker 20 via separate data communications links 22a–22d. Further details of the preferred object broker computer 20 and communications links 22 are described in greater detail below.

In the preferred embodiment, the object broker computer 20 communicates with one or more remotely located client sites 12a–12d, thereby forming the distributed computing system. Each client site 12 comprises a user's local computer system or database 26 associated with the remote site, typically proprietary to and operated by the user, and a distinct remote database (RDB) 28 that serves as the interface between the user's computer system 26 and the object broker 20. Certain functions are effected at the object broker 20, while others are effected at the client's computer sites 12.

Each of the user computers or databases 26 may be homogeneous or heterogeneous. One of the principal advantages of the present invention is that various different or "heterogeneous" types of user computers may be connected and operated as nodes in a distributed computer system constructed in accordance with the present invention. It will be understood that heterogeneity in aspects of hardware architecture (e.g. IBM RS/6000, Hewlett-Packard, DEC VAX, Data General, etc.), operating system (e.g. UNIX, VMS, WINDOWS NT™, etc.), database engine (e.g. SYBASE®, INGRES®, INFORMIX®, ORACLE®, etc.), and data communications local or wide area networks and protocols (e.g. TCP/IP, X.25, token ring, ETHERNET, etc.) do not necessarily imply heterogeneity in data structure. The term "heterogeneous" as used herein refers to differences in the data models and/or data structures of the various computer systems or databases, which is distinct from differences in computer hardware and operating systems. The present invention provides means and methods for connecting and operating remotely located, possibly heterogeneous databases and user computers for operation and communication with one another, in the manner to be described.

Nevertheless, it will be understood and appreciated by those skilled in the art that the present invention is not limited to any one hardware architecture or operating system. The object-based relational distributed database system constructed in accordance with the present invention may be compatible with computer systems that differ in one or more aspects of hardware architecture, operating system, database engine, data communications local or wide area networks and protocols, and application software running on such systems.

For a given user computer site such as that shown at 12a, a customer's computer system or database, identified as CUST DB1 26a, is functionally and logically connected to a remote database (RDB 1) 28a, which may be (but is not necessarily) implemented as a separate computing entity. In order that communications can occur between the systems or processes serving as the customer database 26 and the remote database 28, a process called the "interface open server" 30, also denominated an "interface client" is provided to bridge the processes 26, 28 either logically or physically. The interface open server 30, as will be more fully described elsewhere herein, operates to transform the heterogeneous data models or structures of the customer database 26 into a homogeneous data model at the remote database 28.

Figure 2:
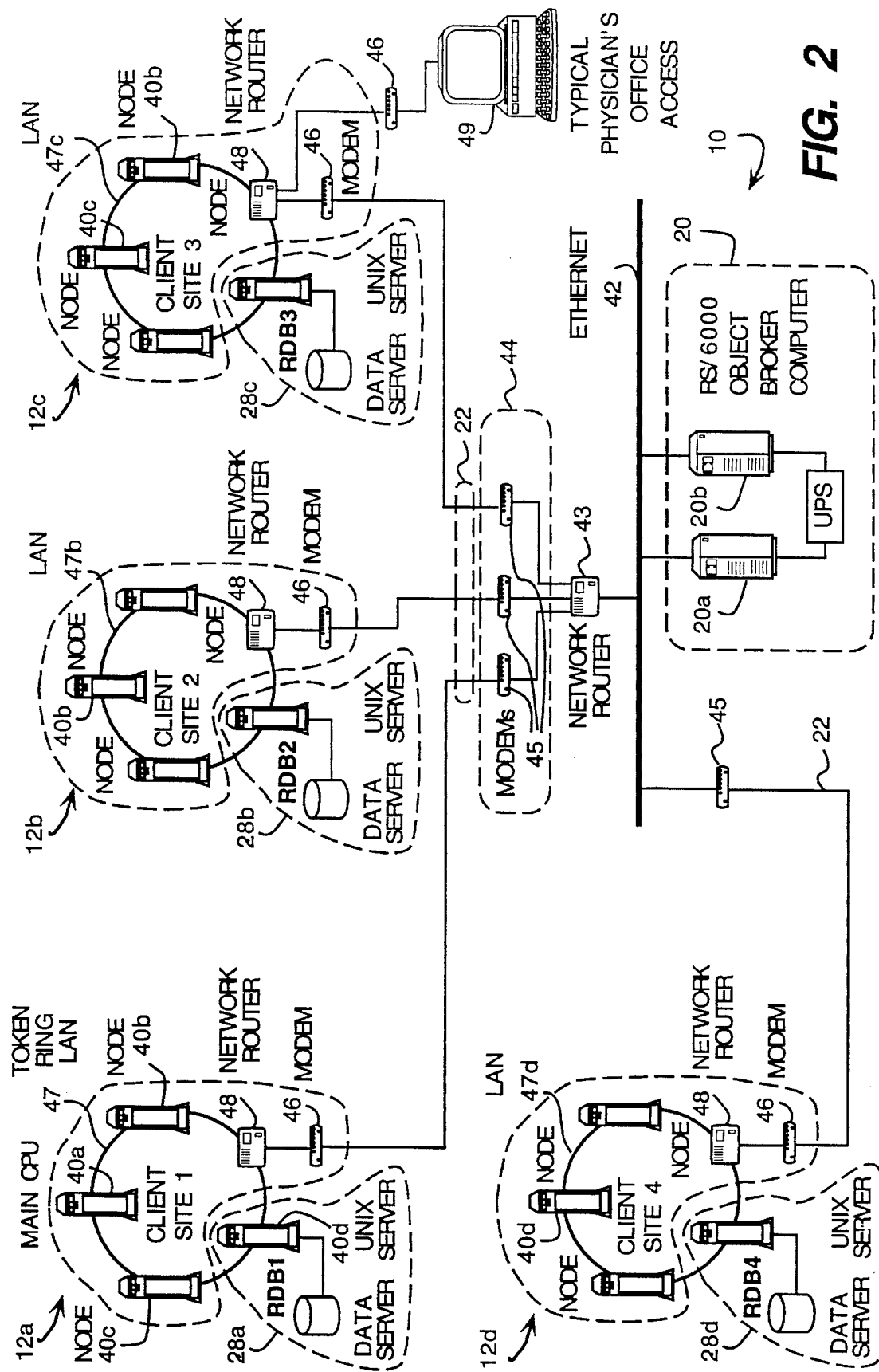
FIG. 2 is a block schematic diagram illustrating the physical hardware of an object-based relational distributed database system constructed in accordance with the preferred embodiment of the present invention.

FIG. 1 illustrates a preferred embodiment of the physical locations of the various components of the distributed database system, with the remote databases 28, the interface open servers 30, and the user computers or customer databases 26 physically located at a client site 12. However, those skilled in the art will understand and appreciate that the physical locations of the processes at the remote databases 28 and the interface open servers 30 are site nonspecific, as indicated by the dotted line at 37. That is, a client's site 12 can comprise physically distinct computer systems to serve as the customer database 26 and as the remote database 28, but the two computing entities are logically and functionally connected. Thus, those skilled in the art will understand and appreciate that a single computing entity at a client site 12 may run different processes to effect the customer database 26 and the remote database 28. On the other hand, the customer database 26 and the remote database 28 can comprise physically distinct computer systems connected via a data communications network. (FIG. 2 illustrates such an embodiment, which is the preferred and disclosed embodiment herein.)

If physically distinct computer systems are used for the customer database 26 and remote database 28, a data communications link such as a local area network (LAN), wide area network (WAN), serial data communications link, or other computer-to-computer communications link well known in the art is provided. For systems wherein the customer database 26 and the remote database 28 are different processes within the same physical computer, the interface open server 30 comprises a series of commands and responses between the processes, with data shared in a buffer, or through any other known interprocess communication methods utilized in conjunction with known operating systems such as UNIX.

The exemplary system shown in FIG. 1 is modeled to illustrate a particular application of the present invention, namely, that in connection with the health care services industry. Such an application is the best mode currently contemplated by the inventors for the present invention, since there is a long-felt need for systems and methods for allowing computer communications between remote distributed heterogeneous databases such as those maintained by health insurance companies, employers, hospitals, physicians, and other health care industry participants. The present invention fills the need for the rapid and efficient exchange of information between the various entities in the industry to allow for increased efficiencies in patient admission, patient handling, payment transaction handling, insurance claim processing, and the like.

Accordingly, FIG. 1 illustrates that the client sites 12a–12d are associated with different entities in the health care industry, namely, an insurance company associated with a first client site (client site 1) 12a, an employer associated with a second client site (client site 2) 12b, a hospital associated with a third client site (client site 3) 12c, and a preferred provider organization, health maintenance organization, or other third party administrator (PPO/HMO/TPA) associated with fourth client site (client site 4) 12d, respectively. Further details of the relationship between these entities will be described in connection with the remaining figures.

Still referring to FIG. 1, in either the case of physically distinct computer systems for the customer database 26 and the remote databases 28, or wherein the customer database and the remote databases are in the same physical computing entity, the present invention involves implementation of two "application program interfaces" ("API"). A first API is that denominated the "customer specific API" 32, and a second API is that denominated the "object broker API" 36.

The customer specific API 32 serves as the interface between a customer database 26 and the remote database 28. As will be described in greater detail below, a customer specific API 32 is operative for mapping predetermined fields (i.e., data items) stored in a customer database system 26 to specific objects and object attributes (i.e., data items) in an object-based relational model provided in the present invention, regardless of whether the computer system that originated the data is homogeneous or heterogeneous relative to other computers in the system. The customer specific API 32, then, serves the function of transforming possibly heterogeneous data items into a uniform, consistent format system-wide, so as to facilitate the exchange of data items in a consistent data model. The data model described in connection with the preferred embodiment is that of the health care industry, after which it will be understood how to construct and implement object models for other applications.

In addition to a customer specific API 32, the present invention also provides an object broker API 36 at the logical boundary between a customer database 26 and a remote database 28. The object broker API 36 is operative to transform or map commands that originate with a requesting computer system into appropriate commands at the remote database 28, which can then be communicated over the communication links 22 to the object broker 20. The object broker 20 responds by formulating appropriate commands to one or more selected remote databases 28 within the system so as to retrieve selected data items appropriate for the data model and to ultimately provide the requested information back to a requesting computer system. Thus, the object broker API 36 serves as the logical connection between a customer database 26, which can be of varying types and is therefore heterogeneous, to a uniform system-wide convention so that data can be exchanged between the heterogeneous user computers in a transparent and efficient manner.

Physical Components or Hardware of the Preferred Object Broker

Referring next to FIG. 2, the physical structure of the preferred embodiment of the object-based relational distributed database system 10 comprises a plurality of remotely located, physically distinct user computer system sites 12 that communicate with an object broker computer 20 by various data communication links 22, utilizing application program interfaces (API) defining various request messages and responses between the various computing entities. The preferred object broker computer 20 comprises a pair of parallel IBM RS/6000 RISC-based computer systems 20a, 20b each including at least 128 megabytes of RAM, with at least 6 gigabyte hard disks serving as primary data storage, and integral ETHERNET network data communications. Preferably, each separate computer system 20a, 20b includes mirroring software so that the hard disks are duplicates of one another for redundancy and to minimize down time. Preferably, the object broker computers 20a, 20b are powered by uninterruptable power supplies (UPS) to further minimize the likelihood of down time.

Each object broker computer 20a, 20b is connected for data communications via an ETHERNET link 42 to a network router 43, preferably comprising a Telebit NETBLAZER 40™, a Token Ring MAU manufactured by Thomas & Conrad Corp., and a Telebit TRAILBLAZER™. The network router 43 is connected to a modem bank 44 comprising a plurality of high-speed data modems 45, preferably a Hayes® Optima 9600 or the like. Each modem 45 in the modem bank 44 is connected by a conventional telephone-grade communication line to modems 46 associated with each of the remotely located user computer sites 12a–12d, thereby forming the data communication links 22.

It will be understood that each of the client sites 12 may operate computer systems of different types running different types of hardware, different types of operating, systems, different network architectures, and different types of user application programs, and therefore are heterogeneous both in physical architecture and in data structure. However, it is the heterogeneity in data structure that presents the greatest technical challenge and to which the present invention is particularly directed. In the exemplary embodiment of FIG. 2, the computer system of each client site 12 comprises at least one main CPU 40, such as the main CPU 40a associated with the user computer site 12a. The main CPU 40a serves as a node on a local area network (LAN) 47 that is interconnected with a plurality of other CPU's 40b, 40c which also serve as nodes on the network 47 associated with the site 12a. The LAN may be ETHERNET, token ring, or any of a number of different data communications network standards. A network router 48 connected to the LAN 47 directs incoming data communication packets from a modem 46 onto the LAN 47 and then to a target destination or node.

In the preferred embodiment, a separate UNIX-based server computer 40d runs code to execute the functions of the remote databases (RDB) such as RDB 1 28a. Communications between the server computer 40d (comprising the RDB 28a) and the customer databases that are maintained by one or more of the CPU's 40a–40c (comprising the customer database 26a) are communicated on the LAN 47. Accordingly, the API between the customer's database equipment 26 and the RDB's 28 are passed as data communication packets on the LAN 47.

Before leaving FIG. 2, it should be noted that access to system 10 is not necessarily limited to communications via the modem bank 44, nor necessarily requires a local area network for communications between the RDB functions 28 and the customer database functions 26. As previously described, the remote database functions in the RDB computers 28 can be carried out as a separate process on a user computer that normally executes the customer database functions 26. Similarly, in the preferred embodiment, access to the system can be made by a stand-alone computer and modem.

One example of alternative access to the system is shown in FIG, 2, which illustrates a stand-alone personal computer (PC) 49, for example a physician's office computer, that connects via a modem 46 to a corresponding network router 48, in this case associated with the user computer site 3 12c. Alternatively, there could be a direct connection between a modem 45 and the modem bank 44, or a separate ETHERNET-based modem such as that shown connected to the modem 46 associated with the client site 4 12d, or a LAN connection by the PC 49 directly to the network 47d associated with the site. Those skilled in the art will understand and appreciate that other hardware and data communications facilities can be utilized in conjunction with the present invention so as to carry out the objectives and features of the invention. In particular, it will be appreciated that a PC such as the one 49 is used to run the Patient Information Application software described in greater detail below.

Object-based Relational Modeling

The following discussion introduces the concepts required for object based relational modeling. It is assumed here that the reader is familiar with the notion that an "object", for purposes of computer modeling, comprises a plurality of data items with an associated object identifier or object ID. The object identifier or object ID is often referred to herein as "OBJID".

Very generally, most people perceive the world as being organized into things or objects. Most computer filing systems, however, do not treat things in the real world as objects, but instead as tables of related data items. In an "object-oriented" representation, a computer system represents an entity or item such as a number, a person, a city, etc. as an object. "Objects" in the real world directly correspond to "objects" in the data model. Accordingly, it is expected that an object-based model representing information and processes in a computer will be more intuitive, and will more readily facilitate the mapping of information from the real world to a computer model.

There is some diversity of opinion in the computer industry as to what is meant by an "object" and the degree to which a computer program or database system is considered "object-oriented". Various terms have emerged in the art to capture various aspects of "object-oriented" approaches. These terms include the words encapsulation, classes, inheritance, message-passing, polymorphism, and persistence.

The term "encapsulation" means that information associated with an object is to some degree hidden and not directly accessible. Encapsulated data often must be accessed and changed via indirect methods.

The term "classes" relates to objects of similar types. Objects of the same class are grouped together and have certain properties, attributes, or behaviors in common. Classes may be organized into hierarchies of subclasses in which the procedures and attributes of the class are inherited by its subclasses. Thus, a "subclass" is a group of objects that have some properties, attributes, behaviors, or procedures with other groups of objects, but could have other properties, attributes, behaviors, or procedures that are different.

The term "attribute" relates to data items or information or behavior that relate to a particular object.

The term "inheritance" means the sharing of properties, and in some cases attributes and behaviors, that characterize a class by its subclasses. The notion of inheritance purportedly allows for easier maintenance and extension of computer programs since creation of subclasses purportedly allows the program code used to created the parent class to be readily modified and reused for subclasses.

The term "messages" means the basic mechanism of communication and computation for objects; messages are passed between objects, and these messages invoke an object's procedures.

An object's "procedures" are operations upon data items or data attributes so as to cause a computing result and provide a response. The data operated upon may or may not be hidden (encapsulated) in the object.

The term "persistence" refers to the idea of a long-lived or persistent entity. In other words, an object (that is, a computer-based object) may continue to exist after the application that created it completes its function. In the present invention, objects have an infinite persistence—once an object is assigned an object identifier, that object identifier remains forever and is never reused. Thus, an object may have an infinite persistence, even if the corresponding real world entity dies or is destroyed.

The term "polymorphism" means that different objects may respond differently to the same message. The term relates to a system's ability to invoke one of a set of identically named procedures depending on the class (or type) of the target object on which the procedure is intended to operate. For example, a set of "print" procedures could be prepared for each of a set of classes (or object types). When an arbitrary instance of one of these classes is then sent the "print" message, the system invokes the appropriate "print" procedure by referencing the target object's type identifier, which is usually stored somewhere inside the target object. This causes the object to "print" itself with the "print" procedure that was written to handle any special aspects associated with the object's type (class). The sender of the "print" message need not maintain an awareness of the type (class) of the object it is "printing" in order to invoke the appropriate "print" procedure.

An "instance" of a class is a particular object, and generally corresponds to a particular identifiable real world entity. Since a class is a grouping of similar objects or instances of the class, all objects of the class use the same procedures and respond to the same messages.

Certain aspects of object-oriented programming techniques are utilized in the present invention so as to provide the transformation of heterogeneous data models stored in distributed user's computer systems at client sites 12 into a homogeneous data model based on a predetermined object system. In other words, the present invention provides means for transforming different, heterogeneous types of information stored in different computers, all of which can relate to the same conceptual framework, into a uniform format for exchange. The present invention utilizes an object-oriented methodology to create the distributed system, and to model the information exchanged between system users.

This approach, while generally object-oriented, borrows from certain relational database methodologies. Relational database technology is a relatively mature computer technology for business oriented data processing. Relational databases, however, utilize a "record-based" data model which is more difficult to utilize in a heterogeneous environment. In a relational database model, data is organized into tables comprising columns and rows of data items.

Columns represent individual topics of information, while rows represent the information for a single entity across all columns. Therefore, each data item in a row roughly corresponds to a "record" in a conventional file system. The fact that many different computer systems may store the same information in different tables and in different formats gives rise to the heterogeneity of the data model or structure. For example, one computer system may store a row of information about an individual in the format of NAME, ADDRESS1, ADDRESS2, CITY, STATE, ZIP, COUNTRY, while another system may store information about the same individual as FIRST_NAME, LAST_NAME, MIDDLE_ INITIAL, ADDRESS, CITY/STATE, ZIPCODE. Each of these characteristics constitutes a separate field or attribute of a row in a relational or table-based data model. The present invention utilizes aspects of both object-oriented data modeling and relational data modeling, yielding an object-based relational model. Viewed from a system and programming perspective, an object-based conceptual flamework is utilized to model real world entities, the data for which is to be accumulated and processed. The object model allows a system-wide perspective to be imposed on distributed, heterogeneous data. From the user's perspective, however, the data is accumulated and processed in a relational model-data is captured in generally tabular format, usually by means of a relational database operated in conjunction with the user's proprietary computer system at the client sites 12. The present invention introduces an object-oriented framework from a distributed system-wide perspective, but allows the data at each, possibly heterogeneous, user's computer to be captured and stored locally.

Figure 3:
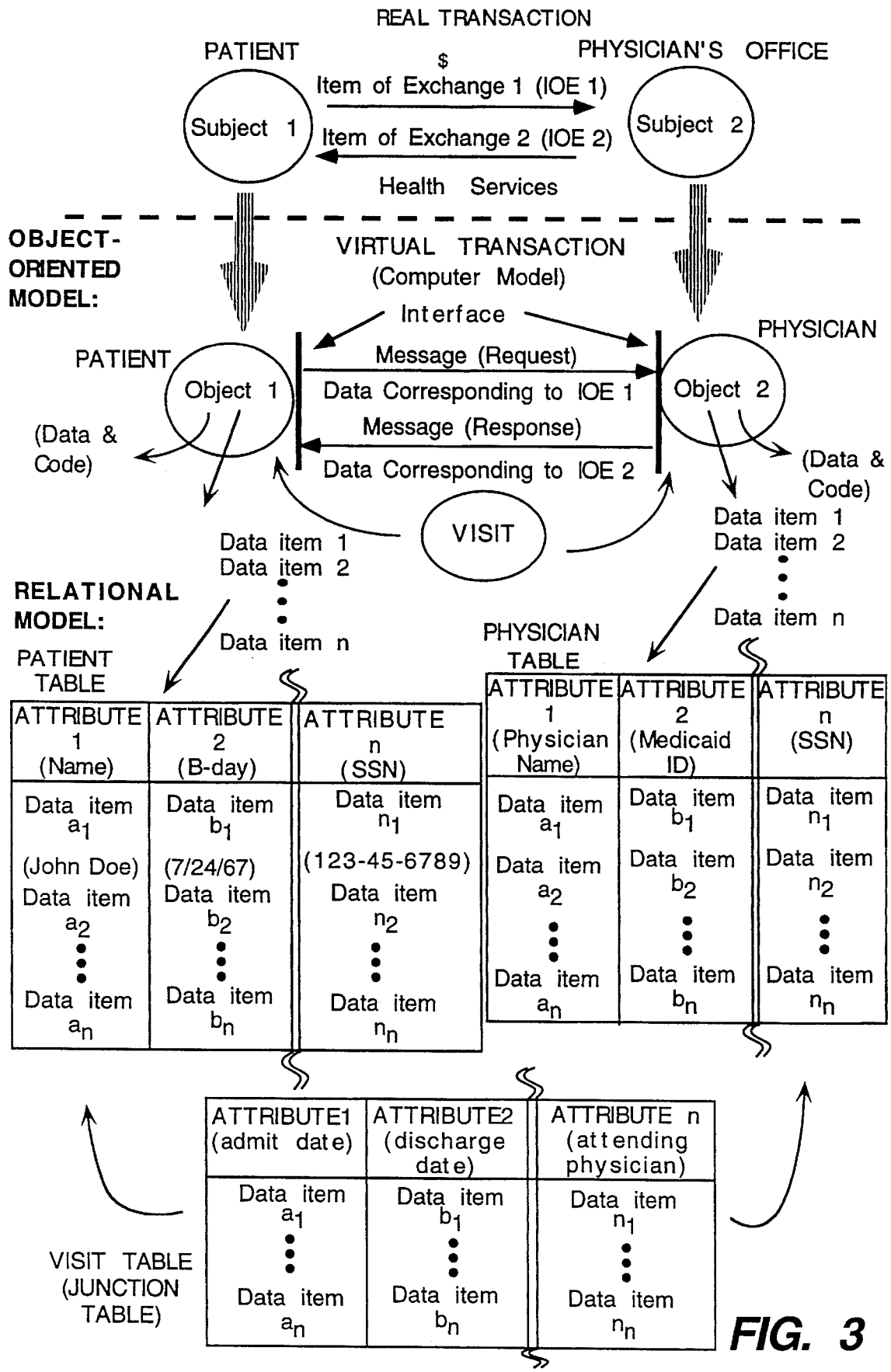
FIG. 3 illustrates various concepts relating to object-oriented data modeling, as compared with relational data modeling.

With particular reference now to FIG. 3, a conceptual framework for an object based relational model will be described. Consider a situation involving a transaction processing system. The present invention is especially suitable for use in a transaction processing system. By "transaction processing system", we mean any type of computer system that is operative to update databases or files as a function of an event-related exchange or transaction. A "transaction" is a collection or grouping of related actions associated with a particular event, such as admission of a patient to a hospital, or a visit by a patient to a doctor, or the payment by a guarantor such as a health insurance company of a claim, or the like.

While a transaction processing system is one particularly advantageous application of the present invention, a transaction processing system per se is not necessarily distributed. A true distributed database system provides many functions and applications that simple transaction processing systems cannot necessarily provide. Many transaction processing systems merely operate to exchange information related to a given transaction, e.g., the withdrawal of cash from an automated teller machine (ATM). A transaction processing system usually involves creation of a data item (e.g. amount of cash withdrawn from which account), and does not necessarily provide functions such as querying or structured organization of the data. For example, a user of an ATM cannot obtain a report from the ATM as to the amounts of cash drawn against his or her account from other ATMs in the network. The user also cannot access all banks at which he or she have an account, even if all of the banks are connected to the ATM network.

The present invention finds particular utility in a transaction processing system that involves distributed data collection in a heterogeneous environment. To illustrate the invention's utility in this regard, we will next consider a transaction processing system involving the health care services industry, and how to create an object model of such a transaction processing system. After creation of the object model in this example, those skilled in the art will more readily understand how to make and use the present invention in connection with other applications.

FIG. 3 illustrates a transaction such as might be found in the health care services industry, as where a patient with an illness visits a physician's office. The real transaction, therefore, involves two subjects, a patient (subject 1) and a physician's office (subject two), engaged in an exchange of some type. Typically, in exchange for money, health services are rendered by the physician's office. Although this is an over-simplification, for the present it is sufficient to note that a transaction typically involves one or more subjects, involving one or more items of exchange (IOE). The information that is generated in such a real transaction is transformed into data items, particularly if third party guarantors such as insurance companies that pay benefits are involved. Typically, the data items relate to the items of exchange.

In order to model the transaction in a computer system with an object-oriented model, one type of object may be a PATIENT, a second type of object may be a PHYSICIAN, while a third type of object may be a VISIT relating the physician to that patient. In the object-oriented model, information pertaining to the patient is often of varying types, which correspond to varying data items such as data item 1, data item 2, . . . data item n. For example, data items typically associated with a PATIENT include the patient's name, address, social security number, health insurance company carrier, etc.

Data items associated with a PHYSICIAN usually include the physician's name, social security number, Medicaid identification number, etc. Viewed as an object, a physician also includes data items data item 1, data item 2, . . . data item n, A VISIT object is effectively a junction record between PATIENT and PHYSICIAN. A "junction" record or table is described below. The junction record contains data items associated with the VISIT, which typically include patient name, attending physician, dates of admission and discharge, description of the malady, fees paid, etc. Viewed as an object, a visit also includes data items data item 1, data item 2, . . . data item n. It will be noted that both the PATIENT object and the PHYSICIAN object are different from a VISIT object, yet the objects in this example contain certain information that is in common, such as the physician's name, yet other information may be different.

In a purely relational model, each of the various data items relating to the patient and the physician would be accumulated in tables as shown in FIG. 3. The tables include "base" tables and "junction" tables. Base tables relate to primary, often tangible conceptual entities in the object model and serve as anchors for other data to be connected to. The data items relating to the visit would be accumulated in a subordinate table (called a "junction" table), where junction tables relate to lower level, sometimes intangible conceptual entities that must be connected to a higher level object. For example, a "visit" by a patient to a physician is an intangible event or entity that cannot be touched or felt, while both the patient and physician are actual, tangible real-world entities. Nonetheless, a visit has data (information) associated with it, e.g., a date, and association between a particular patient and a particular doctor, and a particular malady.

Therefore, junction tables, often involving intangible entities or events or transactions, must point to one or more base tables, but they also include data. For example, the junction table VISIT would include an admission date, which would not have any meaning unless it pointed to both PATIENT and PHYSICIAN.

Relational databases are often characterized by the use of value based, or logical, pointers (i.e., not physical pointers) in the tables that point to data items in other tables, so that data in common to two tables is not duplicated. The pointers are logical because they do not give an actual physical location of the object. Physical pointers, on the other hand, are employed within the database engine utilized in the preferred embodiment of the invention (e.g., in a SYBASE® database system) for directly accessing data from particular storage locations on a disk or other mass data storage medium associated with the system.

In relational database terminology, a "primary key" uniquely identifies every row in a table. A primary key is used as a logical pointer in the examples which follow. Primary keys are usually significant, distinguishing information such as a person's full name, social security number, or other unique information. A "foreign key", on the other hand, comprises information in a subordinate or junction table that corresponds to the primary key information in a dominant or base table in order to logically join the two tables. For example, in a relational database, a VISIT table might contain a logical pointer to patient demographic information (name, address, telephone number, etc.) associated with a person stored in a different table. The data in two different tables, e.g. PATIENT and VISIT, are thus "related" by use of the logical pointers, thus giving rise to the "relational" label. Foreign keys used in the description are also logical, not physical pointers.

For example, in the example of FIG. 3, in the PATIENT table (which is a base table) primary keys include full name, social security number, and birthdate, while other data of interest might include a person's telephone number or zip code. In the VISIT table (a subordinate or junction table), attributes such as an admit date, or discharge date would be information of interest, but patient name and/or attending physician would be "foreign keys" since this information is used to obtain information contained in a base table elsewhere.

Those skilled in the art will understand that database indexes are typically constructed utilizing primary and foreign keys, while other data of interest in a table is not necessarily indexed.

For purposes of the present discussion, it should be understood that in a relational model, the data is arranged in one or more tables, while in an object-oriented model, the data is organized as objects which communicate in the form of request and/or response messages. Each object, or instance of an object, is a relatively self-contained entity, with the data items associated therewith encapsulated or isolated to some degree from data items associated with other types of objects. Thus, a PATIENT object is an instance of a PERSON class of objects and would include the data items associated with persons who are patients, while a VISIT object would contain data items associated with a visit by a particular patient (with information derived from the PATIENT object) to a particular physician (with information derived from the PHYSICIAN object).

It should be apparent that there is a need to coordinate or make consistent the information contained between PATIENT objects and VISIT objects, since certain data items may be in common between the two. For example, a particular instance of a PATIENT object contains the name of a particular patient, and a particular instance of a VISIT object contains the name of a particular patient who made a visit to a particular physician. The strength of the relational approach is that it obviates duplication of data, e.g., a VISIT function record pulls the patient's name from the PATIENT base table; there is no need to duplicate the patient's name in another table. One weakness of the relational model is that it is difficult to implement across heterogeneous system boundaries, after the fact.

Object based modeling offers certain advantages over relational modeling. Object based modeling enables more reuse of particular database columns and tables, by modeling more abstract entities than is possible with typical relational modeling techniques. The use of more abstract modeling yields fewer tables and columns than relational modeling. Furthermore, the use of more complex data structures allows some problems to be solved using less code than would otherwise be possible or practical.

The present invention utilizes favorable aspects of both object-based modeling and relational modeling by allowing creation of a system-wide data model for institutions such as the health care services industry. An object-based relational data model allows data accumulated at remote, heterogeneous computer systems, often in a relational, tabular format associated with proprietary database engines, to be exchanged utilizing an object-based model for communications between the disparate facilities. In the present invention, objects are created on a global (system-wide) basis, invisibly to the remote, heterogeneous computers, thereby allowing superposition of a uniform object-oriented data model upon a plurality of remotely located, distributed relational database systems maintained by different entities at different locations, thereby accomplishing the objectives of the present invention.

Simplified Object Model-Service Provider

Figure 4:
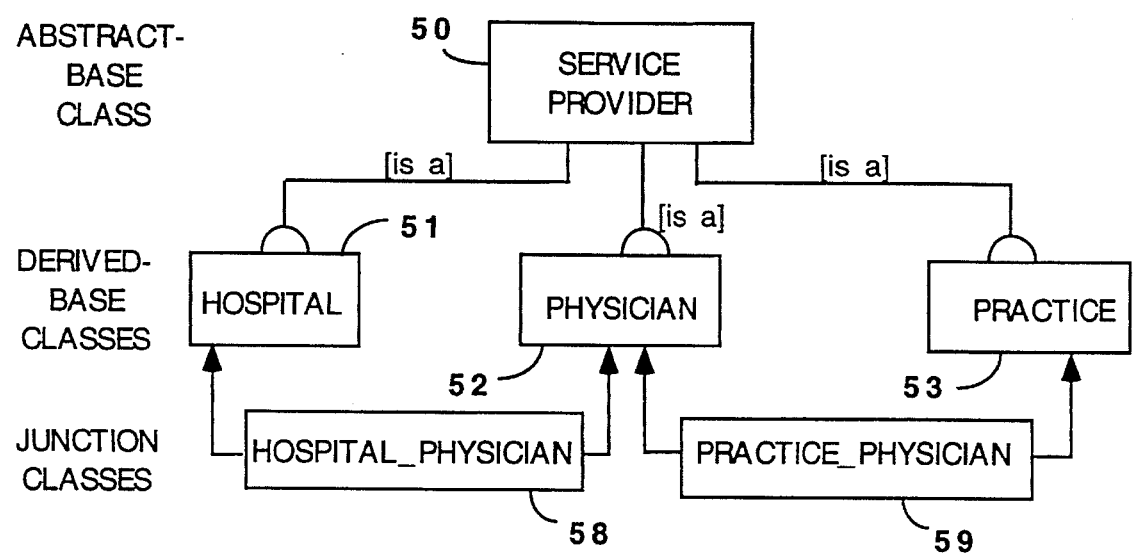
FIG. 4 is an exemplary object model showing the abstract class of objects SERVICE PROVIDER with exemplary base subclasses and subjunction classes.

Referring next to FIG. 4, further object-oriented concepts will be introduced in the context of the preferred health care information system. FIG. 4 illustrates an abstract class of objects 50 denominated SERVICE PROVIDER. An "abstract class" in object oriented terminology means a class for which no actual instances occur. Instances of abstract classes are not allowed because an abstract base class is not complete. The abstract class SERVICE PROVIDER 50 is a class of objects that conceptually encompasses a common subset of attributes and/or behaviors shared by several different subclasses that can have actual instances. In FIG. 4, there are derived based classes of HOSPITAL 51, PHYSICIAN 52, and PRACTICE 53. Conceptually, all of these derived base classes 51–53 are a SERVICE PROVIDER which can have actual instances because behavior, attributes, data, etc. specific to each derived class complete the abstract base class. However, the base class SERVICE PROVIDER is abstract, in that it has no actual instances. The figure illustrates that the derived base class of HOSPITAL 51 is a SERVICE PROVIDER 50 (with the nomenclature "[is a]"), as indicated by the half circle on the diagram. Likewise, a PHYSICIAN 52 [is a] SERVICE PROVIDER 50.

The derived base classes 51–53 in FIG. 4 each contain subordinate classes, or junction classes, 58–59. For example, the junction class HOSPITAL_PHYSICIAN 58 points to the base table HOSPITAL 51 and the base table PHYSICIAN 52, while the junction class PRACTICE_PHYSICIAN 59 points to the base table PHYSICIAN 52 and the base table PRACTICE 53. In this example, the HOSPITAL_PHYSICIAN 58 draws related information from both the HOSPITAL 51 and a PHYSICIAN 52. The HOSPITAL_PHYSICIAN 58 can, and does, contain other information, e.g. a particular physician's privileges at the particular hospital, not illustrated in this limited example. Likewise, a PRACTICE_PHYSICIAN 59 draws information from a PHYSICIAN object 52 (e.g. the name of particular physician) and a particular PRACTICE 53 (e.g. a particular practice specialty for a physician such as internal medicine, radiology, etc.) to relate the two.

More Complex Object Model—Health Care System

Figure 5:
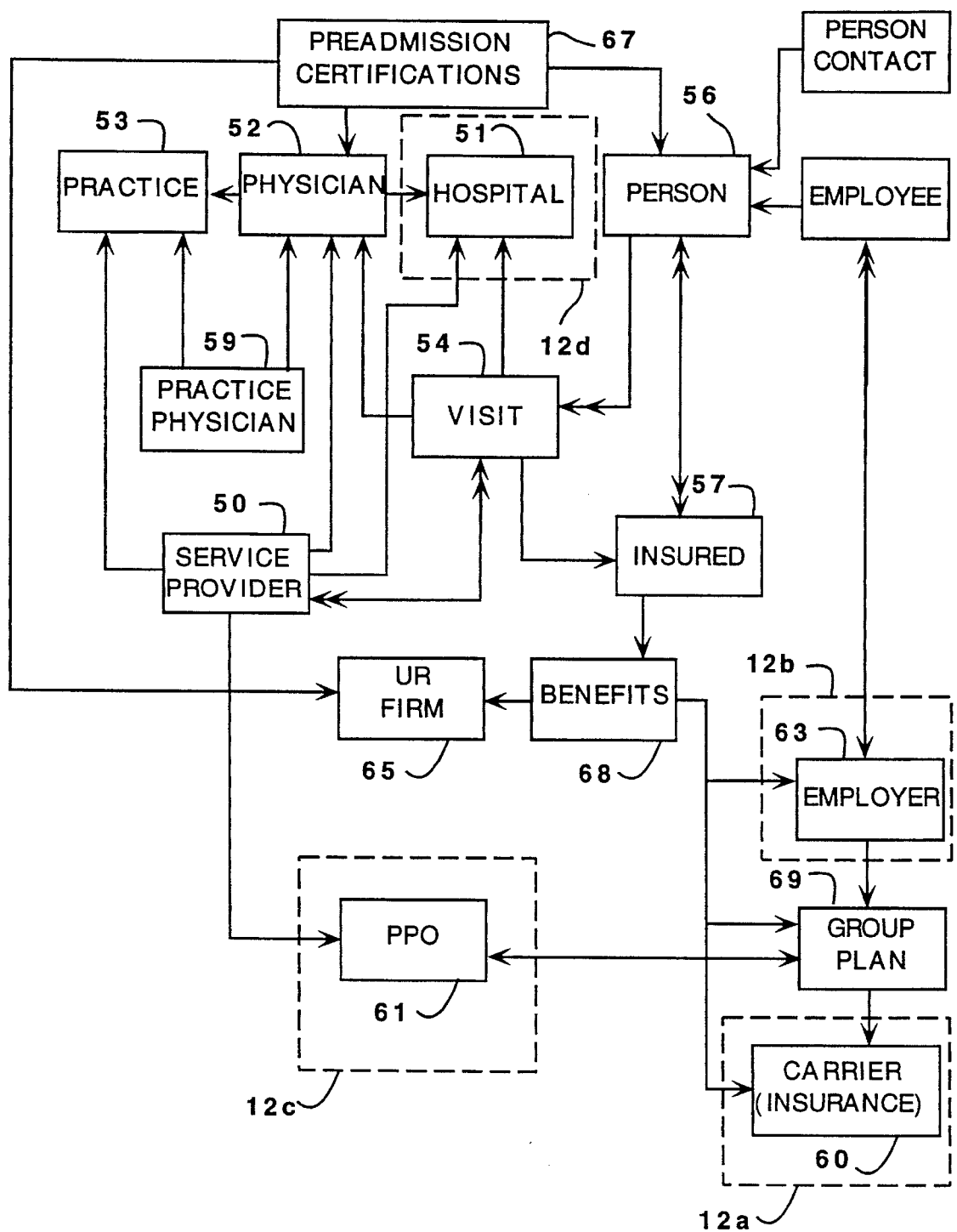
FIG. 5 is an exemplary object model relating to the health care industry utilized in the disclosed embodiment of the present invention, showing various objects employed in the object model and the relationships therebetween.

Obviously, the example given in FIG. 4 only introduces certain basic concepts. FIG. 5 extends the object model introduced in FIG. 4 to a more complex situation relating to the health care services industry, which is associated with the preferred embodiment of the present invention. It will be understood that the object model shown in FIG. 5 is a simplification of that actually utilized in the preferred embodiment. Nonetheless, certain objects referred to in later discussions are introduced here so as to provide a framework for understanding the present invention.

As described above, the abstract class of SERVICE PROVIDER 50 can have varying subclasses (derived base classes) of objects such as HOSPITAL 51, PHYSICIAN 52, and PRACTICE 53, with each of the subclasses having actual instances.

FIG. 5 illustrates concepts useful in the object oriented methodology. A line extending from one object to another, terminated by an arrowhead, whether single or double, indicates that data in the object from which the line extends is drawn from the object pointed to by the arrowhead. A line with double arrowhead indicates a "one-to-many" relationship to a "junction record". A "junction record", defined earlier in a purely relational context, in an object oriented context is considered a relationship comprising a plurality of instances associated with a particular entity. For example, a PERSON 56 can contain or point to many instances of VISIT 54, indicating that a person can have multiple visits to a medical care provider.

Accordingly, an INSURED 57 can contain or point to a number of PERSONS 56, in a one-to-many relationship. For example, if a particular person is the nominal insured party in a health insurance plan, that person can be the responsible party for a number of other persons, such as members of his or her family, as actual instances of the subclass PERSON. This indicates that there can be multiple instances of PERSON for any one given instance of INSURED. On the other hand, there may be multiple instances of INSURED for any one given instance of PERSON, for example, if a person has insurance coverage from multiple sources, e.g. through an employer-based plan and through a privately purchased insurance plan. Therefore, the double arrow notation between PERSON 56 and INSURED 57 in FIG. 5 indicates the presence of one or more junction records or tables (not shown) that represents or corresponds to a "many-to-many" relationship between certain classes or subclasses of objects.

Typically, a many-to-many relationship is implemented in the present invention as one or more junction records, comprising one or more tables that relate one object, such as a PERSON, to multiple instances of related objects, such as INSUREDs, and conversely that relate the other object, INSURED, to multiple instances of related PERSON objects.

Note in FIG. 5 that there is a one-to-many relationship between a PERSON object 56 and a VISIT object 54, indicating that any given person can have a number of visits, perhaps by the same health care supplier or from different health care suppliers.

Consider next the abstract base class SERVICE PROVIDER 50, which has a many-to-many relationship to VISITS 54. Thus, any given service provider many need to track a number of visits. Examples or subclasses of service providers include a HOSPITAL class 51, PHYSICIAN 52, and physician's PRACTICE 53. These examples relate also to the discussion of FIG. 4. Note the relationship between a physician's PRACTICE class 53 and PHYSICIAN 52, since a physician may be a member of a group of physicians forming a practice, and may have a particular primary practice reflected in a PRACTICE_PHYSICIAN 59 object instance.

It should be noted in conjunction with FIG. 5 that the relationship between various computer systems that typically create specific instances of objects is illustrated. For example, and referring between FIG. 1 and FIG. 5, the client site 3 12d corresponds to a hospital, where the hospital is shown as an object 51. Likewise, the insurance company or carrier 60 corresponds to the user computer site 1 12a, and the PPO/HMO/TPA 61 corresponds to the user computer site 4 12c. Similarly, the employer 63 in FIG. 5 corresponds to the user computer site 2, shown at 12b in FIG. 1.

Note in FIG. 5 the preadmission certification object, identified at 67. In the preferred embodiment, a preadmission certification object instance is an associative entity-type object, utilized to signify that a particular person is certified to receive a particular procedure by a particular physician. These objects, and the relationship therebetween, are discussed in greater detail below in connection with the Patient Information Application software. For the present, it is sufficient to note that the preadmission certification object 67 has lines directed to, and therefore draws data from, a person object 56, a physician object 52, and a UR (utilization review) firm 65. In a typical health care information system, for particular sets of benefits a particular UR firm 65 may be designated as qualified to determine the appropriateness of treatments for a given diagnosis. The object UR firm 65 is therefore related to a BENEFITS object 68, which collects and stores health care benefit information derived from, for example, a person's insurance carrier 60, employer 63, or a group plan 69.

To summarize the foregoing—in accordance with the present invention, objects based on real world entities or transactions involved in an institution to be modeled (such as the health care services industry) are determined, and the relationships between the objects are determined. A determination is made whether a relationship between objects is one-to-one, one-to-many, or many-to-many (corresponding to inverse one-to-many). After determination of the object model and relationships there between, the object model is applied to the various, possibly heterogeneous computer systems that comprise unconnected, distributed computer systems associated with the institution. Then, a system can be constructed in accordance with the invention that allows communication between the disparate, separate, heterogeneous computer systems with heterogeneous data structures.

After the conceptual framework for any given system is established, such as has been described in connection with the health care industry, then the method can proceed to the establishment of creation of actual instances of the varying types of objects, maintained by the object broker 20 on a global system-wide basis, so that information relating to the varying types of objects can be tracked and maintained on a uniform, consistent, efficient system-wide basis.

Central Computer or "Object Broker"

In the present invention, the object broker computer 20 is the entity primarily responsible for imposing organization upon the various types of objects and instances of objects that are created in modeling a given institution. The object broker 20 is responsible for (1) managing object identifiers or "object IDs", also called "OBJID", (2) assigning ranges of object identifiers to the various remote databases associated with the user computers 12, (3) maintaining a map table relating the location of various objects and the status of the objects, and (4) maintaining search indexes (object index tables) that allow rapid finding of particular objects in response to search queries from users connected to the remote computers.

In the preferred embodiment, the object broker computer 20 runs the SYBASE® relational database system or engine, manufactured by Sybase, Inc., Emeryville, Calif., so as to carry out its functions as described herein. Those skilled in the art will understand that the preferred SYBASE relational database system facilitates creation and maintenance of data tables, as well as indexes to such tables for rapid searching, arid provides for programming of stored procedures for creating tables, adding data items to pre-existing tables, updating and sorting indexes, etc. As will also be known, indexes, which facilitate search operations by use of search trees maintained internally to the relational database engine, are created and maintained automatically in the SYBASE relational database system. Details concerning the features and operation of the preferred SYBASE relational database software are available in the literature supplied by the manufacturer.

It will be understood that the functions carried out by the SYBASE database engine could be implemented with other types of database engines (e.g., INFORMIX®, ORACLE®, etc.), and could also be implemented with custom programming. The known SYBASE system is utilized in the preferred embodiment because of its known robustness, relative ease of use, and features such as clustered indexes and data communications capabilities.

In following discussion of the functions of the object broker computer 20, it will therefore be understood that the functions described, tables, indexes, etc. are implemented in the SYBASE relational database programming environment, running on the object broker computer(s).

Relationship Between Object Broker and Remote Databases

Figure 6:
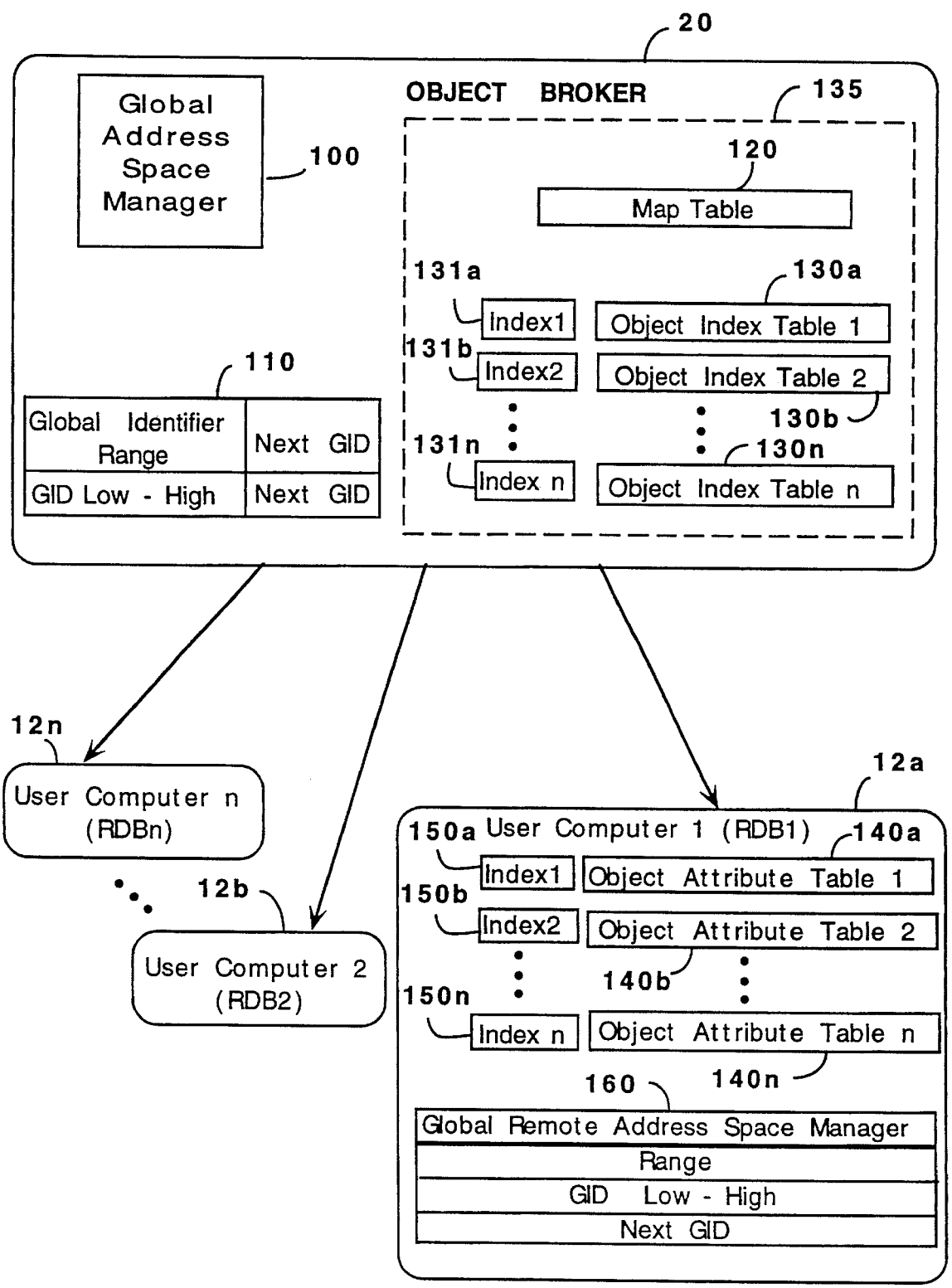
FIG. 6 illustrates various types of tables provided in the object broker and in the remote databases according to the preferred embodiment of the present invention.

Turn next to FIG. 6 for a discussion on the relationship between the object broker 20 and the remote databases 28 maintained at the client sites 12, as well as a discussion on the method employed in the present invention for creation of objects and managing the same. As discussed in connection with FIG. 1, the object broker 20 is the central computing entity that is responsible for managing objects within the preferred embodiment of the present invention, and imposing (by virtue of its existence and limitations) a homogeneous data model upon the varying heterogeneous systems at the remote user computer sites 12. After an appropriate object model has been created for a real world system, then it falls upon the object broker to control the instances of objects within the system and the coordination of information that allows storage, retrieval, and updating of information pertaining to the objects in the system.

In order to accomplish these tasks, the object broker 20 carries out two principal functions: First, to manage a global object identifier address space and allocate ranges of address space to the various remote user computers, and second to maintain various tables that relate the location and status of information pertaining to various objects. The object broker computer 20 is programmed to carry out these two basic functions. These computing functions are not necessarily programmed in object-oriented form, but it should be understood that the programming is transparent (i.e., invisible) to the users. In other words, the users at the remote client sites 12 are not directly involved with creation of object identifiers, with global object address space allocation, or maintenance of any tables relating location or status pertaining to the various objects.

The object broker 20 includes a global address space manager module 100 whose function is to allocate object identifiers or "object ID's" from a global or galactic address space. These object identifiers are variously termed herein "global identifiers" or "GID" or "OBJID". Every instance of an object in the system is assigned a unique identifier that persists indefinitely. There is no reuse of object identifiers. Therefore, the maximum global address space allocated by the global address space manager 100 must be a sufficiently large number to accommodate the creation of millions of instances of objects over an extended period of time. In the preferred embodiment, a twelve digit (decimal) numbering system is utilized, which allows for billions of distinct objects.

The global address space manager 100 is further operative to allocate ranges of global identifiers (GID) to the various remote databases 28 at the user computer sites 12, so that each object or instance of an object created at any user computer possesses a unique object identifier. These ranges of global object identifiers are selected to be a sufficiently large range to handle the immediate computing needs of a given user computer for a predetermined period of time, say, monthly or quarterly.

The object broker 20 further maintains a global identifier range table 110 in its memory. The global identifier range table 110 manages the preassigned range of global identifiers such as GID LOW to GID HIGH, where GID LOW and GID HIGH are twelve digit numbers. Each remote database RDB 28 associated with a user computer site 12 has a range of global identifiers assigned to it, and is responsible for assigning one of the global identifiers or object ID's to an instance of an object as it is created. When a remote database exhausts its supply of GIDs, or approaches the end of the range GID HIGH, in the preferred embodiment the object broker 20 is operative to assign a new range of identifiers to the remote database 28 and communicate a message containing the new range of identifiers.

It will be noted that in the preferred embodiment, the allocation of object identifiers is independent of object type or class. As an object instance is created at the remote databases 28, it is merely assigned the next available OBJID, denominated NEXT GID, from a storage register associated with the remote user site.

Another function carried out by the object broker 20 is maintenance of a map table 120 and one or more object index tables 130a, 130b . . . 130n. The contents of the map table and index tables are described in greater detail in later figures. For the present, suffice it to say that the map table 120 stores information relating particular object identifiers that have been assigned to particular instances of objects, to locations of data relating to those objects at the various remote databases RDBn. The index tables 130 comprise an index for each type of object modeled in the system that can be searched. The index tables relate search fields or data items to particular object identifiers. In other words, the index tables 130 are preconstructed based on information provided by the remote databases after the creation of an object and assignment of an object identifier.

Each object index table 130 itself has a corresponding additional indexes 131 which are constructed in accordance with any one of several indexing methods well known to those skilled in the art. For example, in the preferred embodiment, clustered indexes known to those skilled in the art in connection with the SYBASE® relational database engine used in the preferred embodiment are utilized to construct the additional indexes 131. The additional indexes allow searching in various tables by primary keys or foreign keys associated with selected fields or data items in the tables. In the preferred embodiment, any indexes 130, 131 are sorted in order of keys (primary or foreign, depending upon the nature of the table indexed), and the sorting order is updated upon addition of any new object instances.

It will be appreciated that the map table 120, the object index tables 130, and any corresponding additional indexes 131 collectively comprise an object location service 135 that is effected by the object broker computer 20.

Each of the user computers at client sites 12 carries out functions related to those carried out by the object broker 20, except at the remote databases RDBn 28. It will be recalled from the discussion above that the remote databases 28 are located at the client sites 12, and can comprise separate, stand alone computer systems that communicate with customer databases 26, or can comprise independent processes that execute on a customer's computer system so as to carry out the objects of the present invention within a single computer system.

By way of example, consider in FIG. 6 the user computer site 12a, denominated user computer 1, which is associated with remote database RDB 1 (shown at 28a in FIG. 1). Each user computer 12 maintains a plurality of object attribute tables (OAT) 140a, 140b . . . 140n. Each user computer 12 also stores and maintains object attribute table (OAT) indexes 150a, 150b . . . 150n. for each corresponding object attribute table 140. Each object attribute table 140 relates predetermined objects and attributes of objects to predetermined data fields or data items stored in the customer databases. These attributes are also part of the homogeneous data model and must be converted by an interface to the customer specific native format. The specific procedure for this transformation will be discussed in greater detail below in connection with the PERSON PUT operation, which is utilized to introduce data from a heterogeneous database into the homogeneous data model.

It will be recalled from the discussion of FIG. 1 that the customer databases such as 26 and the remote databases such as 28 are not necessarily in the same format and may be heterogeneous. The function of the object attribute tables 140 in FIG. 6 is to maintain a one-to-one relationship between selected fields or data items in a given customer database 26, to selected objects and attributes of objects within the object model that is effected by the present invention. Further details of the structure of the object attribute tables 140 are described in greater detail below.

The object attribute table index 150 maintained in association with the user computer sites 12 is a preconstructed index that allows rapid searching to locations within the object attribute tables 140 by object identifier or other primary or foreign key. Given a predetermined object identifier, or primary or foreign key, a very rapid look-up or search may be made to obtain a physical pointer (maintained by the database engine, e.g., SYBASE®) to a given data item or value stored in one of the object attribute tables 140. The indexes 150 are specified, created, and maintained in accordance with the preferred SYBASE database engine, and automatically updated by SYBASE upon insertion of new data into one of the object attribute tables 140.

The user computer sites 12 further include a remote global address space manager 160. A principal function of the remote global address space manager 160 is to receive the predetermined range of global identifiers GID LOW—GID HIGH from the object broker 20 and to store the range of global identifiers in memory. The remote global address space manager 160 is further operative to select a next global identifier NEXT GID upon the creation of a new instance of an object. Thus, the remote global address space manager 160 maintains a register NEXT GID that indicates the next available object identifier for assignment to an instance of an object upon its creation.

Structure of Map Table

As best illustrated in FIG. 7, each map table 120 in the object broker 20 comprises a linear table stored in the memory of the object broker computer, arranged as a plurality of rows of data items, each item arranged in columns of like types of data items. In the preferred embodiment, the data items include the object identifiers or indicia (also called object ID or OBJID), TABLE_NAME, STATUS, and LOCATION. There is a record (a row) comprising a plurality of items associated with each object identifier for which data is stored anywhere in the system, globally. There can be a plurality of entries for a given object identifier. There will be at least one entry for each instance of an object created in the system; for each instance of an object created by any of the remote databases, there will be at least one entry in the map table 120. Thus, the map table 120 is generally consulted, and is indexed, by object identifier and location.

The TABLE_NAME field stores information indicating which object attribute table (OAT) at the location indicated in the LOCATION field contains information relating to the identified object. For example, for the object identifier 0011 at location RDB 1, there is information stored in the object attribute table OAT1. This indicates that for the particular object in question, 0011, selected attributes pertaining to that particular object are stored in object attribute table 1 at remote database 1.

The STATUS field contains information indicative of the status of information at a given remote database. In the preferred embodiment, the STATUS field comprises a time stamp indicative of the date and time of last updating of information pertaining to that particular object identifier at the specified location. In the example of FIG. 7, it will be noted that data associated with object identifier 0012 at location RDB2 has a time stamp of "Date n+3", while the stone object identifier 0012, located at location RDB1, shows a time stamp of "Date n+1". This indicates that information pertaining to the object 0012 was most recently updated in RDB2, so information contained in the remote computer RDB2 is more current than that stored in RDB1.

The LOCATION field of the map table 120 comprises address information identifying the location of data associated with a particular object identifier. For example, in FIG. 7, the object identifier 0017 has two entries, one indicating information located at RDB3 and another indicating location at RDB4. In actual implementation, the location information is translated to a particular TCP/IP address or to a network port or socket address consistent with the addressing standard of the network type to which the remote database is connected. The location information is used for routing messages from the object broker computer 20 to a selected one of the user computer sites 12, via the communications links.

It is possible that, given a particular request message from a requesting institution, the assembly of a complete snapshot of information pertaining to a given object may be obtained by retrieving information from several different remote databases, and/or several different fields contained therein. Thus, the most current information as to an employee's hiring date may be stored in an object attribute table in a first remote data base (e.g., an EMPLOYEE object attribute table maintained at RDB2), while that person's most current address may be stored in a different object attribute table in a second, different remote database (e.g., a PERSON object attribute table maintained at RDB1). The present invention allows for this situation seamlessly and invisibly to users. This type of operation is also termed a "cross server join", in that it comprises the retrieval and joining of information from different client sites.

Structure of Object Index Tables

FIG. 8 illustrates exemplary object index tables 130 that are stored in the object broker 20. A searchable object index table relates predetermined search fields to object identifiers (OBJID), thereby allowing allow rapid searching to associate information indicative of a predetermined object in the object model to its associated object identifier.

Four examples of object index tables are provided in FIG. 8, a person index table (PERSON_IDX) 130a, an employer index table (EMPLOYER_IDX) 130b, an employee index table (EMPLOYEE_IDX) 130c, and a visit index table (VISIT_IDX) 130d. The person index table 130a and the employer index table 130b are base tables, while the employee index table 130c and visit index table 130d are junction tables, as they point or refer to information in base tables via object identifiers. The base IDX tables relate primary information such as a person's name, or employer name, or provider name, to its associated object identifier. The junction-type IDX tables typically relate object identifiers for one type of object to object identifiers of another type of object.

Thus, it will be noted that the EMPLOYEE_IDX junction table includes object identifiers for employee, employer, and person. For example, given an object identifier for a particular employee (e.g., employee OBJID 1456 in the EMPLOYEE_IDX table 130c), one can determine and retrieve associated employer information such as employer name and address from the EMPLOYER_IDX table 130b since the particular employee OBJID is associated with an employer OBJID 7351, Acme Metals, 456 Peach St. Likewise, one can determine and retrieve associated personal demographic information associated with the employee such as phone, birthdate, or social security number from the PERSON_IDX table 130a since the particular employee OBJID is associated with a person OBJID 0012, John Doe.

As will be known to those skilled in the art, the use of index tables allows for rapid searches since the tables are presorted in alphabetical or numerical order and can be rapidly searched. In the example given of the PERSON_IDX table, predetermined search terms such as first_name, last_name, phone, or SSN are provided in sorted columns to quickly find the object identifier for a particular person. For example, if a person's social security number (SSN) is known, then, usually this number uniquely identifies a given person, at least a United States citizen. If data exists for this particular social security number, then the entry into the table (or a search in the table) by social security number will yield an object identifier (OBJID) associated with that particular person.

It will be understood that a person's name (first name and last name) is generally not sufficient to identify a person uniquely. However, it is substantially more likely that a person's full name in conjunction with their date of birth will uniquely identify an individual, since it is statistically unlikely that a person having the same full name will have the same date of birth. Accordingly, an entry into the table by name and birthday (that is, a search based on name and birthday in the conjunctive) will yield an object identifier for that person, if data in the system exists for that person. In the preferred embodiment, the PERSON_IDX table has as primary keys name (first and last), social security number, and birthdate.

Those skilled in the art will understand and appreciate that the index tables 130 illustrated in FIG. 8 are exemplary only, and by no means are intended to be limiting.

Note further that there is provided at least one object index table for each table that resides outside of the object broker. For example, in the preferred embodiment there is an object index table for certain types of objects maintained in the system for which a search can be conducted in order to associate predetermined search information with object identifiers. Object index tables need not be maintained for all types of objects, only those for which searching is allowed. Preferably, an object index table is provided for major types of objects that possess attributes for which searching is desired. It will of course be understood that in the health care example being discussed, the identity of principal entities such as the name of a patient, an insured's name under an insurance policy, etc. and other principal types of objects will require the creation of an object index table.

The object index tables 130 are created and maintained in the object broker 20, as has been described. In order to maintain these tables, it is preferable that information generated and stored at the remote databases in association with the respective object identifiers be transmitted to the object broker synchronously with the creation of the instance of the object, so that the object broker can update its object index tables and map table to reflect the existence of data on a given object and the location of data relating to that object. However, it will be understood and appreciated to those skilled in the art that the object identifiers could also be transmitted asynchronously with the creation of the instance of the object.

Remote Heterogeneous User Computers

Figure 9:
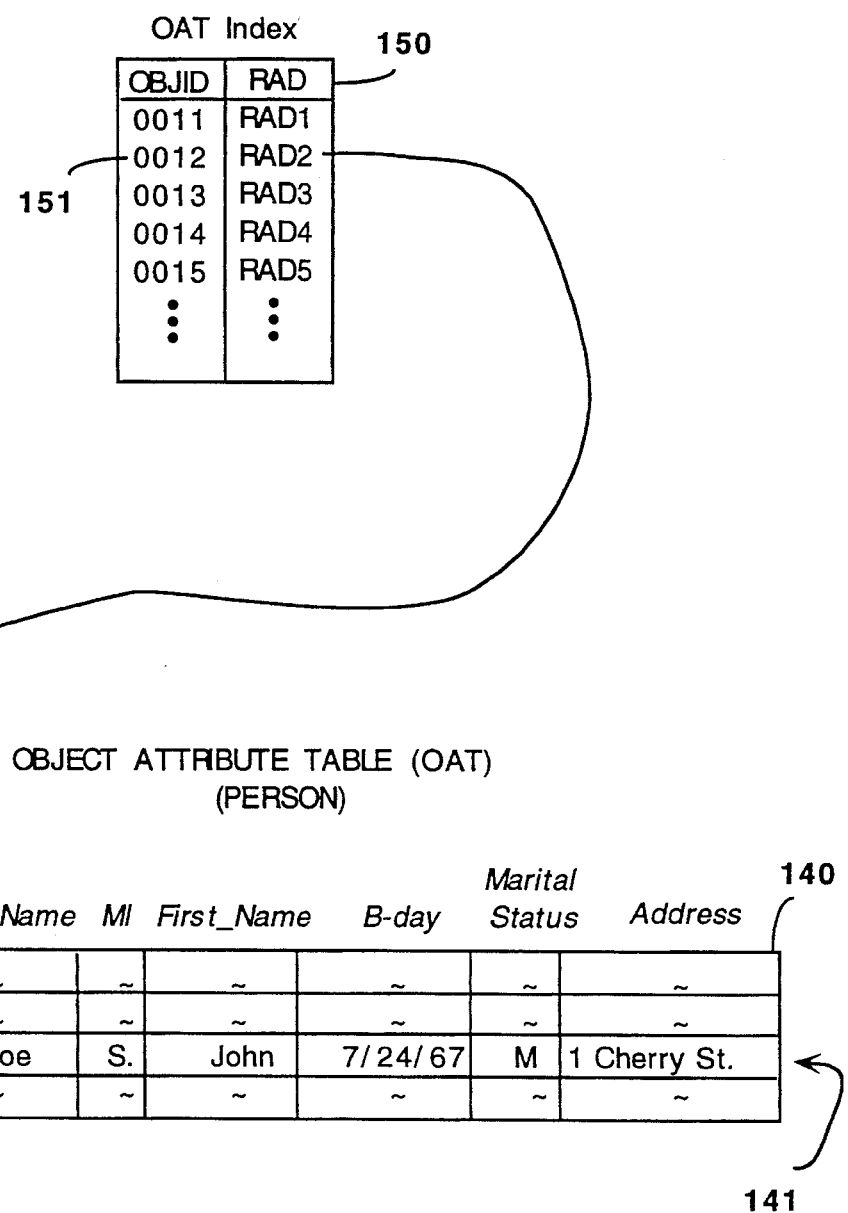
FIG. 9 shows an exemplary Object Attribute Table (OAT) and Object Attribute Table Index (OATIDX) provided in a remote site in accordance with the preferred embodiment of the present invention.

It will be recalled from the discussion above that the user computer sites 12, which typically comprise customer databases with heterogeneous data models or structures, are remotely located (distributed) and communicate with the object broker 20 through remote databases 28. Furthermore, it will be recalled that each of the remote databases maintains object attribute tables 140 and corresponding object attribute table indexes 150. Referring now to FIG. 9, within each of the remote databases 28 there is maintained an object attribute table 140 that relates particular object identifiers with particular data items (specific attributes) stored in the user's computer associated with that object identifier.

The object attribute tables 140 are associated with the remote databases 28 (such as RDB1 in FIG. 1), and are the result of the mapping or association of data stored in a customer's database 26, such as the database RDB1. In embodiments of the present invention that utilize separate computer systems for the remote databases 28, the object attribute tables 140 preferably comprise separate data structures stores in the memory of the remote computers 28. Alternatively, it will be understood that an object attribute table can be created and stored within memory at a single client site 12 that comprises a customer's proprietary database 26 and the processes associated with operation of the remote databases 28.

Structure of Object Attribute Table (OAT) and Object Attribute Table Index

In the preferred embodiment, there is an object attribute table stored for class of objects in the object model. In FIG. 9, each object attribute table 140 comprises a plurality of rows or records, each row or record comprising a plurality of data items or attributes. Each data item or attribute relates to a column heading indicative of the type of data item associated with a given object. For example, in the example given, the PERSON object attribute table 140 includes the object identifier (OBJID), Last_Name, middle initial (MI), First_Name, birthday (B-day), Marital status, Address, etc.

Although there may be other attributes, for purposes of simplicity and explanation it will be assumed that the only fields or attributes present are those indicated in FIG. 9. There is an object attribute table 140 for each different type of object, data for which is stored at a given user computer site 12 in the associated remote database RDBn. Referring to the exemplary system of FIG. 1, there will be a PERSON object attribute table in user computer 1 (which is associated with an insurance company), in user computer 2 (which is associated with an employer), in user computer 3 (which is associated with a hospital), and in user computer 4 (which is associated with a PPO/HMO/TPA). However, it should be understood that while all applications of the present invention will require an object attribute table of the same type in each remotely located user computer for each type of object having data stored at that remote location, an object attribute table need only store an object instance having associated data stored in the associated user's computer.

It will be understood that the creation and maintenance of an object attribute table 140 at the user computer sites 12 is carried out by code associated with the remote databases RDBn such as that indicated at 28 in FIG. 1. Again, the preferred embodiment utilizes a SYBASE relational database engine running at the remote databases 28 for creating, indexing, and maintaining these tables. Because of the number of different types of objects, programmers will need to allocate storage space sufficient to keep track of the expected number of instances of the various types of objects that will be maintained at that particular user computer site. For example, a hospital computer system will need a relatively large database to store information relating to patients and visits, but may not need to maintain a particularly large database relating to insurance carriers since there will be a relatively small number of different types of carriers that exist within a given system.

Information in each object attribute table 140 stored at a user computer is accessed via an object attribute table index 150. Each entry in the object attribute table index 150, such as the record 151, relates a given object identifier (OBJID) to a record address (RADn) that points to a given record in an object attribute table 140 such as the record 141. In the example shown in FIG. 9, for the object identifier 0012, record address RAD2 points to record 141, so that a search based on object identifier 0012 can quickly locate the relevant fields of information (attributes of the object) within the storage structure of the remote databases 28 associated with the user computer sites 12.

Application Program Interface (API) Between Object Broker and Remote User Computers An application program interface (API) between the object broker 20 and the remote databases 28 provides the communication mechanism and protocol for the various operations carried out in the preferred embodiment of the present invention. The object broker API 36 (FIG. 1) comprises a plurality of commands and responses to commands in the form of messages passed between the object broker 20 and the remote database computers 28. It should be noted in this regard that the messages passed between the object broker 20 and the remote databases 28 are not those type of messages that are passed between objects in conventional object-oriented programming. Rather, the messages comprise specific requests (e.g. SEARCH, GET, ADD, UPDATE) and specific responses to such requests. The program operating in the object broker 20 is responsible for assembling a message for transmission over the communication link 22 to a selected remote database 28, depending on the LOCATION information that is determined as a result of first consulting one or more object index tables 130 to retrieve an object identifier, and second consulting the map table 120 to obtain a location where desired information is stored in one of the remote databases associated with the retrieved object identifier.

The messages implemented in the object broker API 36 include an ADD request message, a SEARCH request message, a GET request message, and an UPDATE request message. While there are various scenarios associated with these various types of requests, it will be understood that these messages comprise the basic set of commands provided between the object broker 20 and each of the remote databases 28, to carry out the functions associated with the present invention. The messages communicated between the object broker 20 and the remote databases 28 are generally of the same basic form, and are typically initiated with a similar corresponding message received by a remote database 28 from its associated customer database 26 at a requesting customer site 12. For example, in the first scenario to be described, an ADD request message originating at a customer database (e.g. 26*a*) results in an add_<class_name> message being generated at the associated remote database (e.g. 28*a*) and transmitted to the object broker 20, which in turn generates corresponding messages to one or more other remote databases (e.g. 28*a*, 28*b*, 28*c*).

ADD Request Message

Figure 10:
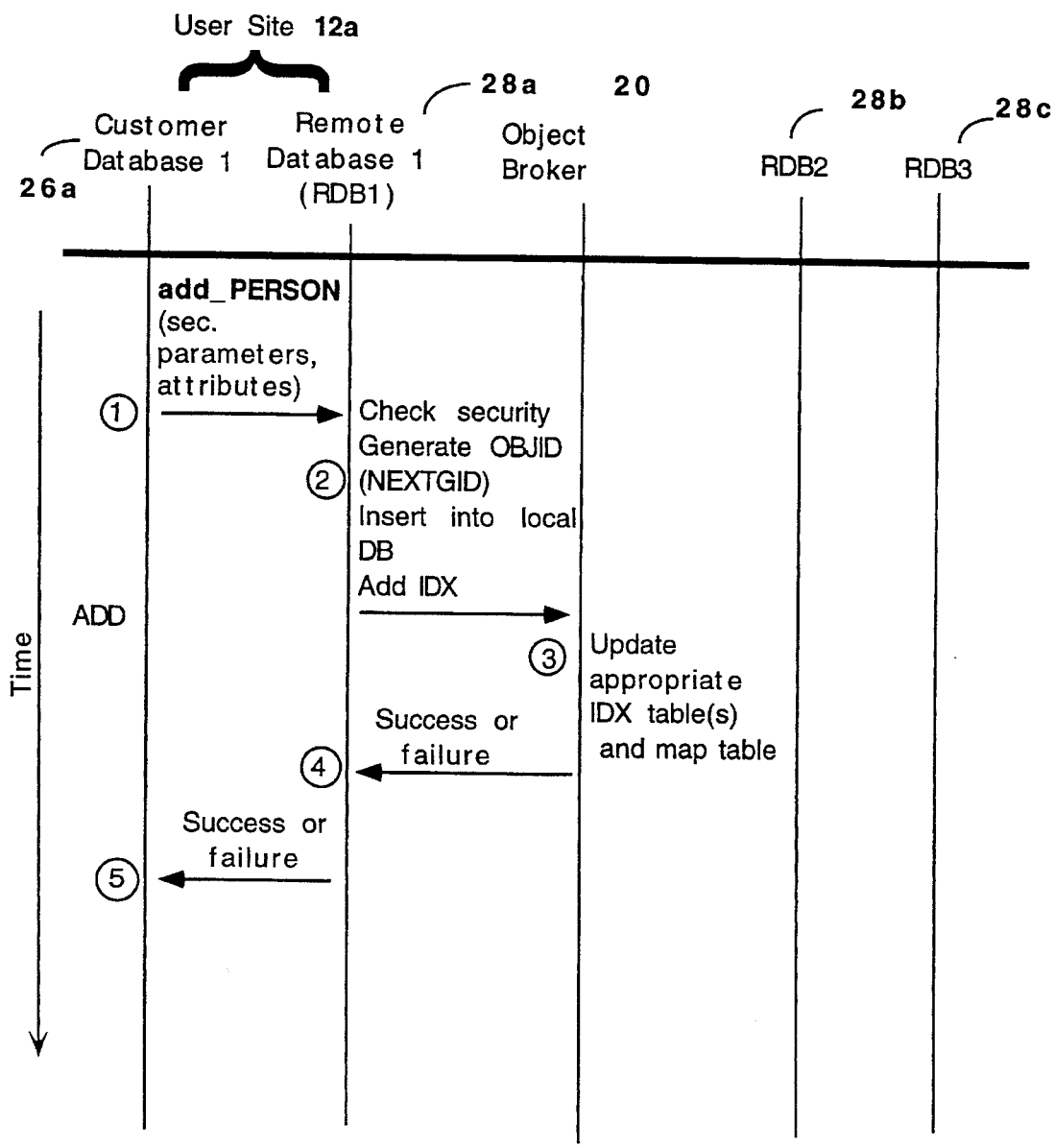
FIG. 10 is a request message flow diagram illustrating the operation of the ADD message as utilized in the preferred embodiment of the present invention.

Turning next to FIG. 10, the steps taken in the preferred embodiment to implement an ADD request message are illustrated. The ADD request message comprises a communication initiated at a user computer site 12 to the object broker 20, and the response from the object broker 20 to the user computer in response to the ADD request. In the example illustrated, the ADD message from a user computer indicates a request to the object broker that a new instance of an object be created, utilizing one of the object identifiers previously provided by the global address space manager 100 and assigned locally by the remote global access space manager 160. The object broker 20 responds to the ADD request message by updating its tables to reflect that new information exists relating to a particular object identifier and the location information associated with that object identifier.

In the example in FIG. 10, it is assumed that the action is initiated from a customer database 26*a* and associated remote database 28*a*, both of which are associated with a customer site 12*a*. Thus, program code associated with the customer database 26*a* is executed to formulate the message in a format that is recognized by the remote database 28*a*. In one example, it may be assumed that a terminal (e.g., a PC 49 in FIG. 2) associated with the user computer site 12*a* is operative to run a Patient Information Application computer program (described in greater detail below). This computer program creates and transmits appropriate messages to the remote database 28*a*, via the LAN.

At step one, a request message of the general form:

add_<class_name> (security parameters, instance attributes)

is communicated between the customer database 26*a* and the remote data base 28*a*, where the information in bold print is literally typed in by the user, the information in <> must be substituted (i.e., the actual class name from the object data model must be entered), and the information in parentheses () is for actual parameters or arguments. "Security parameters" comprises user identification information used to identify which users may have access to certain information. "Instance attributes" comprises additional arguments that pertain to the instance of the object that is to be created, which may include search arguments. The instance attributes may also include an object identifier (OBJID), as when a request message is transmitted from the object broker 20 to a remote database 28 to cause the remote database to add an existing object and its attributes to the remote database.

For example, the following message might be used to add an instance of a person, assuming the object model of FIG. 5 and the attributes for inclusion in the object attribute table (OAT) 140 in FIG. 9:

add_PERSON (MyPassword, Last__Name, MI, First_Name, B-day, Marital Status, Address)

The security parameter "MyPassword" indicates a security password for the user initiating the operation, which of course is unrelated to the information associated with the person whose demographics are being added.

In systems comprising physically distinct computers, the add_<class_name> is communicated by a data communication link such as a LAN between the customer database 26a and the remote database 28a. In systems involving a single physical computer that runs different processes associated with the customer database and the remote database, an add_<class_name> command as described is placed into a queue for processing.

The remote database 1 28a receives the add_<class_name> message. At step two in FIG. 10, the remote database 1 28a verifies the security parameters (e.g. MyPassword) to ascertain whether the user that initiated the request is permitted access to the global system for purposes of carrying out these operations. Password-based security procedures for such operations are considered within the skill of the art. In the event that the security check clears, the remote database 28a generates a new object identifier (OBJID), denominated by the value NEXTGID maintained by the remote global address space manager 160. The object identifier derived from the NEXTGID register is inserted into the remote database RDB1 in association with data fields relating to this particular object. In particular, the new object identifier OBJID is stored in an object attribute table 140 in association with the attributes provided in the message, and the object attribute table index 150 in RDB1 is updated to reflect the entry of the object identifier and the pointer to the data fields or attributes associated therewith.

Also in step two of FIG. 10, a message is generated to the object broker 20. At this stage, a message is formatted for communication via the communication link to the object broker 20. This message comprises the message "Add IDX", which includes the new object identifier OBJID and the value of any search term(s) that would be included in the object index tables 130 that are maintained by the object broker 20. This message is then transmitted by the data communications link to the object broker 20.

At step 3, at the object broker 20 any object index table(s) 130 relating to this particular type of object are updated. This entails insertion of the new object identifier and related search terms into the appropriate index table for that particular type of object. These search terms are typically primary keys. For example, if the instance being added is a person, then the PERSON_IDX table as shown in 130a (FIG. 8) is updated to insert the object ID and appropriate search terms such as ssn (social security number), first_name, last_name, birth_date, which are all primary keys in the disclosed embodiment. Likewise, the map table 120 is updated to reflect the presence and location of data relating to the new object.

At step 4, the success or failure of insertion operations at the object broker 20 is returned as the response to the remote database 28a. A failure condition would exist, for example, if the object broker was unreachable or if the object was already present in the index table.

At step five, the success or failure of the add_PERSON message is then passed from the remote database 28a back to the customer database 26a, and the operation is complete.

SEARCH Request Message

Figure 11:
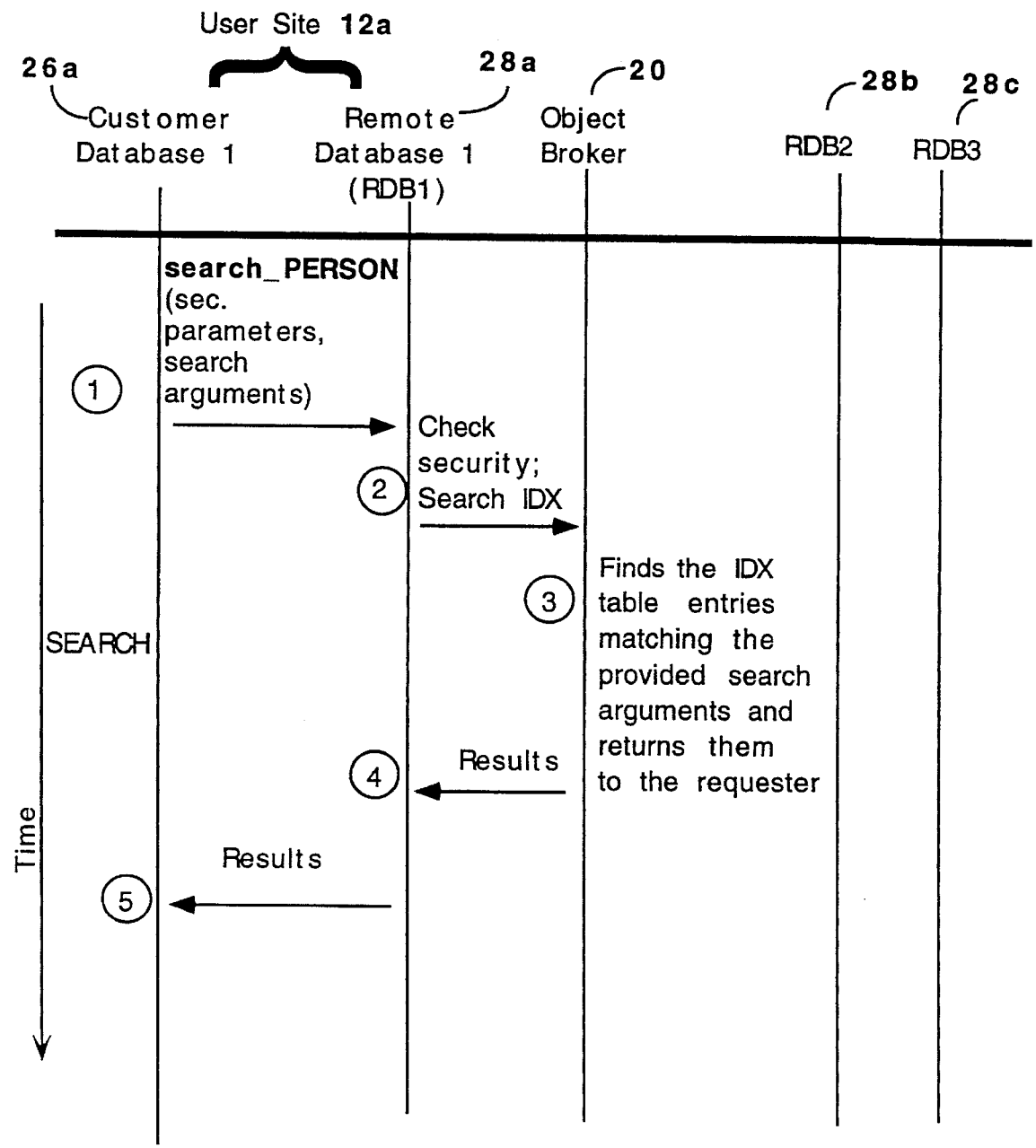
FIG. 11 is a request message flow diagram illustrating the operation of the SEARCH message as utilized in the preferred embodiment of the present invention.

FIG. 11 illustrates the steps taken in the preferred embodiment to implement a SEARCH request message that is passed from a user computer site 12 to the object broker 20. The SEARCH message consults appropriate object index tables 130 in the object broker and returns a result that data associated with a particular argument exists on the network, by providing an appropriate object identifier. Again, it is assumed that the search is initiated at a process associated with a customer database 26, which is passed to a remote database 28 associated with the customer database in the user computer site 12, and the remote database 28 communicates with the object broker 20.

At step one, a request message of the form:

search_<class__name> (security parameters, search arguments)

containing the requisite search arguments is provided from the customer database 26 to the remote database 28. Only particular predetermined search terms (e.g. primary keys) are permitted in the preferred embodiment, although it will be understood that more complex searches could be formulated using Boolean operators upon other types of information to derive a selected search term that is indexed and maintained at the object broker 20. In the preferred embodiment, however, the user has no control over the search parameters that are predetermined by the search operation.

At step two, again security is checked to ascertain access privileges, typically by user password. A "Search DX" message is then formulated at the remote database 28, and communicated via the communication link 22 to the object broker 20.

At step three, the object broker receives the Search IDX message and, using the search arguments provided therein, finds any entries in a specified object index or IDX table 130 (e.g., the PERSON_IDX in this example) matching the provided search arguments and prepares them for return to the requester. As will be recalled from the discussion above in conjunction with the structure of the object index tables, in the event that a particular row matching all supplied search arguments is present in the object index table, there will be at least one result row yielding at least one object identifier OBJID.

At step four, if the search yielded results of an object identifier, the object identifier OBJID is returned to the remote database 28, which in turn is passed back to the customer database 26 at step 5. On the other hand, if the search was unproductive or there is no data in the system pertaining to the particular search term, the results indicate that no object exists relating to the search term(s) provided. Under certain circumstances, after an unproductive search the user will follow up with an ADD request message to cause insertion of information pertaining to a particular object such as a person. On the other hand, under other conditions, a search that is in error indicates that the search was conducted erroneously, perhaps using incorrect search arguments.

GET Request Message (Basic)

Figure 12:
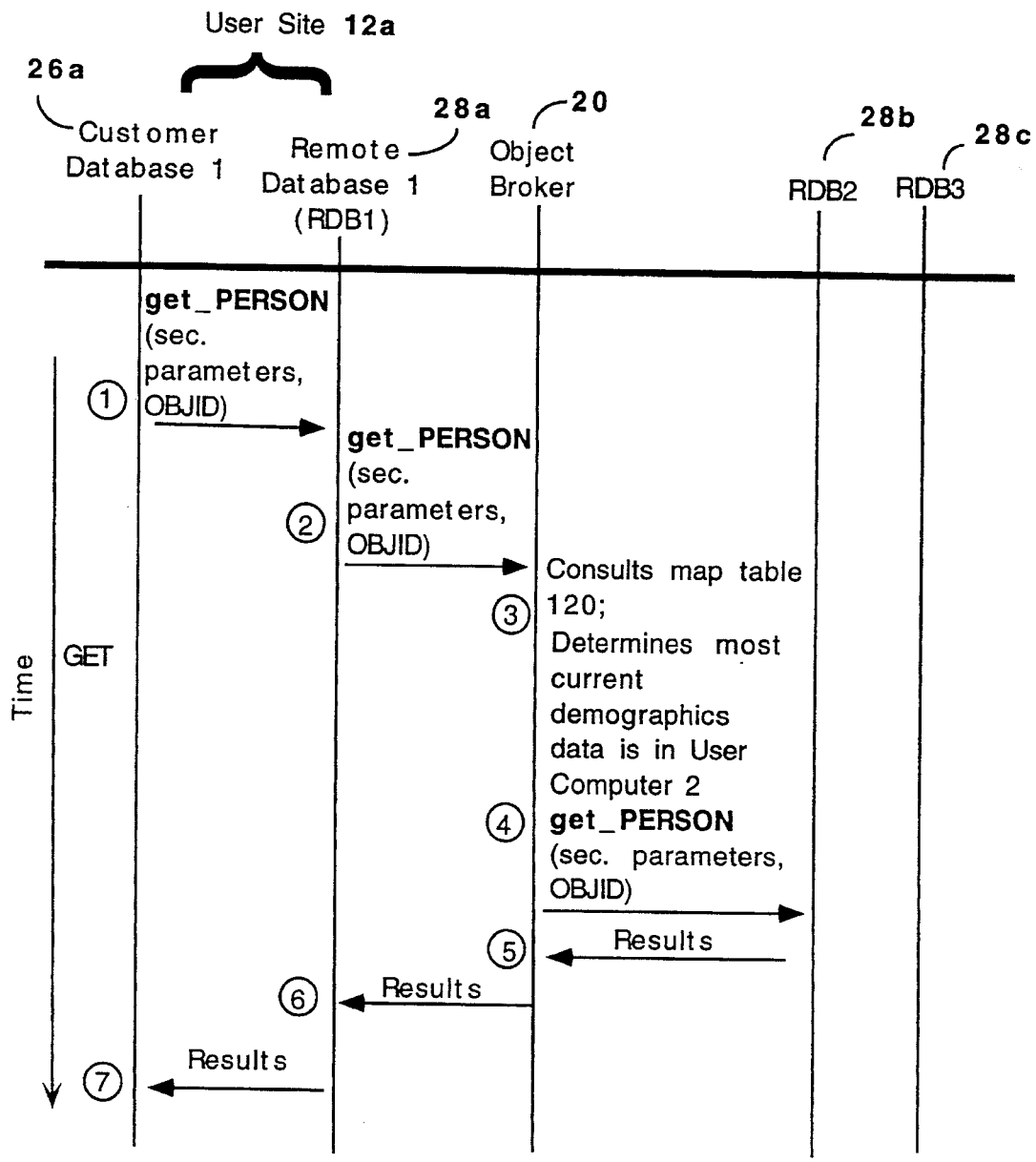
FIG. 12 is a request message flow diagram illustrating the operation of the GET message as utilized in the preferred embodiment of the present invention.

FIG. 12 illustrates the steps taken in the preferred embodiment to implement a GET request message that causes the retrieval of data requested by a requesting user at a user computer site 12a, that is ultimately maintained in a different remote user computer such as 28b at a different site 12b. It is again assumed that the user computer site 12a comprises the separate customer database 26a and remote database 28a. It is further assumed, in most cases, that a previous SEARCH has been conducted, yielding an object identifier (OBJID). However, for purposes of FIG. 12, a simplified example will be described first, before a more complex example as described in connection with FIG. 13 which involves communications between the object broker 20 and more than one remote user computer.

At step 1 in FIG. 12, a request message of the form:

get_<class_name> (security parameters, OBJID)

based on a particular object identifier is formulated and provided from the customer database 26a to a remote database 28a. In the illustrated example, the get request message is formulated for the class name PERSON.

At step two, the remote database 28a passes the get_PERSON (security parameters, OBJID) request message via the communication link to the object broker 20.

At step three, the object broker 20 consults the map table 120 to obtain the location of the demographic information in the form of object attributes that are most current with respect to the particular object identifier in question. It should be understood that the map table may include more than one entry for a given object identifier, and that information relating to the particular object identifier may be in varying states of currency. It is an objective of the present invention to provide a distributed computing system that allows for identification of the most current information relating to a particular object, and provision of such most current or updated information in response to commands to retrieve such information. In order to satisfy this objective, then, in example shown in FIG. 12, it is assumed that the most current demographic data associated with a particular object identifier is stored in user computer site 2 at 12b, in RDB2 28b.

At step four, a corresponding get_PERSON (security parameters, OBJID) request message is formulated to the selected user computer, in this case RDB2 28b.

At step five, the results of this operation, comprising data items or attributes associated with the object identifier, are retrieved by the remote database 2 28b from its data storage facilities and returned to the object broker 20, which returns the result at step six to the remote database 28a. At step seven, the remote database 28a returns the information and results to the customer database 26a.

GET_ALL Request Message (One-to-Many)

Figure 13:
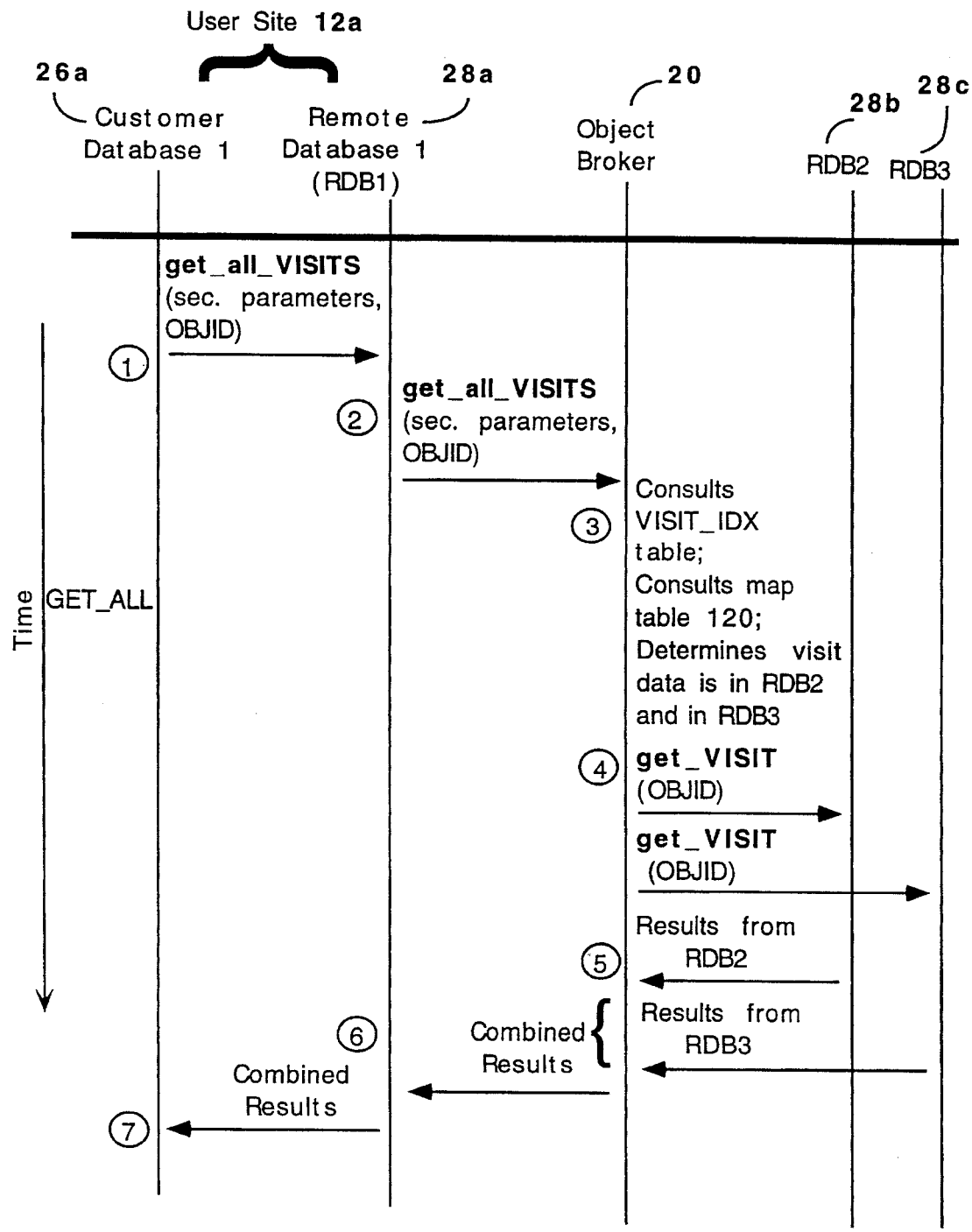
FIG. 13 is a request message flow diagram illustrating the operation of the GET_ALL message as utilized in the preferred embodiment of the present invention.

FIG. 13 illustrates the steps taken in the preferred embodiment to implement a more complex scenario involving a GET operation, bearing certain similarities to FIG. 12, except involving communications to more than one user computer 12. In this scenario, a get_all_<class_name> request message is formulated for objects of the class VISIT. In other words, the scenario in this figure contemplates the retrieval of information related to a plurality of instances of VISIT objects, for example, all the visits associated with a particular person's object identifier.

For a get_all_type request message, the following general message format is utilized:

get_all_<class_name> (security parameters, OBJID)

Again, the bold letters are entered literally, the characters between and include the <> symbols replaced by a particular class name, and the items in parentheses are entered within parentheses.

Prior to beginning the discussion, it will be recalled from the discussion above in connection with FIG. 8 that a junction table such as EMPLOYEE_IDX allows determination of the relationship between employees, employers, and persons. Given an employee object identifier, an associated employer object identifier and person object identifier can be obtained, by reference to the EMPLOYEE_IDX junction table.

In like manner, the VISIT_IDX table 130d is a junction table that allows the determination of the relationship between visits and persons. The VISIT_IDX table 130d in FIG. 8 relates person OBJIDs to providers OBJIDs and visit OBJIDs. Other information of interest in the VISIT_IDX table includes admit_date, which attaches to a particular visit. Accordingly, it will be understood that given a particular person object identifier, person(OBJID), the visits associated with that person can be identified by consulting the VISIT_IDX table to obtain visit object identifiers visit(OBJID) containing detailed attributes associated with visits by that person to particular health care providers, which are identified by their provider (OBJID).

In FIG. 13, a message of the form get_all_VISITS (security parameters, OBJID) is utilized. The request message involves the provision of a predetermined object identifier, with the objective of obtaining related object identifiers and information related to particular transactions or events associated with the identifier. For example, a get_all_VISITS request message contemplates the provision of an object identifier for a particular person, such as a patient, and to retrieve data associated with visits of that particular person to different health care service providers, such as hospitals, physicians, laboratories, etc. from one or more remote computer systems. Accordingly, it will be appreciated that a get_all operation is an example of the implementation of a "one-to-many" relationship described above in connection with relational database methodologies.

It should be understood from the outset that the object index tables 130 maintained at the object broker 20 relate to every object stored in remote databases associated with the system. Thus, the object-oriented methodology contemplates the creation of objects via the assignment of object identifiers, even though certain types of objects may not be directly "searchable" in the system. Such is the case for visits by a patient to health care suppliers, and other purely junction table objects. Visits, even though identified by object identifiers, are considered "associative entities", because they associate one type of object (e.g. a person) to another type of object (e.g. a provider). Such associative entities are not directly searchable in the preferred embodiment. Rather, visit object identifiers are usually identified by referencing a person object identifier or a provider object identifier.

Therefore, in FIG. 13 it is assumed that a number of different remote databases such as 28b and 28c contain visit information associated with the same patient, identified by visit object identifiers visit(OBJID). The objective of the get_all_request message is to retrieve this information from the different remote sites. It is also assumed that a particular person object identifier person(OBJID) has already been obtained, as via a prior SEARCH operation.

At step one a request message in the form:

get_all_VISITS (security parameters, OBJID)

is provided from the customer database 26a to the remote database 28a. The object identifier is a person object identifier.

At step two, the get_all_VISITS request message is provided from the remote database 28a to the object broker 20.

At step three, the object broker 20 consults the VISIT_IDX table 130d to derive a list of visits, by visit object identifier, associated with the person object identifier. Then, the object broker consults the map table 120 to determine the locations of the remote databases such as remote databases 28b and 28c to ascertain which remote database computers maintain object attribute tables for the visits that are associated with the particular person. In other words, if a particular person associated with a given object identifier is associated with visit data at a given remote, there will be a visit object attribute table 140 stored at the user computer that stores the visit object attributes. Consulting the map table yields the location of the visit objects associated with visit object identifiers in the list. It is determined that visit data is in remote database 2 28b and in remote database 3 28c.

Stated in yet other words, the get_all_ request message contemplates chasing a one-to-many relationship, with the result of the assembly in the object broker 20 of a virtual table that contains the object attribute information pertaining to visits obtained from a plurality of remote databases. The information is collected and then transmitted as a result to the requesting computer, which in this case is the user computer 26a.

At step four, the object broker 20 provides a get_VISIT request message to the remote database 2 28b for each visit OBJID identified in the consultation of the VISIT_IDX table and map table, as maintained at the remote database 2 to obtain such visit objects contained therein. Likewise, a similar get_VISIT request message is passed to the remote database 3 28c for each visit OBJID identified as being maintained at the remote database 3 during the consultation of the VISIT_.IDX table and map table.

At the remote database 2 28b and the remote database 3 28c, for each get_VISIT request the object identifier for the visit in question is consulted in the appropriate object attribute table index 150 (in this case, a visit object attribute table), which points to the appropriate visit data attributes stored in the particular selected remotes. It will thus be understood that the object attribute table index 150 points to a visit object attribute table 140, similar to that illustrated in FIG. 9, to retrieve the selected visit data associated with the particular person. The retrieved visit data associated with the particular person is returned from each of the remote databases 28b, 28c to the object broker 20.

At step 5, in the object broker 20 the results from the remote databases RDB2, RDB3 are combined in a virtual table that is constructed for the purpose of satisfying this particular operation. In particular, a "distributed join" operation is effected in the object broker, wherein the combined object attributes, such as visit data, in tabular form, are arranged for transmission to a requesting user computer 12a.

At step 6, the combined results, comprising visit data associated with a plurality of visits for this particular person, are transmitted from the object broker 20 via the data communications link to the remote database 28a. It will therefore be appreciated that the foregoing illustrates the function carried out in the present invention of redirecting requests to the remote sites, and combining results from multiple remote sites into a single response to a request from a remote site.

At step 7, these combined results are transmitted or otherwise communicated to the customer database 26a, which typically then will display, store, print, or otherwise utilize the information.

UPDATE Request Message—Date in Same Remote as Updating Remote

Figure 14:
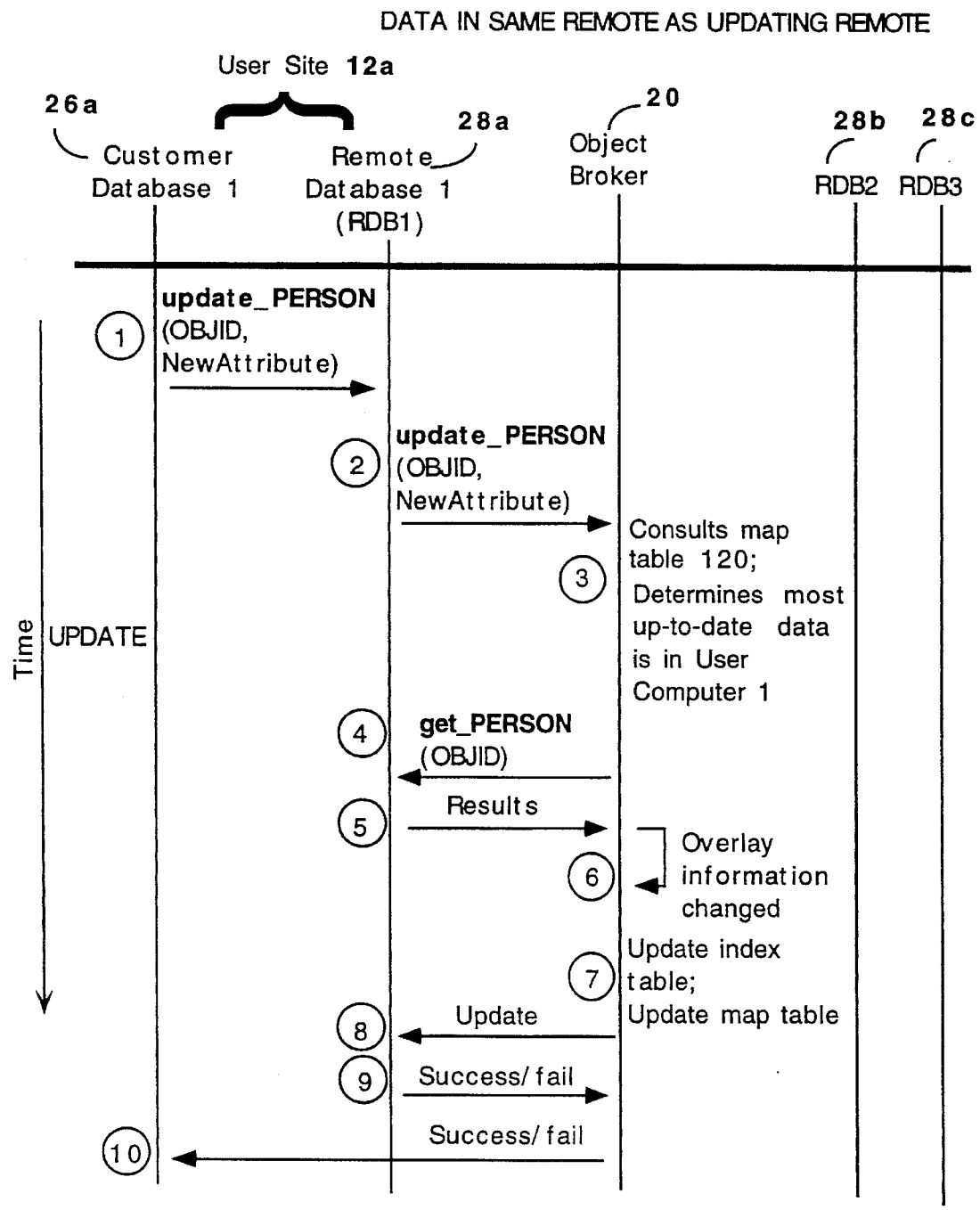
FIG. 14 is a request message flow diagram illustrating the operation of the UPDATE message as utilized in the preferred embodiment of the present invention, involving data in the same remote as the updating remote.

FIG. 14 illustrates the steps taken in the preferred embodiment to implement an UPDATE request message which is effected in the present invention to reflect a change to one or more attributes of an object. In other words, the UPDATE operation adjusts the appropriate tables in the appropriate remote location, and assigns a time stamp or other status information to indicate where the most current information is with respect to a particular object in the system. These steps are taken when a user at a customer database, such as 26a in FIG. 1, has new data (e.g., certain attributes have changed) and the new data is to be entered into the system for access by others on the network.

The steps illustrated in FIG. 14 initiated at a first user site, such as customer site 12a, cause the retrieval of the most current data associated with a selected object (in this case from the remote database associated with the customer site 12a), updating of one or more attributes corresponding to the selected object, storage of the attributes (the retrieved attributes including any updated attributes) at the first user site, and modification of index and map tables at the object broker to reflect that the most current data on the selected object is now available at the first user site.

At this juncture, it is important to introduce the notion of the "data sanctity rule", which is a significant aspect of the present invention. It will be understood that the present invention provides efficient methods for maintaining and finding information across heterogeneous boundaries, at various distributed different user computer sites. However, these various user computers are usually under the control of different institutional entities; these entities typically have made substantial investments in creating and maintaining their proprietary computer systems. There is great reluctance on the part of such entities to allow information that has been gathered elsewhere, even if it is more current, to be introduced into their system without significant safeguards.

In other words, a user's data has sanctity, and the sanctity of a user's data must be respected. In classic database parlance, safety mechanisms exist in the form of error checking and commit operations, where the validity of data is cross-checked against predetermined safeguards such as variations against existing fields, or other predetermined rules. Only after the security safeguards have been satisfied is there a "commit" operation that causes the data to be entered to replace existing data (only in the requesting remote database).

Similar safeguards to the sanctity of data are provided in the present invention. In the preferred embodiment, data sanctity primarily protects a given client's local data from being changed by another client, although frown a global perspective the data appears to have changed. These safeguards typically manifest themselves in the UPDATE operation, since such operations present the greatest threat to a user's computer system and the sanctity of its data.

Several different scenarios of UPDATE operations are contemplated in the present invention. Typically, each UPDATE operation comprises a series of operations, beginning with (1) a SEARCH to determine if data already exists on a particular object, with the search returning an affirmative answer that data does exist (by receiving an OBJID), (2) a GET operation to retrieve data associated with the particular object since data has been found to exist, (3) a comparison of selected attributes or fields associated with the particular object to determine that certain attributes require change, and finally, (4) an UPDATE to change the data. Not all attributes or fields associated with a given object will require changing or updating. Typically, only certain selected fields require updating. It is contemplated that the UPDATE operation may be permitted only on certain fields and disallowed on other fields containing particularly critical information. For example, an update operation would not be allowed to change an object identifier, and additional safeguards are required for changing primary key fields such as social security number or name and birth date in the same operation.

Three scenarios described in connection with the following figures include case (1) where information on a selected object exists only in the local remote database, e.g. 28a, that initiated the operation; case (2) where an object exists in one or more other remote database such as 28b or 28c and there is a need to update an attribute obtained from such remote computer since the requesting local database has been apprised of a change to one or more attributes of the selected object; and case (3) where information exists in both the requesting local remote database 28a and one or more other remote databases 28b, 28c.

The simplest case, namely, that where the need exists to update information only in the local customer's database 26a is shown in FIG. 14. Again, it is assumed from the outset that a prior SEARCH operation has yielded an object identifier associated with an object having an object attribute to be corrected or updated. In the example of FIG. 14 it is assumed that an object identifier for a particular person has been retrieved as a result of a SEARCH operation, and the search operation has yielded the object identifier for a particular person. It is further assumed that a prior GET operation has yielded the return of object attributes such as address, social security number, date of birth, etc. and that at least one field or attribute is determined to be outdated or incorrect, and is to be updated.

The general form of the UPDATE request message is as follows:

update<class_name> (security parameters, OBJID, NewAttribute)

The syntax is the same as described above for other request messages.

In FIG. 14, the UPDATE operation is performed for an attribute associated with a particular person, e.g., a change in a person's home address. Thus, at step 1 in FIG. 14, a request message of the form update_PERSON(MyPassword, Person(OBJID), NewAttribute) is formulated at the customer database 1 26a based on the object identifier previously obtained, with the class name in the illustrated example being PERSON. The "NewAttribute" is the value of data to be updated, for example, one or more address fields associated with the person's residence. This request message is then passed or otherwise communicated to remote database 1 28a.

At step 2, a corresponding update_PERSON (MyPassword, OBJID, NewAttribute) request message is passed to the object broker 20 via the communication link. Security is checked via the known user password method.

At step 3, the object broker 20 consults its map table 120 and ascertains that the most up-to-date data associated with the particular object attribute in question is located in remote database 1 28a, which happens in this case to be the system that initiated the update operation in the beginning.

At step 4, a GET operation is performed between the object broker 20 and the remote database 28a, passing a get_PERSON (OBJID) message, as described above, based on the object identifier for the person in question to the remote database 28a. This operation results in the retrieval from the local database 28a of the object attributes associated with the object identifier stored in the object attribute table 140.

These results are then passed at step 5 back to the object broker 20. At step 6, the NewAttribute provided in the update request message is overlaid on the retrieved attributes. The overlaying operation is carried out in memory of the object broker computer, the result being the updating of the data field containing the old address with the NewAttribute, i.e., the person's updated residence address.

At step 7 the map table 120 at the object broker 20 is updated to reflect new status associated with the updated attribute so that subsequent queries regarding this particular object will reflect that the most current information relating to this particular object and or its attributes is in remote database 1 28a.

At step 8, an UPDATE request message of the same form update_PERSON(MyPassword, OBJID, NewAttribute) is passed back to the remote database 28a indicating that it may commit the NewAttribute to its object attribute tables 140 and update its object attribute table index table 150. Note in particular that the updated attribute is stored in RDB1 28a, but there is no updating of information back to the customer database 26a; data sanctity has been preserved.

At step 9, the remote database 28a passes a success or fail message back to the object broker 20 indicating that the update operation succeeded or failed. At step 10, the object broker 20 passes a success or fail message back to the customer database 26a. The new attribute is now entered into the system, so that other requesting entities on the network will obtain the updated attribute in response to a GET message based on the object identifier for the object in question.

UPDATE Request Message—Data in Different Remote as Updating Remote

Figure 15:
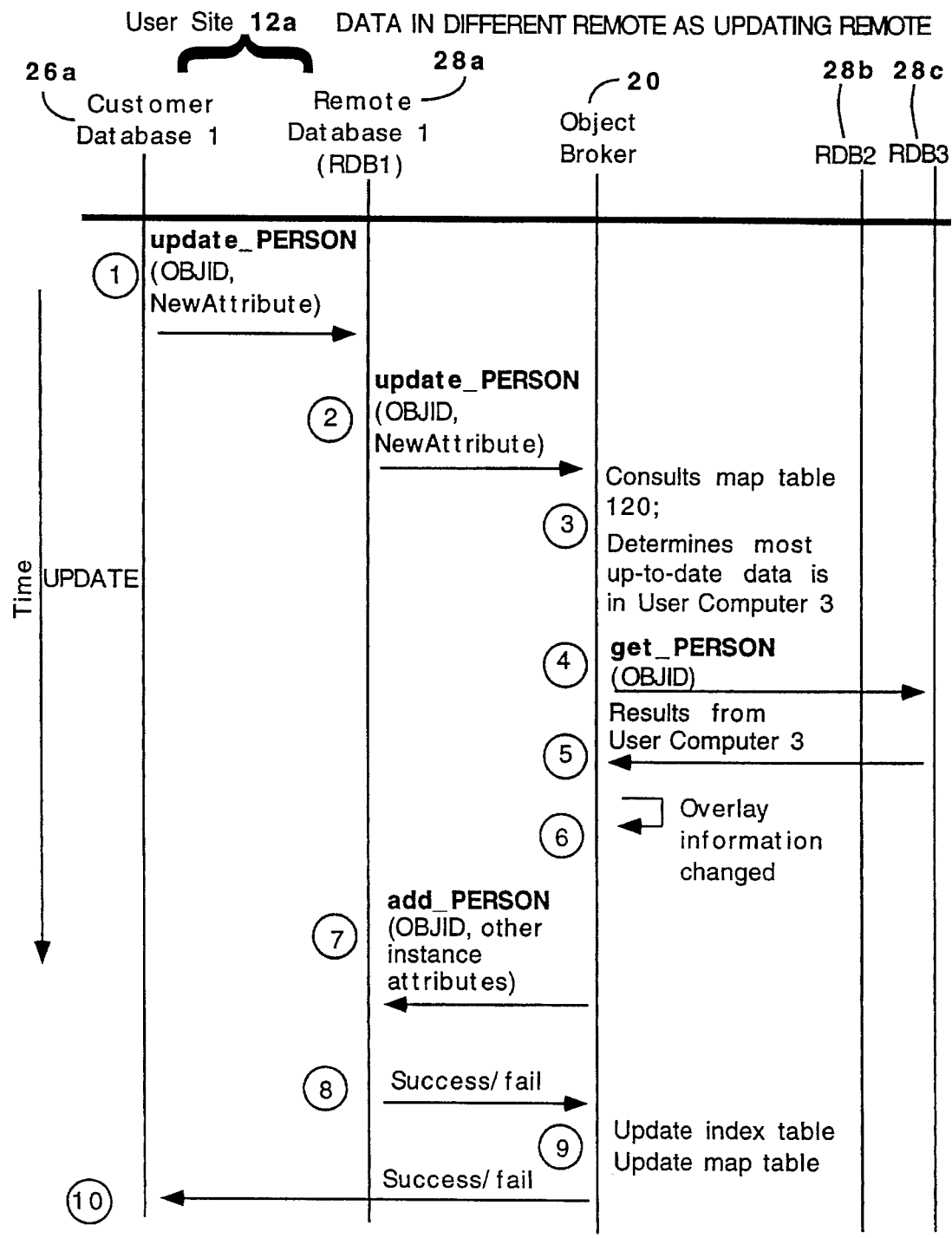
FIG. 15 is a request message flow diagram illustrating the operation of the UPDATE message as utilized in the preferred embodiment of the present invention, involving data in a different remote as the updating remote.

FIG. 15 illustrates the steps taken in the preferred embodiment involving an UPDATE request message where the more current data is derived from a different remote site as the system being update. The steps illustrated in FIG. 15 initiated at a first user site, such as customer site 12a, cause the retrieval of the most current data associated with a selected object from a second user site, such as customer site 12c, updating of one or more attributes corresponding to the selected object, storage of the attributes (the attributes retrieved from the second site, including any updated attributes) at the first user site, and modification of index and map tables at the object broker to reflect that the most current data on the selected object is now available at the first user site.

Again, it is assumed that a prior SEARCH operation has yielded an object identifier associated with an object having an object attribute to be corrected or updated. In the example of FIG. 15 it is assumed that an object identifier for a particular person has been retrieved as a result of a SEARCH operation, and the search operation has yielded the object identifier for a particular person. It is further assumed that a prior GET operation has yielded the return of object attributes such as address, social security number, date of birth, etc. and that at least one field or attribute is determined to be outdated or incorrect, and is to be updated. Finally, it is assumed that no data on the selected object is stored in the remote database associated with the requesting customer site.

The scenario of FIG. 15 is similar to that described in connection with FIG. 14, except that the consultation of the map table 120 at step 3 determines that the most up-to-data on an object having an attribute to be updated is in a remote user computer other than the requesting remote, such as remote database 3 28c. Thus, at step 4, the map table has indicated that the get_PERSON (OBJID) should be transmitted to the remote database 3 28c. The results of the get_PERSON (OBJID) operation at step 5 are provided to the object broker 20, and the new attributes are overlaid upon the old attributes at step 6. Because of the data sanctity rule, the updating information is not provided to the remote database 28c, since in the present invention the remote user computers such as 28c are not ordinarily updated with more recent information provided from another user computer such as 28a. To do so would be a violation of the data sanctity rule. Accordingly, in the present invention, the updating operation is reflected back to the remote database 28a.

It will be recalled that this scenario contemplates that no data on the selected object exists in the remote database (e.g. 28a) associated with the requesting customer site (e.g. 12a). Thus, steps are taken next to add the object to the remote database at the requesting site. At step 7, a request message of the form add_PERSON (OBJID, instance attributes) is passed from the object broker 20 back to the remote database 28a, so that the object and its attributes (now including the updated attribute) is entered into the remote database. For example, if the attribute being updated is a person's telephone number, all of the selected person's attributes including the updated telephone number are now reflected in the object attribute table in the remote database 28a, since the selected person has been added to the remote database 28a, which previously had no data on this person.

At step 8, the remote database 28a passes a success or fail message back to the object broker 20 indicative of the success or failure of the addition of the selected person to the system.

At step 9, the object broker 20 updates its map table and index table(s) to reflect that the remote database 1 28a now has the most current information relating to this particular attribute associated with this particular object, and the associated time stamp is associated therewith. This effectively makes the entry in the map table in the object broker 20 reflect that more current information is now stored in the remote database 1 28a as opposed to remote database 3 28c, which was the most current information prior to the update operation.

In step 10, the object broker 20 transmits a success or failure message back to the customer database 26a.

Figure 16:
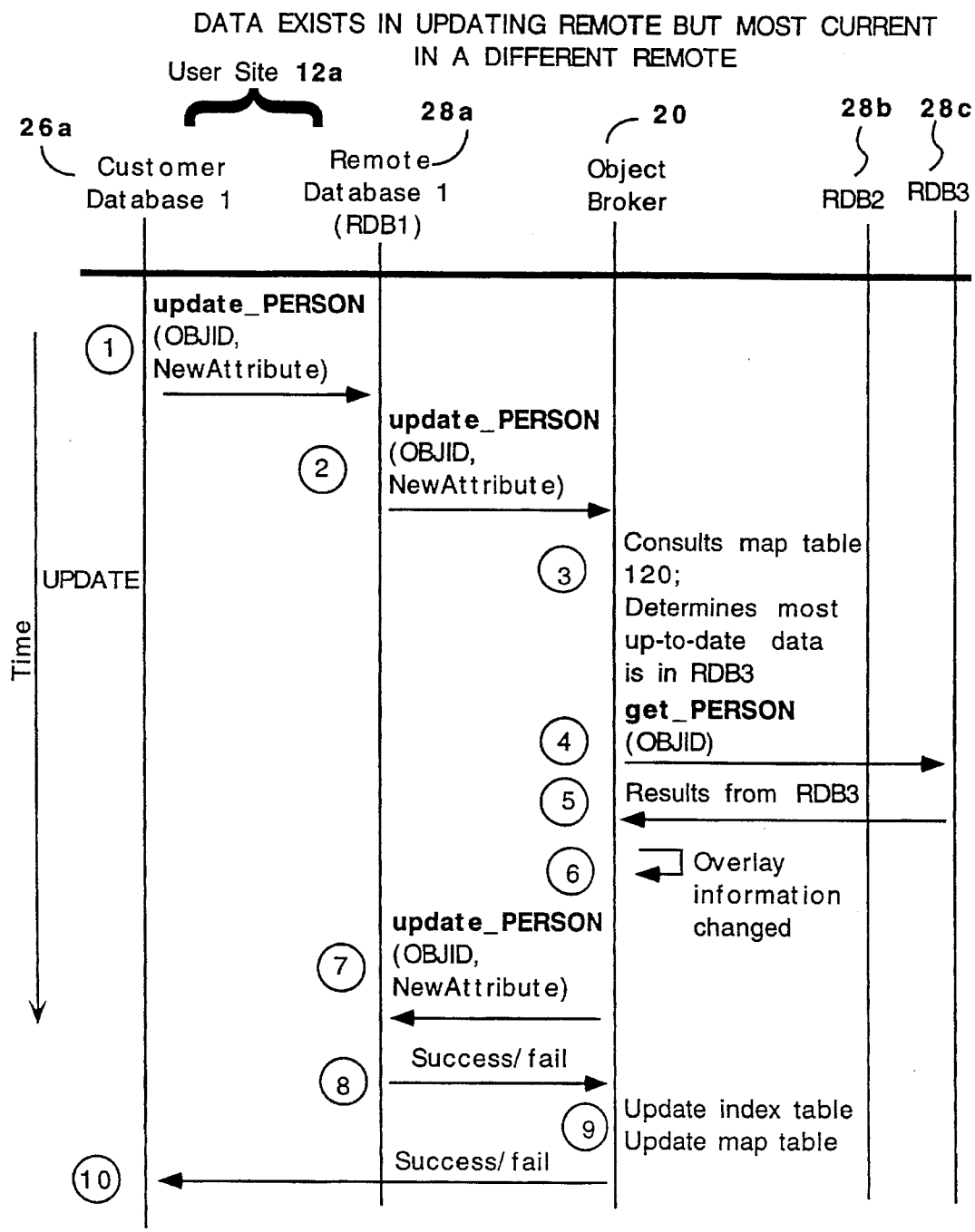
FIG. 16 is a request message flow diagram illustrating the operation of the UPDATE message as utilized in the preferred embodiment of the present invention, involving data stored in both the updating remote and in a different remote, with the most current information stored in the different remote.

UPDATE Request Message—Data Exists in Updating Remote But Most Current in Different Remote as Updating Remote FIG. 16 is another case of the UPDATE operation involving a scenario wherein information to be updated exists in the requesting remote database 28a, but the more current information exists in a different remote database 28c. In other words, data attributes associated with a selected object (again, typically found via prior SEARCH :and GET operations) exist in the remote database associated with the requesting customer site (e.g. 28a at 12a) the most current information on the selected object, however, is stored in another remote database associated with a different customer site (e.g. 28c at 12c), and one or more attributes associated with the selected object are to be updated at the requesting customer site (e.g. 28a at 12a) because even more current information is now available.

This scenario is identical to the scenario described in connection with FIG. 15, except that at step 7, instead of a request message of the form add_PERSON (OBJID, instance attributes) being passed from the object broker 20 back to the remote database 28a, a message of the form update_PERSON (MyPassword, OBJID, NewAttribute) request message is transmitted since the selected object (a person) already exists in remote database 1. Thus, only the selected, updated attribute(s) are transmitted back to the requesting computer site, and are updated in the object attribute tables and object attribute index tables associated therewith.

Application Program Interface (API) (Customer Specific) Between Customer Databases and Remote Databases The customer specific application program interface (API) 32 (FIG. 1) provides the communication mechanism and protocol for the transformation or mapping of information stored in a heterogeneous data model or structure at the customer database 26 to the homogeneous data model at the remote database 28. The heterogeneous data model is converted to the homogeneous data model as the information passes through the customer specific API 32, in the form of a "transaction request".

Stated in other words, data stored in a customer database 26, in order to be used in the present invention, is "imported" into an associated remote database 28, via a transaction request. The importation of data from a customer database 26 to an associated remote database 28 generally comprises the steps of (1) determining or selecting particular predetermined data items or fields stored in the customer database which correspond to selected object attributes for a particular type of object, (2) in response to a request message, retrieving selected data items or fields stored in the customer database, (3) transmitting such retrieved selected data items or fields to the associated remote database, and (4) storing the retrieved selected data items or fields as predetermined object attributes associated with a particular object identifier. Usually, the first step is conducted "off line", that is, certain prior analysis of the customer database 26 is required to make the determination as to which data items or fields stored in the customer database correspond to selected object attributes for a particular type of object. The remaining steps are automated, and carried out automatically in the preferred embodiment.

It should be understood that there may be, and often is, dependencies associated with importation of data from a customer database 26 into a remote database 28, which implies a temporal significance for importing the data so that the data is properly reflected within the object model for the system. In other words, it is impractical and inefficient, if not absurd, to create an associative data entity such as a VISIT and assign object identifiers for PERSONS and PROVIDERS, until one has previously created object instances, and assigned object identifiers, for corresponding persons and providers associated with the visit. Likewise, it is impractical to import data associated with a particular person's insured dependents or persons to Notify In Case of Emergency (NICE) (who are also person objects)until an object instance and object identifier have been created for the particular (insured) person. Thus, those making and using the present invention should pay attention to data dependencies and the order in which data is imported, since selected primary data items should be imported or processed prior to other related, dependent data items to properly preserve the relationship between the data. Examples of such data dependencies are provided below.

Each transaction request comprises a transaction header followed by a data record, which in the preferred embodiment is a concatenation of data fields or records derived from a customer's proprietary computer system. In the example given, a COBOL record format is described for purposes of illustration. However, it will be understood and appreciated by those skilled in the art that the particular format of the records in the heterogeneous data model is not limited to the COBOL format.

Each transaction response consists of an action record, which contains the same transaction header that was supplied with the transaction request, followed by a set of records of several different types. Several occurrences of each record type may occur, but all occurrences returned in the response will pertain to the data record in question.

System Hardware Configuration

Referring back briefly to FIG. 2, in the preferred embodiment, the data exchange between the customer database 26 and the associated remote database 28 takes place between software application programs running on a client's main CPU, such as at 40a, and a token ring compatible NCR UNIX-based server computer with TCP/IP transport capabilities, such as 40d, serving as the remote database 28. Information being passed between the computers 40a, 40d travels over the token ring LAN 47 utilizing the INFOEXPRESS data communications protocol known to those skilled in the art. Once requests are formulated, they are to the object broker comprising the preferred pair of parallel IBM RS/6000 RISC-based computer systems 20a, 20b through the TCP/IP protocol.

In the preferred embodiment, the communications between the customer's site 12 and the object broker 20 are provided via dedicated public switched telephone network facilities for dial-up routers, as previously described. Each communication channel transfers data at rates up to 56 kbps. Those skilled in the art will understand and appreciate that other hardware and communications configurations are also within the scope of the present invention.

Processing Overview

The database 26 at a user computer site 12 initiates a transaction request by writing a request record into a request file. This request file is then communicated from the customer database 26 to the remote database 28. The request file is either received at the remote database 28 via the LAN if the remote database is on a separate computer from the customer database 26, or the request file is monitored a monitoring program if the remote database 28 is merely a process in a single computer system at the customer site 12. The associated remote database 28 receives the transaction request or monitors the request file for new records, and reads the records and processes the transaction according to the header and data contents. The processing generally comprises two major processing paths—(1) satisfying the transaction request, and (2) storing of customer data into the distributed database system in the homogeneous format.

The first processing path satisfies the transaction request. The monitoring or receiving program associated with the remote database 28 determines which transaction to execute by looking at the message type in the header. Once the transaction type is known, the appropriate data elements required to execute the transaction(s) are extracted from the request file, and a system request is issued. Then an entry into an audit trail file (table) is made, the request is logged, and the request is deleted from the request file. The program then continues looking for new requests.

The object broker 20 determines how many procedures are necessary to satisfy the request, where the best locations are to execute the procedures, then issues the requests to the database servers to process. Finally, the multiple result sets will be joined as required by the requester.

The second processing path handles the storing of customer data in the map table, index tables, etc. associated with the object broker 20, and object attributes at the remote database 28. The system retrieves as much data as possible from the request record to populate the database tables. For example, a patient record, which is designated as a "PATxx record" in an exemplary COBOL-based customer specific database 26, contains data on patient demographics, patient employment, guarantor and emergency contact demographics, guarantor and emergency contact employment, carriers and group plans, patient-visit data, and physician data. Once this data is imported into a distributed database system constructed in accordance with the present invention, any user having access to the system will have access to this data.

Field Mapping from Customer Database to Remote Database

Because of the heterogeneous environment of the user computers in the health care industry used as the example for the invention, it will usually be the case that record fields in a customer's database 26 will not match the record fields in the remote database 28. For example, one computer system may designate a person's name with three separate fields, first_name, middle_name, and last_name, another computer system may use only two fields, first_name and last_name, while a third computer system may only use one field, name, using spaces or other delimiters to separate different names. Therefore, in order to process transaction requests from the user computer sites 12, the customer specific applications program interface 32 must first map the particular record fields in the customer's heterogeneous data model into a uniform set of fields in a homogeneous data model at the remote database.

FIG. 17 illustrates several examples of customer specific field names and their mapping to corresponding field names in an exemplary homogeneous data model. For example, consider that in a user's computer (customer database 26) a patient's name is stored in a single field PAT1-NAME, but is mapped into three fields, person.first_name, person.middle_name, and person.last_name, in the associated remote database 28. The nomenclature utilized here is <class_name>.<attribute>, where <class_name> is an object in the object model created for the system, e.g. a person, and <attribute> is one of the data items or attributes associated with the particular type of object, e.g. a person's first name. Similarly, the date of admission will be mapped from PAT1-ADMIT-DATE in the customer's database 26 into visit.admit_date in the remote database 28.

It should be understood that not every field in a customer's database 26 will necessarily map to a field in the remote database 28. This is because not all data items stored in a customer's computer system may be required in the object model for the institution being modeled. Likewise, a remote database 28 may have certain fields that do not correspond to fields in every customer's database; in such a case, there may be null or blank fields (attributes) for selected objects, indicating availability of only selected data for a certain object instance. However, the operation of the customer specific applications program interface is not affected by these occurrences, as only certain predefined fields may be required to make information requests.

It will be appreciated that such null fields can, however, be filled in at the remote database by operation of the present invention, with use of UPDATE or ADD operations. Those skilled in the art will understand how to issue appropriate requests to various remote databases having data to detect and "fill in" null attributes with current data based on preceding discussion.

Structure Files for Data Import/Export

After determining which fields in the customer's heterogeneous data model are mapped into corresponding fields in a homogenous model at the remote databases, a system is provided for ascertaining which order to enter the customer's data records into the system. This system comprises use of a predetermined structure file, such as is shown at 300 in FIG. 18, to communicate the data from the customer database 26 to the remote database 28, and a state table or "put" specification, such as is shown at 400 in FIG. 19, to process the structure file 300 to effect the importation of the data.

As previously mentioned, there are often certain dependencies between data items which cause selected primary information to be processed prior to other related or dependent information. The files used to communicate requests and responses between the user computer's internal application system(s), typically running at the customer database 26, and the remote databases 28 distributed database system are, in the preferred embodiment, RM/COBOL files. The request file and the response file are indexed files, possibly with multiple indexes.

As previously mentioned, a request record comprises the concatenation of a header and a plurality of data records or items. The header fields are used to identify the physical location, the server (computer), and the specific application source of the request. The response will be a multiple record set, in the form of a structure file 300. For example, the response record for a patient information transaction, depending on the transaction request type, comprises the following information in a predetermined format within a structure file 300: patient demographics and employment information, contact(s) demographics and employment information, guarantor(s) demographics and employment information, insurance carrier demographics information, group plan(s), benefit details, etc.

FIGS. 18A–18B illustrate an exemplary structure file 300 that is communicated via the customer specific application program interface 32 between a customer database 26 and a remote database 28 so as to import data into the remote database. The diagram illustrates the physical layout of fields within the record, and more importantly it illustrates the relationship between the fields in the record as derived from the customer database, and the columns (attributes) within tables (objects) in the exemplary health-care related object model described in connection with the preferred embodiment. The structure file 300 also provides information regarding the order in which a customer's data records are added into the system. leach horizontal line in the structure file 300 shown in FIG. 18 describes one "field" in an ASCII file obtained from a customer database 26, and how such field is mapped into a corresponding object attribute. In this context, "field" refers to 0 or more bytes, with a fixed length, starting at a fixed offset from the start of a fixed length, fixed format ASCII record. Lines which are completely blank, and lines where the first non-blank character is a pound sign (#) are comments and are ignored. All other lines have the format specified below. The colons are used to separate the item names in the definition; they are NOT used in the structure file.

The basic structure file definition for the structure file 300 is:

row : offset : length : table : columnname : key : conjunct : conjunct table : conjunct row : conjunct column : : function in : : function out : : default :

The column identified as "Row" divides the fields into rows in a table (not separately shown) maintained in the remote database 28, where the first row is row 0. In the example given, a base table such as PERSON is stored at the remote database, comprising a plurality of rows of data items. It is not necessary that all the fields in a row be contiguous in the ASCII file, but all fields that belong in a particular row must be listed together in the structure file. A field can be in more than one row.

The column identified as "Offset" is the count of bytes from the beginning of a record to the beginning of a field. The first field is at offset 0.

The column identified as "Length" is the length of the field in bytes.

The column identified as "Table" is the table that this field relates to (i.e., that this row relates to). For example, in FIG. 18 the first row comprises data for the PERSON object attribute table maintained at the remote database 28. Any given field can occur in as many rows as necessary.

The column identified as "Columname" is the name of the column in the table to which this field relates. The name in the structure file must be an exact match for the name in the table. The Columname corresponds to object attributes in the Table.

The column identified as "Key" defines certain details about the field. Some examples of defined values are:

0: Not a key field, used as input or output. Not to be used as an element to search for when retrieving a row. Most fields will be this type.

2: Optional Key—this means that if there is data in that field, use the field as a key. If there is no data in the field, the importation operation should not be aborted because of it. This might be used for a middle name, for example, where it is used to identify the person if the middle name is available.

3: Key Both—means use this field to search the database and to update the database. If the field is not present, this record can NOT be looked up or inserted. Instead, it will be written to a rejects file with a notice of "empty key". Such a rejects file is used to signify an error condition.

5: I/O—refers to data which should freely move in either direction.

The column identified as "Conjunct" defines a situation where a set of fields from one table are used to define a single column in another table. This allows the use of fields to look up an object identifier in one table for use as an attribute in a column in another row. For example, using a name and address field from the ASCII structure file to look up a person object identifier (OBJID) from a person table for insertion into an employee table. Conjuncts start at 1, not 0. A conjunct of 0 means no conjunct. Conjuncts should be processed in order, i.e., any rows having a conjunct of 1 should processed before any rows having a conjunct of 2. This signifies the data dependency described elsewhere.

The column identified as "Conjunct Table" refers to a table that the conjunct field relates to. This is different from the Table column identified above. The first Table defines the table that will hold the OBJID to point to another table. The conjunct table contains the fields used to look up the OBJID (it is the table the OBJID refers to). In the example shown in FIG. 18B for row 5, #NICE (Notify In Case Emergency), the 'Table' being populated with data in row 5 is PERSON_CONTACT, while the 'Conjunct Table' is PERSON. This signifies that in building the PERSON_CONTACT table, one refers to the PERSON table for details on the demographics of a contact person, by person OBJID. If a field is not a conjunct field, 'n/a' is used as a place holder.

In the column identified as "Conjunct Row", if the fields which make up the conjunct identified by Conjunct Table are the same ones which make up a row defined elsewhere in the same structure file, then the row number (the first field in each line of the structure file) is put in this position. This allows the program to use an existing row for its lookup, instead of having to create a new row. This reduces the possibility of two rows trying to update the same table. Using the previous of FIG. 18B, for row 5, #NICE, the Conjunct Row is 1 for Table=PERSON_CONTACT, Conjunct Table=PERSON, indicating that certain data in row 1 of the PERSON table is utilized for this data in building the PERSON_CONTACT table. Again, it is assumed that the PERSON table has already been constructed, so the effect of data dependency is reflected in this example.

If a Conjunct Row is not defined elsewhere, or this is not a conjunct field, the value −1 is put here.

The column identified as "Conjunct Column" describes the column, i.e. particular data attribute, in the Conjunct Table that this field relates to. It is analogous to the Conjunct Table, in that it refers to a previously-constructed table that is being searched, not the table that data from the ASCII file is being put in. Again, referring to the example for row 5, #NICE, in FIG. 18B, for Table=PERSON_CONTACT, Conjunct Table=PERSON, Conjunct Row=1, Conjunct Column=last_name, indicating that the PERSON table is utilized to obtain the last name of the person in building the PERSON_CONTACT table. Accordingly, the conjunct column "last_name" (which is in the incoming ASCII structure file) is used to look up the person OBJID, which is a (plain old) column in the row, which the conjunct field relates to. If this is not a conjunction field, 'n/a' is entered as a place holder.

The backquote symbol () is a delimiter for the function area, described next.

The column identified as "Function In" describes a function that should be applied to the ASCII data to make it work for the database. If none, "none" is entered in the file (no quotes). Some of the defined functions in the preferred embodiment are:

sysdate: Adds the system date at the time of importation (when the table is populated with data from the structure file).

formatdate: converts from a specified date format into a another acceptable date format for use in the system.

subset(n, delimiter): if a fixed length field in a structure file contains some variable length fields as a part thereof, and those fields are needed as separate fields as imported into the database in the remote database, a subset function is used.

The "n" in the subset function is a count into the field of a subfield, starting at 0. Essentially, this specifies the number of "starting delimiters" to count before reaching the beginning of the desired data. If the number is 0, then copying starts at the beginning of the field. The "delimiter" separates the fields (the comma is required in the syntax in the disclosed embodiment). There can be only one delimiter per subset function. The delimiter can be any single character, and need not be the same for all subfields. There must be no space after the comma in the preferred embodiment. In other words, the first character after the comma is the delimiter. The starting delimiter is also used as the ending delimiter.

Essentially in the disclosed embodiment, the system copies into the named field the data in the specified data in the structure file, starting after the specified starting delimiter, specified by number, and ending at the first occurrence after that point of the ending delimiter.

For example, if the structure file contains a fixed length name field of 30 characters starting a position 0 in the file, formatted as "lastname, firstname middlename" (a space after the comma), with commas separating the names in the structure file, and these names are not fixed length within the total of 30 characters, the subset function is used to split the names up. According, for this example, one might utilize the following subset functions:

| last_name | subset(0,,) |
| first_name | subset(1, ) |
| middle_name | subset(2, ) |

Likewise, for an example where the format is "lastname, firstname middleinitial" (no space after the comma), with a comma separating the last name from the first name, and a space separating the middle initial from the first name in the, structure file, and these names are not fixed length within the total of 30 characters, one might use the following subset functions:

| last_name | subset(0,,) |
| first_name | subset(1,,, ) |
| middle_name | subset(1, ) |

This signifies copy into the last_name attribute from the first position to the first comma, then copy into the first_name attribute from after the first comma to the next space, then copy into the middle_name attribute from the first space to the next space.

Other functions useful for stripping dashes, parentheses, or other characters, or for justifying data in a fields, etc. will occur to those skilled in the art.

Returning to the discussion of FIG. 18, the column identified as "Function Out" specifies a function which must be performed to modify a value from the database when writing it from ASCII. If none is required, "none" is used. At present, no such out functions are utilized in the preferred embodiment.

The column identified as "Default" allows a default value to be specified and used in certain positions if no value is supplied.

The structure file 300 essentially tells the interface how to take a transaction request and map the corresponding data records into fields by converting the request into a combination of searches, gets, updates and adds. These operations must occur in a particular sequence so as to maximize the probability of getting the information into the distributed database. An important aspect of this is in defining what other dependent relationships may be needed to place a particular object into the table.

An example will be illustrated with reference to portions of the structure file 300 shown in FIG. 18. The structure file is organized so that the data records are entered in a sequential fashion utilizing predetermined dependency relationships. The structure file determines which data are to be entered in which order. In the example shown, a customer submits a transaction request with a string of data records in an ASCII format. The mapping begins in FIG. 18A by putting PERSON objects into the system. The first segment of the PERSON portion of the data record is row #0, corresponding to a PATIENT in the customer's database 26. The next segment of the PERSON portion of the date record is row #1, which corresponds to RESPONSIBLE PERSON.

In FIG. 18B, the next object entered into the database system is PERSON_CONTACT, which comprises Row #5, corresponding to NICE (Notify in Case of Emergency) and Row #6, corresponding to NOK (Next Of Kin). Notice that the conjunct column for certain lines in the PERSON_CONTACT portions has non-zero values, indicating that the line is a conjunction, or joining, of two other rows of data.

For example, consider again the segment of the data record at row #5 (NICE), offset 1034. This line corresponds to data in the person column of the PERSON_CONTACT table. The Conjunct Table column of the structure file 300 indicates that the conjunct field relates to the Table=PERSON, and the conjunct row column specifies row #0 (corresponding to PATIENT). Thus the OBJID obtained from inserting Row #0 (PATIENT) must be substituted. Similarly, in the segment of the data record at row #6 (NOK), offset 3555, the OBJID obtained from inserting Row #4 must be substituted.

It should be noted that if a person is already in the database (a person OBJID object identifier for the person is found in response to a SEARCH operation based on, say, a person's name or social security number), the data in the structure file is used to update that person's record, instead of adding it. On the other hand, if the person OBJID is not in the system, the data record will add that person to the system. Thus, the request transaction is converted into a particular sequence of searches, gets, updates and adds to facilitate the sequential entering of the entire data record.

Put Specification and State Table

The entry of customer's data records into the homogeneous database system is controlled by a set of predefined routines and protocol standards stored in the interface open server 30, which stands between the customer databases 26 and remote databases 28. FIGS. 19A–19B is a Person Put specification table comprising a state diagram summarizing all possible state conditions for an exemplary PERSON object, as it operates upon a structure file such as the exemplary structure file 300 of FIG. 18 to "put" the data into the system. Each object in the structure file (e.g., PERSON, PERSON_CONTACT, EMPLOYER, etc.) will have its own corresponding "put" specification table. The put specification table governs how each possible state condition should be handled by the interface open server 30.

Referring to the columns in the figures from left to right, the first two columns represent the new state number (New State #)and the old state number (From State #), respectively. The next three columns, SSN Request, SSN DB Image, and SSN Matching, relate to the person's Social Security Number (SSN). The next two columns, Request Name, Last/first-nm Matching, relate to the person's name. The next three columns, Birth_date Request, Birth_Date DB Image, Birth_Date Matching, relate to the person's birthdate. The next two columns, Search Yields >1 and Complete Record, indicate whether the search yields more than one record and whether there is a complete record match. The Action column indicates which the specific action to be taken for that particular state, as explained in the Comments column.

By examining a given From State #, and the results of (1) the existence of data in a selected request, whether null or not null, and (2) a comparison of selected data items or fields in the transaction request to selected object attributes to determine whether there is a match or no match, one determines a result output state, New State #.

To illustrate the operation of the table, consider the first row of the table, corresponding to New State #1 and From State #1. Following the row from left to right, the table indicates that the person's social security number was not provided (Null) in the SSN Request. In this case, the presence of the SSN (in the SSN DB Image column) in the database is irrelevant ("X" signifies don't care), so that SSN Matching is meaningless. The person's name was also provided in the Request Name (Not Null), and there was a Match to a name (Last/First_nm Matching) already existing in the database. The person's birthdate was not provided (Null) in the Birth_Date Request, so there is a "don't care" condition in the Birth_Date DB Image, and a Match in the Birth_date Matching column is meaningless. The Search Yields >1 column shows TRUE, indicating that there is more than one matching name found in the system for the Request Name provided.

Accordingly, even though there was a matching name found in the system, a single particular person cannot be uniquely identified because of the lack of a matching social security number or birthday. In the preferred embodiment, certain minimum information, e.g. a SSN, or a name and a birthday, are required to uniquely identify a person. Thus, the Comments column indicates that the appropriate Action to be take in this case is an Error Msg (error message), since there must be a SSN or birth date. The state remains at State #1.

Note that one can reach New State #11 From State #1. For this to occur, note that the Search Yields >1 field is FALSE, which indicates no more than 1 record was found to correspond to the name provided in the Request Name, and the Complete Record field indicates a Match. This indicates that a single record was found, and that data in the record associated with the name in the Request Name completely matches other data in the remote data base. In this case, a person has been uniquely identified, and the state transitions to #11.

Next consider New State #15, where the social security number (SSN) provided this time matches a social security number already in the system, yielding a Match in the SSN Matching column. Note that the name and birthdate provided also match a name and birthdate already in the system, yielding a Match in the Last/First_nm Matching column and a Match in the Birth_date Matching column. Further, note that the Complete Record field shows No Match, indicating that one or more data items are not completely in agreement. This would typically occur when certain data in the structure file 300 being processed is being imported into the system and contains more current data than is stored elsewhere on the network. Because the person is already in the system, an UPDATE operation is ordered, rather than an ADD, so that the more current information is reflected.

From the foregoing discussion, taken in conjunction with study of FIG. 18 and FIG. 19, those skilled in the art will be able to specify an "export" format comprising a structure file 300 for data stored in a heterogeneous environment such as at a customer database 26 and to write appropriate program(s) to implement the customer specific application program interface 32 to "import" the data from the structure file into a remote database 28.

Example of System Use—Patient Information Application

From the foregoing discussion, it should by now be understood that the present invention contemplates various computer programs running at the various computer systems of object broker 20, remote databases 28, with appropriate application program interfaces (API) to customer databases 26. The preferred embodiment of the present invention particularly contemplates usage of a software program called the "Patient Information Application" that runs on a terminal associated with a user's computer system 12, either as a stand-alone terminal such as the PC 49 in FIG. 2, or a process associated with the customer's database 26. The preferred Patient Information Application software is operative to generate various ADD, SEARCH, GET, and UPDATE messages, as described above, with minimal if any programming changes to the user's software associated with running the customer's database 26.

Patient Information Application Screens

Figure 20:
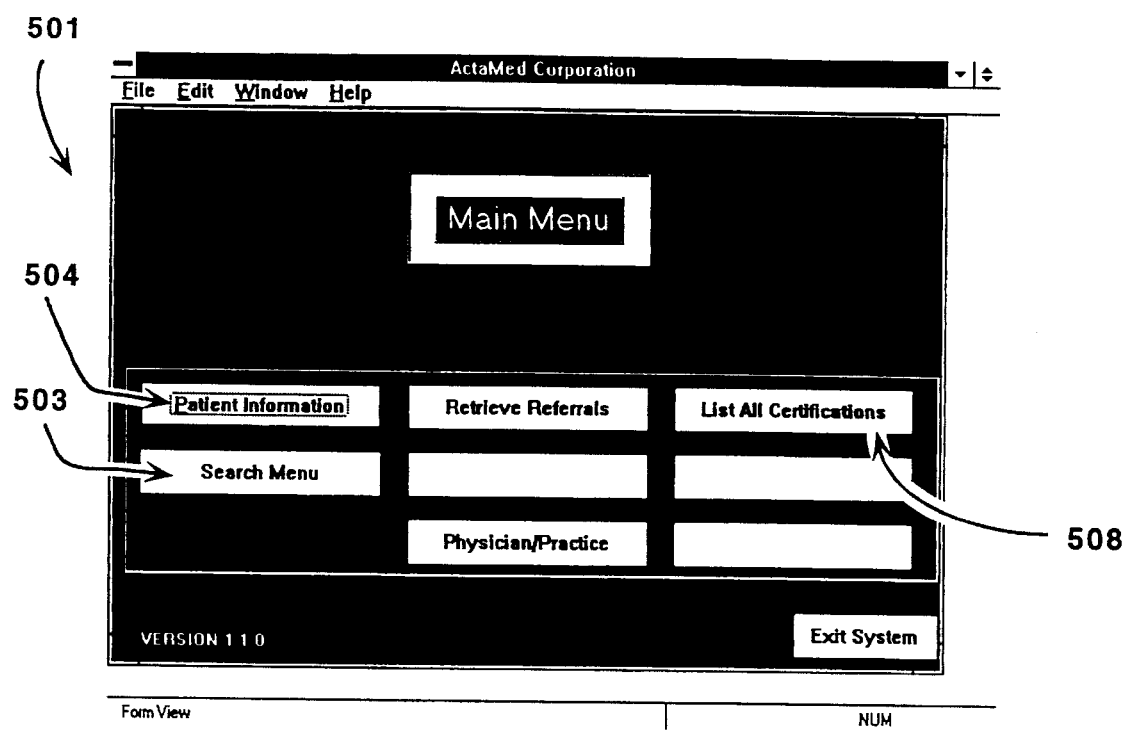
FIG. 20 is the Main Menu display screen generated by the preferred embodiment of the Patient Information Application software module constructed in accordance with the present invention.

Turn next to FIG. 20 for a discussion of the use of the present invention, and particular of the Patient Information Application software, in conjunction with a health care information system such as that illustrated in FIG. 1. It will be recalled from previous discussion that a typical user computer site 12, even though it operates and maintains its own internal database as customer database 26, is connected for operation with the system 10 as a whole so that the most current information relating to objects managed in the system, such as patients, can be retrieved and utilized, and even selectively updated into the customer's database. In order to facilitate the interface by users at a user computer site 12, a computer program that runs on a computer associated with the user computer site 12 provides the front end to the system 10.

In particular, the Patient Information Application program maintains person specific data for patients in the system as a whole. This module is a starting point to complete a transaction on the network. The Patient Information Application allows a user at a site 12 to search for existing patient information, update patient information, add patient information, and obtain electronic certifications for admissions, surgeries, or other procedures.

An example of the use of the system for procedure certification is as follows. Assume that a patient "John Doe" breaks his ankle while hiking in the mountains, three hours from his regular physician and hospital. The local emergency room has a computer system terminal that can run the, Patient Information Application, and thereby access the object broker 20. Mr. Doe produces his insurance card for the ambulance driver, who radios the information to the emergency room. The admissions clerk accesses information concerning the patient, including personal demographics, employment information, allergies, regular physician's name, address and phone number, and insurance information. Advantageously, Mr. Doe does not have to answer any questions and the admitting clerk obtains quickly all pertinent information so as to handle the admission and help the physician treat the patient quickly and properly.

Preferably, the Patient Information Application is a computer program that is operative on an IBM-compatible personal computer system that includes a modem, e.g. the PC 49 in FIG. 2. In more sophisticated systems, the terminal will be connected to a local area network (LAN) associated with the hospital's information system, but it will be understood that a stand-alone personal computer with modem can be used for many limited applications, including patient certification.

The Patient Information Application main menu is shown in FIG. 20. A main menu display screen 501 associated with the Patient Information Application is shown. The program is preferably accessed by buttons that can be selected by mouse or by cursor keys. Button functions shown on the screen 501 include Patient Information, Retrieve Referrals, List All Certifications, Search Menu, Network Menu, Credit Card Auth(orizations), Physician/Practice, and Claims Processing. All of these functions are not necessary to understanding the present invention, but are provided in the preferred embodiment so as to implement other features that are not within the scope of the present invention.

In connection with the present invention, the Patient Information Application provides the primary functions of searching for information with a "Search" operation; adding a person with an "Add Person" operation if the person does not exist within the system; updating information with an "Update" operation where appropriate; storing associated information about the person, his or her medical insurance, the attending physician, referring physician, and facility; adding a physician and/or his or her practice; transmitting certification information to a utilization review firm (such as an insurance company); viewing existing certifications with a "List All Certifications" operation; and listing other certifications.

A "Search" operation searches for information on the system, as has been described. An "Add Person" adds a person to the network by creating appropriate objects at the object broker 20 if the person is not already on the network. A "List All Certifications" function retrieves certification objects for a particular person, based on the person's object identifier. Pressing the List All Certifications button 508 effects this function. As will be recalled from the discussion of FIG. 5, instances of the preadmission certification object 67 provide the data for the List All Certifications function, which involves use of a command of the format get_all_CERTIFICATIONS (OBJID) in the manner described above in connection with the GET ALL type operation.

Normally, the first step taken in using the Patient Information Application is to search for existing information on a particular person. This entails the provision of appropriate Search inquiry from the requesting computer to the object broker 20, which carries out the search based on search terms provided in the SEARCH message. As will be recalled from the discussion above, information is returned from the object broker 20 if the person exists on the system. If the information is incorrect, then the information might require changing to reflect current status, or the person might require adding to the system if that person does not exist as an object that is tracked by the object broker 20. After these stages, other information required for certifications for preadmission can be entered in appropriate screens associated with the Patient Information Application, which is then transmitted in the form of a transaction to the object broker 20. The object broker in turn transmits appropriate information to other computers in the system that store certification information. For example, the patient's insurance carrier (e.g. carrier 60 in FIG. 5) or employer (e.g. employer 63 in FIG. 5) may be involved in providing benefit information to a UR firm (e.g. UR firm 65 in FIG. 5) that a particular procedure is certified. Likewise, such entities may be involved in settling a transaction involving rendering of health care services, and require information associated with the particular visit of a patient to a facility for which the certification is being conducted.

In general, certification is a process or transaction which comprises a collection of patient information, determination of a patient's needs, evaluating needs by predetermined standards or rules which may be established by other entities in the system, submitting requests for services, and approving requests and payments for services. Before preadmission certification can occur, information on the person in question must be retrieved. A sequence of steps is implemented in the preferred embodiment to carry out this basic process. Utilizing methods described elsewhere herein, a query is made to the object broker 20 to retrieve information relating to a particular person. The results of this query, which is carried out in the form of a GET message, is an object identifier in any circumstance either by virtue of finding the existence of that person as an object in the system or by virtue of adding that person and assigning a new object identifier. Then, a certification type for the patient in question, e.g. whether inpatient or outpatient procedure, is selected, and the patient's demographics are completed. Finally, other information insurance group plan number, attending physician, referring physician, facility, certification information and certification utilization review are entered, where appropriate.

As has been described before, the basic functions of search, add, and update must be carried out prior to effecting the certification process. These have been described above.

In FIG. 20, pressing the Search Menu Button 503 causes generation of the Person Information Query screen 520 (FIG. 21), and the Search Window 510 (FIG. 22) for entry of search terms. Preferably, the Patient Information Application is operative to allow entry of information in any search field of the Search Window 510, in any order, utilizing upper or lower case letters, without being case sensitive.

As has been previously described, certain "key" or critical information is required to ensure uniqueness and to retrieve the object identifier uniquely associated with a particular person. In the preferred embodiment of the present invention, various combinations of information may be utilized or are required as search terms. These fields include last name, first name, social security number, date of birth, and phone number. Certain of these key fields result in the unique association of an object identifier to a particular person. For example, a last name, first name and date of birth typically uniquely identifies a person. In case of conflicts, a telephone number might be required. In addition, social security number virtually always uniquely identifies an individual.

The foregoing permits several different searching strategies. Typically, data must be entered in at least the Last Name field or Social Security Number field to perform a search. With entry of a full last name or at least a partial last name, a list of possible matches to the person can be generated. A full or partial last name with other information such as first name and telephone number also results in a unique identification and provision of a corresponding object identifier. Moreover, the complete U.S. social security number typically results in determination of an object identifier, and is usually the fastest way to find a match since the Social Security Administration in the United States rigorously enforces association of a single identifying number with a unique individual, on a persistent basis. The telephone number may be entered in conjunction with other information and also generates a .list of possible matches.

Again, it should be understood that the results of the search and generation of a object identifier are invisible to a user, since the object identifier is not presented to a user at all. Rather, only the results of a search that caused the retrieval of appropriate information associated with a given object identifier are presented to the user.

Figure 21:
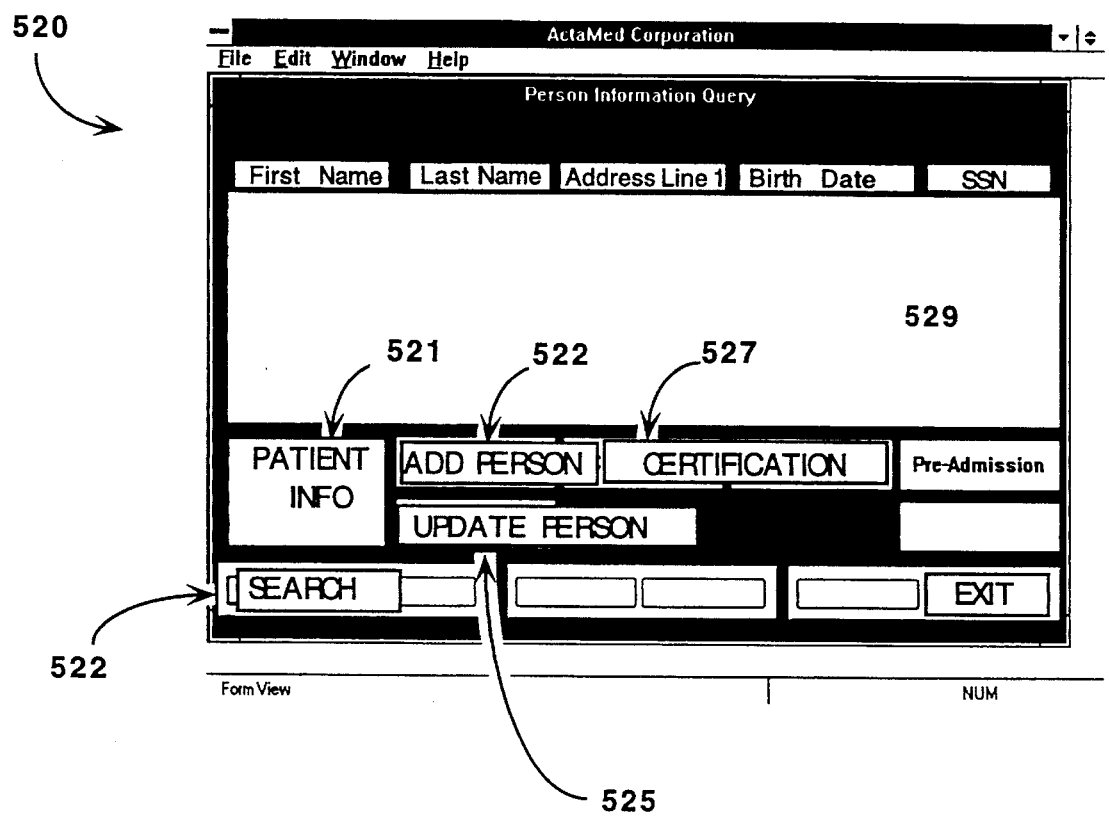
FIG. 21 is the Person Information Query display screen generated by the Patient Information Application software.
Figure 22:
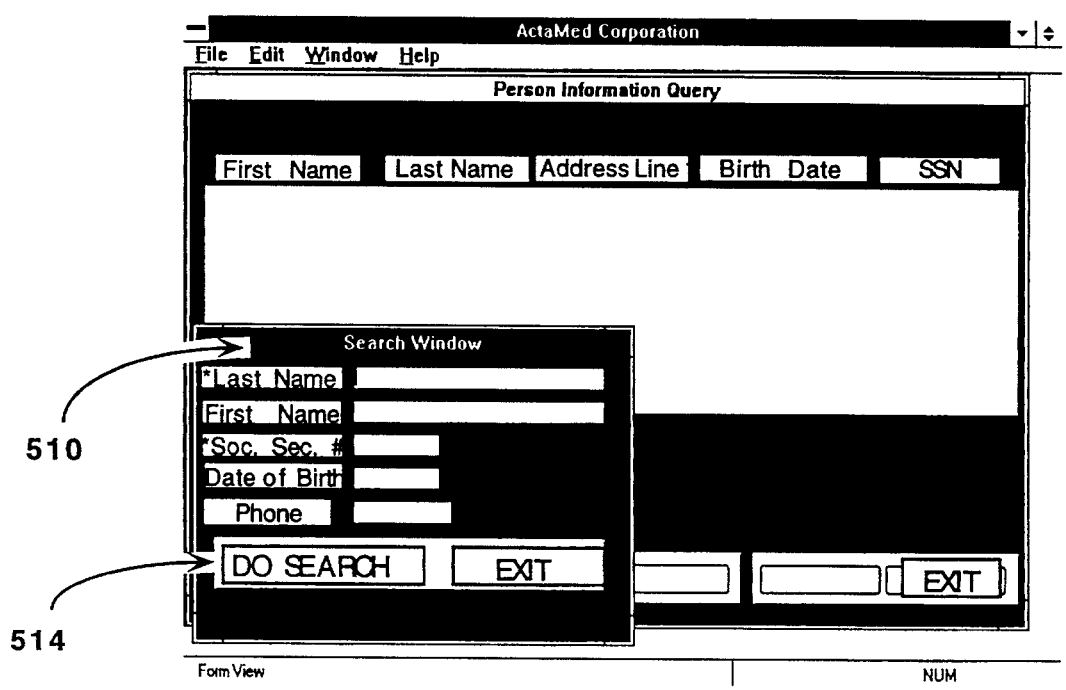
FIG. 22 shows the Search Window on the Person Information Query display screen generated by the Patient Information Application software.

In the preferred embodiment, the Patient Information Application is programmed to allow entry of first alphabetic characters in a search strategy, starting automatically in the Last Name field in the Search Window 510 of FIG. 22. A partial search may be conducted by entry of a percent sign (%). The Do Search button 514 activates the search function based on the information entered in the search window 510. In the preferred embodiment, a status box is generated to inform the user that the system is searching. Upon completion of the search, a list of possible matches appears in the display area 529 of the Person Information Query screen 520 as in FIG. 21, and the Search Window 510 of FIG. 22 disappears. The display area 529 of the screen 520 includes field of first name, last name, address, birth date, phone number, social security number.

In the event that a search results in no records found for the person, a message saying "no records found" is generated and displayed on the Person Information Query screen 520. At this point, the Add Person button 522 may be depressed to allow branching to routines for creation of a new object instance and assignment of an appropriate object identifier.

Figure 24:
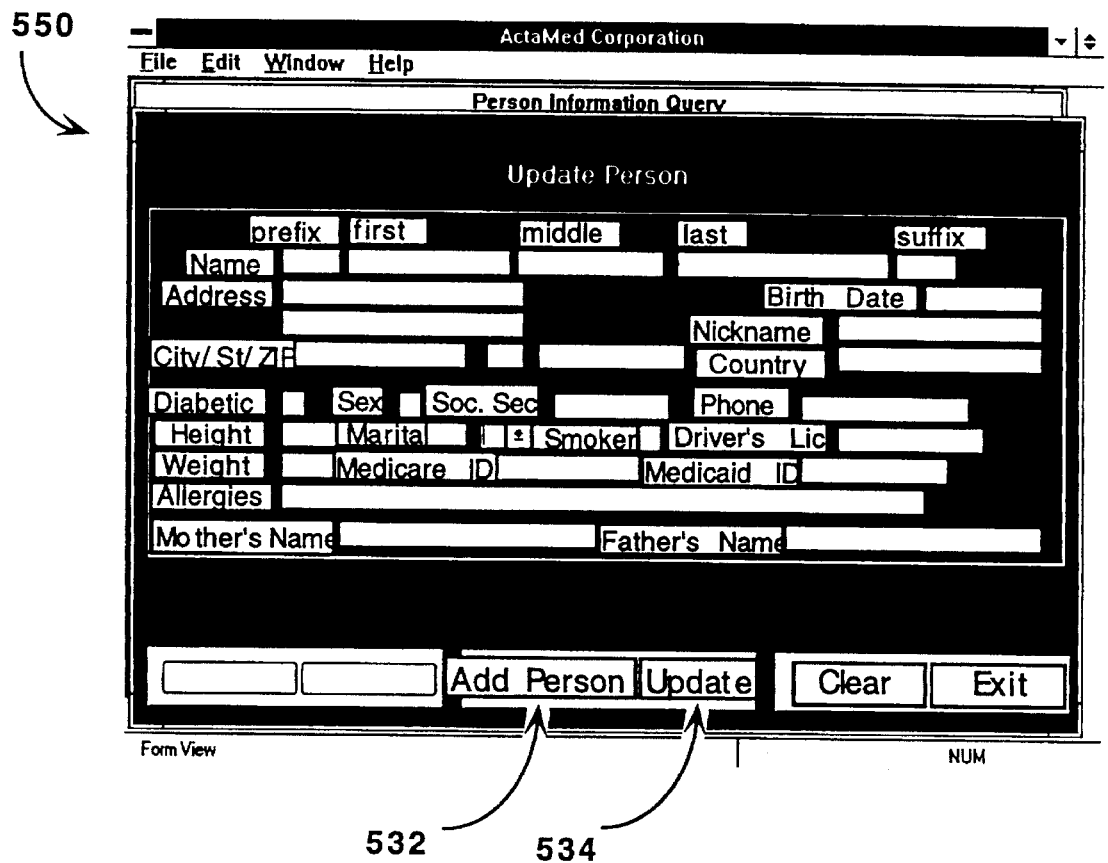
FIG. 24 is the Update Person display screen generated by the Patient Information Application software.

If a list of possible matches has been found, it will be generated in the display area 529 of the Person Information Query screen 520 with information corresponding to the one or more matches satisfying the search criteria. This list may be selected by use of the cursor keys or mouse button. At this point, the user decides whether to select a particular person (if more than one alternative is found), update information on a person, or request a certification. To update information on the person, the Update Person button 525 may be pressed, which generates a Update Person screen (FIG. 24). If at this stage certification information for the patient is to be entered, the user can press the Certification button 527, which causes a Certification Type submenu to appear (see FIG. 25).

Figure 23:
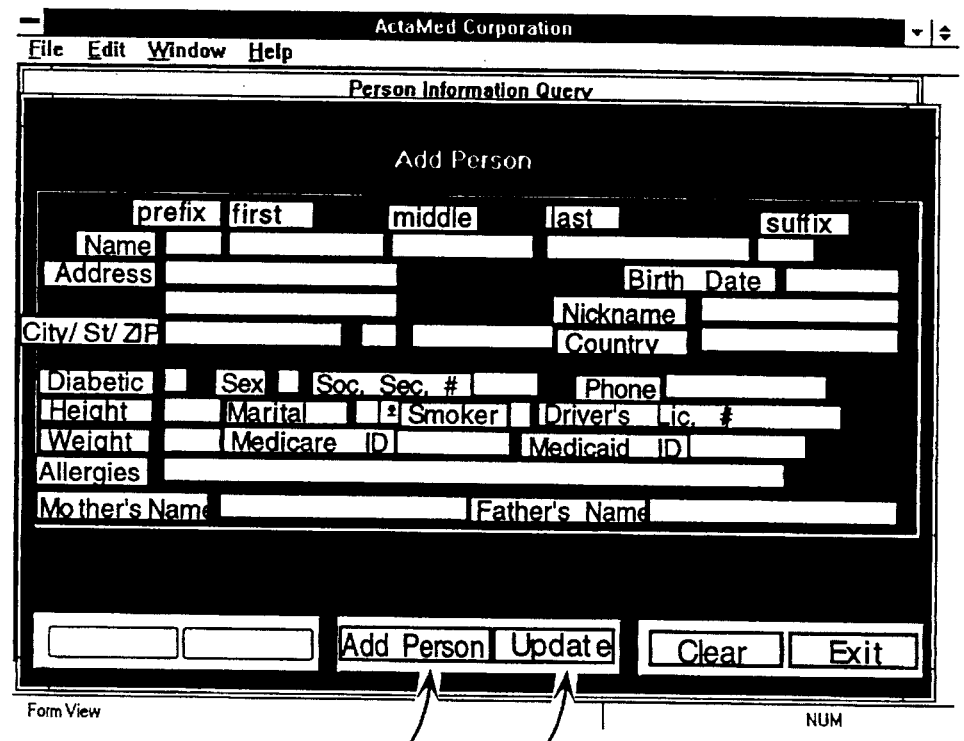
FIG. 23 is the Add Person display screen generated by the Patient Information Application software.

Still referring to FIG. 21, if the Add Person button 522 is depressed after a search, the Add Person screen 530 is generated. The Add Person screen 530 is illustrated in FIG. 23. The purpose of the Add Person screen 530 is to allow users to add information on a new person to the system 10. The Add Person screen appears when a user presses the Add Person button 522 on the Person Information Query screen 520. The Add Person function of the Person Information Query screen allows users to enter all available information about a new person immediately into the system. The Add Person function is utilized when a search shows no record associated with the particular patient, or it is known that the particular person has never been entered into the system.

Referring now to FIG. 23, the Add Person screen 530 includes a plurality of different fields of information typically required in the health care industry in many hospital information systems. All the information added in this screen does not necessarily correspond on a one to one basis to the information stored in a particular customer's database such as that at 26 in FIG. 1. Rather, the information shown in this figure is information that is acquired and stored in the preferred embodiment of the present invention in the exemplary object model described herein.

The fields in the Add Person screen 530 include a name prefix, a first name, a middle name, a last name., a name suffix (such as Sr., Jr., III, etc.), an address line one, an address line two, a city/state/zip code field, a birth date, a nickname field, a country abbreviation, a diabetic field, a sex field, a social security name, a telephone number field, a height, a marital status character field, a smoker/non-smoker field, drivers license number, weight, Medicare ID number, Medicaid ID number, allergies, mother's maiden name, father's maiden name. Other fields of information may occur to those skilled in the art.

In order to utilize the add person function, the first step taken is to press the Add Person button 522 on the Person Information Query screen 520. The Add Person screen 530 then appears with blank fields. At step two, information is entered, with the user pressing the tab or enter button or clicking a mouse to move from field to field. Any fields are skipped that do not have information and are not required. Preferably, the user is prompted to compare the screen to patient information such as insurance card and driver's license to review them for accuracy and completeness. After the information available has been obtained, the Add Person button 532 appearing at the bottom of the Add Person screen 530 is pressed to signal the system that the information is to be recorded. If the information is successfully entered, a message "Record Added Successfully" screen or message appears (not shown) to signal that the information has now been added to the system. Another blank add person screen appears.

FIG. 24 illustrates the Update Person screen 550 that is generated in the Patient Information Application in response to pressing the Update button 534 on the Add Person screen 530, or the Update Person 525 on the Person Information Query screen 520 (FIG. 21). This screen is utilized when there is a need to change information on a person already in the system. The Update Person screen 550 is identical to the Add Person screen, except for the title, which is displayed as "Update Person". The update person function allows a user to immediately update some or all of the available information about an existing patient. The steps described above in connection with FIG. 23 regarding the entry of data into the appropriate fields, after performing a Search, and retrieving information relating to a particular person has been retrieved and displayed, are the same. Similarly, the user presses the tab or enter buttons to move from field to field, and information that is to be changed may be entered. After appropriate information has been added to the Update Person screen 550, the Update button 534 is pressed to cause the entry of the data into the system.

The steps taken within the system relating to the UPDATE are described above in connection with FIGS. 14, 15, and 16.

Figure 25:
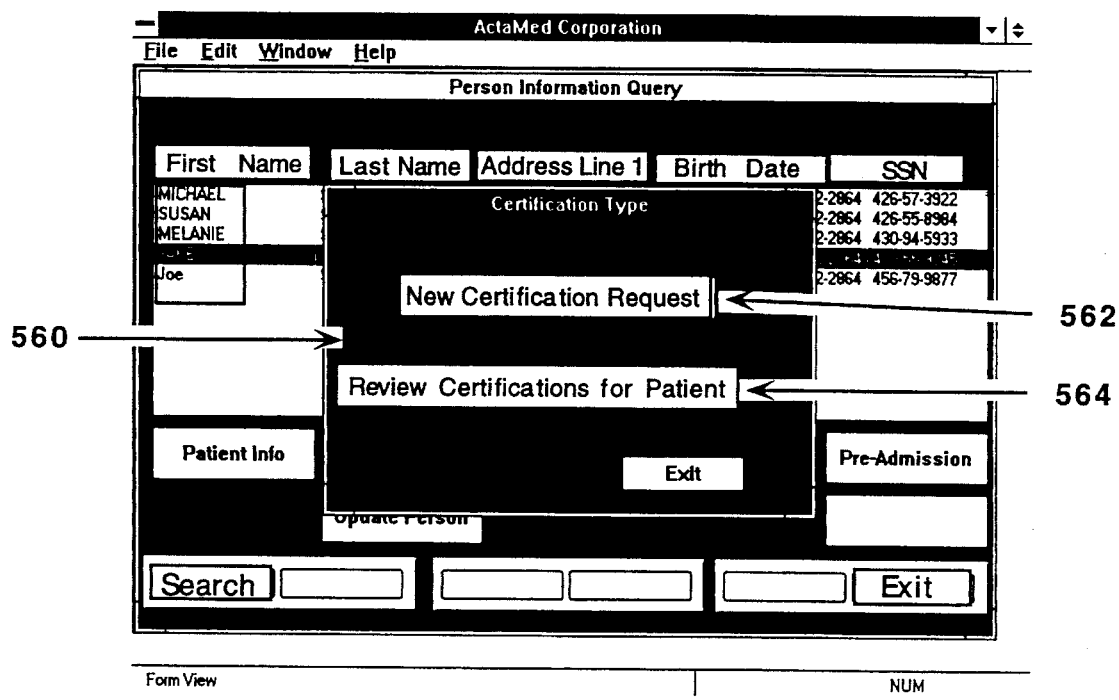
FIG. 25 is the Certification Type window on the Person Information Query display screen generated by the Patient Information Application software.

FIG. 25 illustrates the Certification Type window 560 that is displayed in response to pressing the Certification button 527 on the Patient Information Query screen 520 (FIG. 21). Certification information for a patient may be retrieved from the main menu 501 by depressing the List All Certifications button 508 or by pressing the Certification button 527 on the Person Information Query screen 520 (FIG. 21). The program associated with the display of the Certification Type window 560 is designated the Certification Module, and it is a subprogram under the Patient Information Application. The Certification Module is generally accessed from the Person Information Query screen. The purpose of the certification function is to allow a user to inquire about existing certification information on a patient, update certification information, enter new certification information, send certification information to appropriate utilization review firms, and review all certification for a patient.

Prior to discussing certification types, it should be understood that in the present invention, a certification is a review, prior to treatment, to judge whether the proposed treatment is appropriate for the diagnosed illness. The process does not necessarily restrict payment for treatment. Certifications are issued by utilization review firms, modeled as an object 65 in the exemplary object model illustrated in FIG. 5.

Accordingly, the Certification Type window 560 in FIG. 25 allows a user to request a new certification, or review existing certifications for a patient. Thus, the certification type window 560 provides and displays a New Certification Request button 562 and a Review Certifications For a Patient button 564. Preferably, these options are only available after use of the search window to retrieve a list of possible matches, using the Person Information Query screen 520. When a user presses the Certification button 527 on the Person Information Query screen 520 (FIG. 21), a submenu appears allowing choices of certification type, for example, for inpatient or outpatient service. Typically, a user at a hospital or other health care service provider will first wish to review the certification for a patient to determine if the service to be rendered is already certified for payment by a given insurance carder or other payment guarantor. In this case, the Review Certifications For Patient button 564 is pressed. Information relating to the certification will be displayed on a Certification-Patient-Demographics window 570 (FIG. 26).

Still referring to FIG. 25, in the event that the information displayed on the Certification-Patient-Demographics screen 570 does not indicate any existing certifications for this patient, or if the information is otherwise unsatisfactory, then the New Certification Request button 562 may be depressed.

Referring now to FIG. 26, the Certification-Patient-Demographics screen 570 displays current patient information for a selected person (selected usually by a prior search function), and provides access to required data fields that are associated with completion of a certification function. The format of the Certification-Patient-Demographics screen is the same as that of the Add Person screen and Update Person screen shown in FIG. 23 and FIG. 24. Upon reaching this screen, a user may enter new information, or update information. As in previous screens, the user steps between fields by utilizing the tab or enter buttons, or moving the mouse pointer to the button and clicking in the field.

As will be understood, the purpose of obtaining certifications for a selected patient is to allow a determination of what types of procedures have already been approved for a particular individual patient. After the information indicated in the Certification-Patient-Demographics screen 570 have been entered, many of which carry over from values entered in conjunction with the Add Person and Update Person screens, the system searches for instances of preadmission certification objects (i.e. 67 in FIG. 5) within the system, typically which are associated with insurance carriers, group plans, or PPO/HMO/TPA's.

Figure 27:
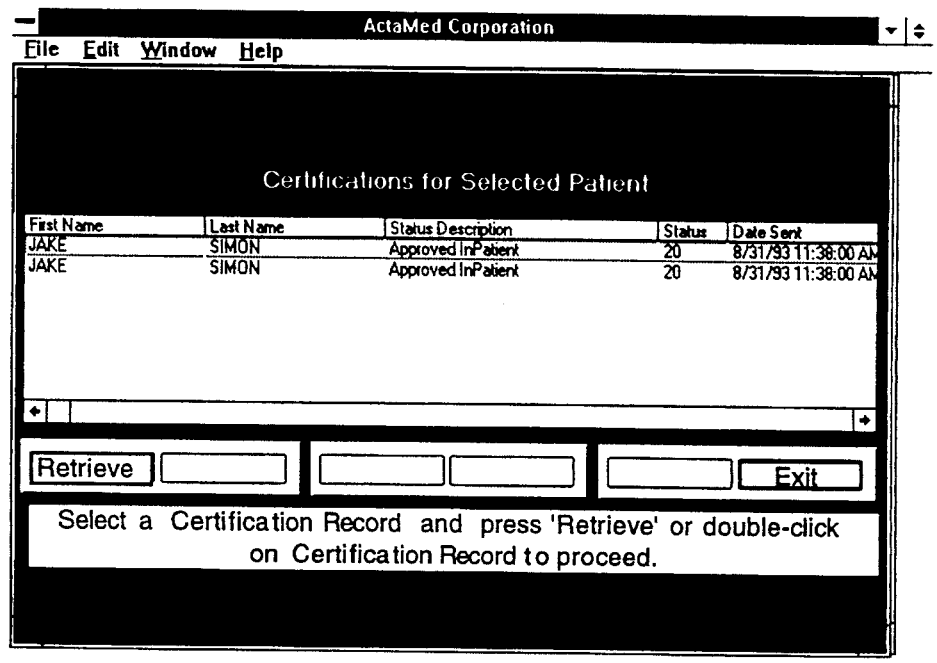
FIG. 27 is the Certifications for Selected Patient display screen generated by the Patient Information Application software.

After the information relating to a particular patient is input on the Certification-Patient-Demographics screen 570 in FIG. 26, the results are displayed on a Certifications For Selected Patient screen 580, shown in FIG. 27. The screen 580 illustrates a plurality of procedures and other information associated with a given patient name. An example shown in FIG. 27, the patient Jake Simon is designated as having been approved for in-patient care.

System States During GET Request Message

FIG. 28 illustrates the states of various tables, indexes, and the like maintained within the object broker 20 and various user computer sites as a result of the GET operation described above. The figure illustrates an exemplary scenario for admission of a patient "John Doe", in connection with particular application program interface messages and responses that search, retrieve, and update information, which is ultimately displayed on the display screens described above. In step one, it is assumed that a hospital admissions clerk is utilizing the Patient Information Application (described elsewhere) and is presented with the initial main menu screen shown in other figures. Upon selection of the Patient Information button 504, and filling in of the appropriate Person Information Query information such as in the Search Window 510, the preferred embodiment of the present invention, which is assumed to be user computer 3

26d causes the formulation in RDB3 of a search_PERSON request message 701 and will include the minimum search information of name and birthday. In the example given, the name is John Doe, the birthday is 07/24/67. As has previously been discussed, this information typically is sufficient to uniquely identify a person and his or her object identifier, if the person is recorded in the system.

At step two, the request message search_PERSON 701 is transmitted to the object broker 20, which consults the person index PERSON_IDX table to retrieve an object identifier associated with this particular individual. The PERSON_IDX table, which has been previously identified with the reference number 130a, indicates that a person having this particular name and birthday is associated with object identifier OBJID 0012. Note also that a social security number (SSN) 123-456-7890 associated with this particular individual would have also produced the same object identifier.

At step three, the object broker 20 returns to the requesting RDB3 a message indicating that the requested patient John Doe has object identifier 0012, along with all other index information associated with that that patient.

At step 4, the remote computer system RDB3 issues a GET message to retrieve demographic data associated with this particular object identifier 0012. In FIG. 28, this is illustrated as a get_PERSON (0012) request message 705. As described elsewhere in connection with the Person Information Query screen 520, it is conceivable that a search has resulted in the display of a number of possible candidates that satisfy the search criteria, especially in the case of partial searches. Assume for further discussion that only a single individual, with the object identifier 0012, is the patient in question, and further action is desired with respect to this particular individual. The user at the hospital user computer 28d then causes the retrieval of information pertaining to this particular person (0012) and display of the same on a Person Information Query screen.

At step five, the get_PERSON message 705 is transmitted to the object broker 20, which consults its map table 120 to determine in which location the most current demographic data for John Doe is stored. As shown in FIG. 28, the object identifier 0012 is shown having the most current information associated with the object attribute table 1, which for purposes of discussion is assumed to be demographic data bearing status information of "Date n+2". This information is stored in RDB1, which is associated with the client site 1 (FIG. 1), the insurance company computer system 26a.

At step six, the object broker 20 transmits a GET request message to RDB1, based on the object identifier 0012. At RDB1, the object identifier is indexed into the associated object attribute table index 150 that provides a pointer to the object attribute table 140 in which the most current demographic data for this particular object identifier is stored. This is illustrated in connection with the OAT Index 150, which stores a pointer P2 to the object attribute table 140, which shows the most current information, in particular, the address field, for this particular individual.

At step seven, the retrieved demographic data stored in the object attribute table 140 associated with RDB1 is transmitted back to the object broker and thence to the requesting computer system associated with RDB3. This information then is transmitted from the RDB3 at the hospital 12d to the particular computer running the Patient Information Application where the relevant fields on the Patient Information Application screens are filled out with appropriate updated and current information.

Modification of Tables Resulting from UPDATE Operation

FIG. 29 illustrates the state of various tables in the object broker 20 and in the remote databases 28 as a result of an UPDATE operation in a situation where the object broker determines that a data item in one remote database is the most current information, but that information is to be updated in the querying user computer. The scenario contemplated is that of admission of a patient to a hospital at user computer 3 of 12d. The following discussion is intended to complement the discussion above relating to the UPDATE message.

At step 1, the patient is admitted to the hospital at user computer site 3, associated with RDB3.

At step 2, an admissions clerk logs on to the system to retrieve patient information.

At step 3, via RDB3 a SEARCH request message based on search parameters such as name or social security number is sent to the object broker 20.

At step 4, the object broker consults its map table, and determines that this particular person exists on the system with a particular object identifier 0001, and that information relating to this particular person is most current in RDB2, which is associated with user computer 2, the person's employer. This information, assume, is stored in object attribute table 2 (OAT 2) with the person's address shown as Addr2.

At step 5, the data from RDB2 pertaining to this particular object identifier 0001 is retrieved and sent via the object broker 20 back to the user at RDB3. The data is displayed at the computer system 12d on a Person Information Query screen 520, described elsewhere herein.

At step 6, viewing the display screen 520, the patient to be admitted informs the admission clerk that the address shown "Addr2" is incorrect and should be updated. Note that the person's address stored at RDB3 in the corresponding object attribute table (OAT 1) shows the person's address as "Addr1", which is also out of date. By use of the present invention, it will be appreciated that the most current information can be retrieved and displayed notwithstanding that a particular user's local computer database may have outdated information.

In order to perform the update operation, at step 7 a "replica" of the data stored in RDB2 is made. This replica comprises the data that was sent at step 5 to RDB3.

At step 8, the address field relating to this person is changed from the old value Addr2 to the updated value, Addr3. At step 9, the new address is committed to the database at RDB3, which now contains the most current information in the system.

Since this is an UPDATE operation, the next step required is to update the map table and other corresponding index tables at the object broker 20 so that subsequent users can search and retrieve the most current information for this particular person, which is the new address at Addr3. Accordingly, at step 10, entry 1 is updated in the map table 140 for retrieval by other users by object identifier. The updated map table 140 indicate that the most current information is at RDB3, with status of Date n+2, in the table OAT 1.

At step 11, the resulting system state is illustrated, showing that the newly updated address Addr3 is contained in RDB3. Note that the prior most-current data at RDB2, having Addr2, has not changed. Therefore, there is no violation of the data sanctity rule at RDB2, yet users at RDB2 can still retrieve the most current information with minimal risk to the integrity of its own local database.

It will now be appreciated that in contrast to prior "store and forward" type distributed systems, the present invention concentrates on keeping one copy of an object available to all nodes on network. While multiple data communications or "hops" to a data server might be required to obtain data on a selected object, speeds of present day data communications networks are such that limited additional data communications hops to a server are not a significant issue. Moreover, in the present invention there is no need to coordinate all the data at a plurality of nodes as in prior approaches which maintain multiple copies, thereby obviating a significant potential problem with systems that have many nodes on the network. In addition, it will be appreciated that keeping logical addresses, as in the present invention, obviates the problem of having to update physical addresses or references at multiple locations or nodes if objects are updated or moved to a different physical storage location.

The present invention has been described in relation to particular embodiments which are intended in all respects to be illustrative rather than restrictive. Alternative embodiments will become apparent to those skilled in the art to which the present invention pertains without departing from its spirit and scope. Accordingly, the scope of the present invention is defined by the appended claims rather than the foregoing description.

What is claimed is:

1. A method of operating a distributed data processing system including a plurality of independent remotely located user computers that process user data in user databases and at least one object broker computer, the user computers being interconnected with the object broker computer by data communication hardware over a data communication network, the user computers being operative to perform data operations of storing, updating, and retrieving user data items in response to user commands, comprising the steps of:

(a) for a subject at one of the user computers for which data is to be processed in the system, creating an object instance by assigning a unique object identifier to data items associated with the subject by:

(a1) providing a global object identification address space corresponding to a range of object identifiers for association with a plurality of subjects; and (a2) allocating a predetermined range of object identifiers within the global object identification address space to each remotely located user computer;

(b) storing the data items associated with the subject at the user computer in association with the object identifier;

(c) at the object broker computer, storing the locations of the user computers in a mapping table in association with object identifiers;

(d) in response to a query to the object broker computer for data relating to a particular subject in question, retrieving a selected object identifier for the subject in question;

(e) in response to retrieval of an object identifier for the subject in question in the preceding step, retrieving the location of a remote user computer associated with the selected object identifier; and (f) retrieving data stored at the remote user computer associated with the selected object identifier via the data communication network.

2. The method of claim 1, wherein each of the remotely located user computers comprises a heterogeneous data structure, and further comprising the steps of:

at the user computers, mapping predetermined data items stored in the user computers to corresponding object attributes associated with a predetermined instance of an object;

storing the object attributes in an object attribute table in the remote user computers in association with object identifiers.

3. The method of claim 1, wherein the step of allocating a predetermined range of object identifiers is carried out at the object broker computer, and wherein a new object instance is created by assigning a unique object identifier from a predetermined range of object identifiers is carried out at the user computers.

4. The method of claim 1, wherein the query to the object broker originates at a first user computer, and the data associated with the selected object identifier is stored at a second user computer, and further comprising the step of communicating data retrieved, associated with the selected object identifier, to the object broker and then to the first user computer via the data communication network.

5. The method of claim 1, wherein the data items associated with the subject stored at the user computer in association with the object identifier are stored in an object attribute table.

6. The method of claim 5, wherein the remotely located user computers include at least one customer database and at least one remote database associated therewith, and wherein the object attribute table is stored in the remote database.

7. The method of claim 1, further comprising the step of maintaining an object index table at the object broker computer for relating at least one predetermined search term to at least one object identifier.

8. The method of claim 7, wherein the object index table for relating at least one predetermined search term to at least one object identifier is a relational base table, and further comprising the step of maintaining a junction index table relating object identifiers corresponding to a first class of objects to object identifiers corresponding to a second class of objects.

9. The method of claim 1, wherein the user computers are located at a user computer site including at least one customer database and at least one remote database associated therewith, the at least one remote database storing an object attribute table for relating object attributes to object identifiers, and wherein the object broker computer stores an object index table for relating at least one predetermined search term to at least one object identifier.

10. The method of claim 9, further comprising the steps of:

in response to an add request at one of the user computers to add a subject to the system, providing selected data items associated with the subject to be added from the customer database to the remote database;

at the remote database, carrying out the step of creating new object instance by assigning a new object identifier to data items associated with the subject;

communicating information relating the new object identifier to at least one corresponding search term to the object broker computer;

at the object broker computer, updating the object index table to reflect the association of the new object identifier, the corresponding search term;

at the object broker computer, updating the mapping table to reflect the location of the user computer that added the new object instance identified by the new object identifier.

11. The method of claim 9, further comprising the steps of:

in response to a search request at a querying one of the user computers to determine whether an object exists corresponding to a selected search term, communicating the selected search term to the object broker computer;

at the object broker computer, consulting the object index table to determine whether there is an object identifier associated with the selected search term;

in response to a determination that there is an object identifier associated with the selected search term, retrieving the corresponding object identifier;

providing a message to the querying user computer via the data communication network including the corresponding object identifier.

12. The method of claim 9, further comprising the steps of:

in response to a get request at a requesting one of the user computers based on a particular object identifier, communicating the particular object identifier to the object broker computer;

at the object broker computer, consulting the mapping table based on the particular object identifier to identify a particular remote database at a particular user computer site;

communicating a get message to the particular remote database at the particular user computer site including the particular object identifier;

at the particular remote database, consulting an object attribute table index to obtain retrieval information corresponding to the particular object identifier in the particular object attribute table;

retrieving object attributes associated with the particular object identifier from the particular object attribute table; and communicating retrieved object attributes to the object broker computer and thence to the requesting user computer.

13. The method of claim 9, further comprising the steps of:

in response to a get all request at a requesting one of the user computers based on a particular object identifier that is related to one or more related object identifiers, communicating the particular object identifier to the object broker computer;

at the object broker computer, consulting an object index table that relates object identifiers of a first type to object identifiers of a second type to retrieve one or more related object identifiers associated with the particular object identifier;

at the object broker computer, consulting the mapping table based on retrieved related object identifiers to identify a one or more object attribute tables at one or more particular remote databases at one or more user computer sites containing data on the related object identifiers;

communicating a get message to the one or more remote databases including the related object identifiers;

at the one or more particular remote databases, consulting one or more object attribute table indexes to obtain retrieval information corresponding to the related object identifiers in the one or more object attribute tables;

retrieving object attributes associated with the related object identifiers from the one or more object attribute tables; and communicating retrieved object attributes to the object broker computer and thence to the requesting user computer.

14. The method of claim 9, further comprising the steps of:

in response to an update request at an updating one of the user computers based on a particular object identifier for which one or more object attributes are to be updated, communicating the particular object identifier to the object broker computer together with the one or more object attributes to be updated;

at the object broker computer, consulting the mapping table based the particular object identifier to identify an object attribute table at a particular remote database at a user computer site containing the most current data corresponding to the particular object identifier;

communicating a get message to the particular remote database including the particular object identifier;

at the particular remote database, consulting an object attribute table index to obtain retrieval information corresponding to the particular object identifier in the object attribute table;

retrieving object attributes associated with the particular object identifier from the object attribute table;

communicating retrieved object attributes to the object broker computer;

at the object broker computer, updating the retrieved object attributes with the one or more object attributes to be updated, to obtain updated object attributes associated with the particular object attribute;

communicating the updated object attributes to the updating user computer for storage in the associated remote database.

15. The method of claim 14, further comprising the step of updating the mapping table and object index tables at the object broker computer to reflect that the updating user computer now has the most current information associated with the particular object identifier.

16. The method of claim 14, wherein the updating user computer is the same as the particular remote database containing the most current data corresponding to the particular object identifier.

17. The method of claim 14, wherein the remote database at the updating user computer did previously contain object attributes associated with the particular object identifier in an object attribute table, and further comprising the step of updating selected updated object attributes in the object attribute table associated with the particular object identifier.

18. The method of claim 14, wherein the updating user computer is at a different user site as the particular remote database containing the most current data corresponding to the particular object identifier.

19. The method of claim 18, wherein the remote database at the updating user computer did not previously contain any object attributes associated with the particular object identifier, and further comprising the step of adding the updated object attributes to an object attribute table associated with the updating user computer in association with the particular object identifier.

20. The method of claim 1, wherein the mapping table stores information relating object identifiers, status information, and location information.

21. The method of claim 20, wherein the user computers are located at a user computer site including at least one customer database and at least one remote database associated therewith, and wherein the location information relates to a data communications location for a remote database that stores data items in association with object identifiers.

22. The method of claim 21, wherein data items comprise at least one object attribute stored in at least one object attribute table maintained in the at least one remote database, and wherein the location information comprises information identifying at least one object attribute table in at least one remote database.

23. The method of claim 22, wherein the status information comprises date information identifying which one of a possible pluralities of occurrences of a selected object identifier is the most current.

24. The method of claim 1, wherein each of the user computers are located at a user computer site including at least one customer database and at least one remote database associated therewith.

25. The method of claim 24, wherein at least one customer database is a heterogeneous database structure relative to at least one other computer system in the distributed system, and wherein the at least one remote database is homogeneous relative to the object broker computer.

26. The method of claim 24, wherein the at least one customer database runs on a different computer system than a computer system that runs the at least one remote database.

27. The method of claim 24, wherein the at least one customer database runs on the same computer system as the at least one remote database.

28. The method of claim 24, wherein at least one user computer in the distributed data processing system includes a customer database of a first database structure, and at least one other user computer in the distributed data processing system includes a customer database of a second database structure different from the first database structure so that such database structures are heterogeneous.

29. The method of claim 24, wherein the remote database associated with each user computer site is operative for performing the steps of creating a new object instance, storing data items in association with the object identifier, and retrieving data stored at the remote user computer associated with an object identifier provided by the object broker computer.

30. The method of claim 29, wherein the remote database is further operative for communicating location information and related object identifiers to the object broker computer via the data communications network.

31. The method of claim 24, wherein the step of storing the data items associated with the subject at the user computer in association with the object identifier comprises the steps of:

importing data items from a customer database into an associated remote database as selected data attributes associated with a particular object identifier, and communicating the particular object identifier to the object broker computer.

32. The method of claim 31, wherein the step of communicating the particular object identifier to the object broker computer includes communicating predetermined search terms associated with the selected data attributes to the object broker computer.

33. The method of claim 32, further comprising the step of storing the predetermined search terms in an object attribute index stored at the object broker computer, the object attribute index relating object identifiers and search terms, and storing location information and status information indicative of the source and status of the object attributes and the object identifier in the mapping table.

34. The method of claim 31, wherein the step of importing data items from the customer database comprises the steps of:

importing a first set of data items from the customer database as object attributes associated with a first object identifier;

determining that the first object identifier is related to at least one additional second object identifier; and importing a second set of data items from the customer database as object attributes associated with the second object identifier.

35. The method of claim 34, wherein the steps of importing comprise importing object attributes associated with the second object identifier that are in a dependent relationship to object attributes associated with the first object identifier in a predetermined order so as to preserve dependency relationships.

36. The method of claim 34, further comprising the steps of:

storing object attributes associated with the first object identifier in a first object attribute table;

storing the first object identifier and the second object identifier in a junction table relating object identifiers to each other;

storing object attributes associated with the second object identifier in a second object attribute table;

in response to a determination that the storing of object attributes for the second object identifier calls for information corresponding to the first object identifier, storing the, first object identifier in a corresponding field in the second object attribute table, whereby reference to the second object identifier causes referral to the first object identifier for selected object attributes.

37. The method of claim 24, wherein each remote database at each user computer site comprises a homogeneous data structure, and further comprising the step of importing selected data items from an associated customer database into the remote database.

38. The method of claim 37, wherein the step of importing selected data items from an associated customer database into the remote database comprises the step of mapping data items in a heterogeneous data structure on a customer database into predetermined object attributes stored in the associated remote database.

39. The method of claim 38, wherein the step of importing occurs in response to a put request message provided by a user at a user computer site.

40. The method of claim 38, wherein the step of importing comprises entering data items from the heterogeneous data structure into an object attribute table maintained at the associated remote database.

41. The method of claim 40, further comprising the step of maintaining an object attribute table index at the remote database to allow rapid searching for particular object attributes stored in an object attribute table in the respective remote database.

42. The method of claim 41, wherein the object attribute table index comprises a table relating an object identifier to one or more data items associated with the object identifier.

43. A method of operating a distributed data processing system including a plurality of independent remotely located user computers that process user data in user databases, the user computers being interconnected for data communications by data communication hardware over a data communication network, the user computers being operative to perform data operations of storing, updating, and retrieving user data items in response to user commands, comprising the steps of:

(a) providing a location service storing information relating object identifiers and location information associated with subsets of data items stored in the plurality of user computers;

(b) associating a first object identifier with a selected first set of user data items relating to a first logical object;

(c) associating a second object identifier with a selected second set of user data items relating to a second logical object;

(d) associating a third object identifier with a third set of user data items relating to a third logical object, the third set of user data items including particular data items corresponding to the first logical object and the second logical object;

(e) in response to a selected search term relating to the third logical object originating at one of the user computers, searching an object index relating search terms to the object identifiers to obtain the third object identifier;

(f) consulting the location service based on the third object identifier to obtain the related first object identifier and second object identifier;

(g) determining selected locations of a user computer storing data items associated with the first object identifier and a user computer storing data items associated with the second object identifier;

(h) retrieving data items associated with the first object identifier and the second object identifier from the selected user computers; and (i) joining the retrieved selected data items associated with the first object identifier and the second object identifier to obtain a complete set of data items associated with the third object identifier.

44. The method of claim 43, wherein the distributed data processing system includes at least one central computer operative for providing the location service, the object index, and issuing requests to user computers to retrieve data items corresponding to object identifiers.

45. The method of claim 43, wherein each of the remotely located user computers comprises a heterogeneous data structure.

46. The method of claim 43, wherein each of the remotely located user computers are located at a user site including at least one customer database and at least one remote database associated therewith, wherein said at least one customer database is a heterogeneous database structure relative to at least one other computer system in the distributed system.

47. A method of operating a distributed data processing system including a plurality of independent remotely located user computers that process user data in user databases and at least one object broker computer, the user computers being interconnected with the object broker computer by data communication hardware over a data communication network, the user computers being located at a user computer site including at least one customer database and at least one remote database associated therewith, the user computers being operative to perform data operations of storing, updating, and retrieving user data items in response to user commands, comprising the steps of:

(a) for a subject at one of the user computers for which data is to be processed in the system, creating an object instance by assigning a unique object identifier to data items associated with the subject;

(b) storing the data items associated with the subject at the user computer in association with the object identifier by:

(b1) importing data items from a customer database into an associated remote database as selected data attributes associated with a particular object identifier by:

(b1a) importing a first set of data items from the customer database as object attributes associated with a first object identifier;

(b1b) determining that the first object identifier is related to at least one additional second object identifier; and (b1c) importing a second set of data items from the customer database as object attributes associated with the second object identifier; and (b2) communicating the particular object identifier to the object broker computer;

(c) at the object broker computer, storing the locations of the user computers in a mapping table in association with object identifiers;

(d) in response to a query to the object broker computer for data relating to a particular subject in question, retrieving a selected object identifier for the subject in question;

(e) in response to retrieval of an object identifier for the subject in question in the preceding step, retrieving the location of a remote user computer associated with the selected object identifier;

(f) retrieving data stored at the remote user computer associated with the selected object identifier via the data communication network;

(g) storing object attributes associated with the first object identifier in a first object attribute table;

(h) storing the first object identifier and the second object identifier in a junction table relating object identifiers to each other;

(i) storing object attributes associated with the second object identifier in a second object attribute table;

(j) in response to a determination that the storing of object attributes for the second object identifier calls for information corresponding to the first object identifier, storing the first object identifier in a corresponding field in the second object attribute table, whereby reference to the second object identifier causes referral to the first object identifier for selected object attributes.

48. The method of claim 47, wherein each of the remotely located user computers comprises a heterogeneous data structure, and further comprising the steps of:

at the user computers, mapping predetermined data items stored in the user computers to corresponding object attributes associated with a predetermined instance of an object;

storing the object attributes in an object attribute table in the remote user computers in association with object identifiers.

49. The method of claim 47, wherein at least one customer database is a heterogeneous database structure relative to at least one other computer system in the distributed system, and wherein the at least one remote database is homogeneous relative to the object broker computer.

50. The method of claim 47, wherein the at least one customer database runs on a different computer system than a computer system that runs the at least one remote database.

51. The method of claim 47, wherein the at least one customer database runs on the same computer system as the at least one remote database.

52. The method of claim 47, wherein the user computers are located at a user computer site including at least one customer database and at least one remote database associated therewith, the at least one remote database storing an object attribute table for relating object attributes to object identifiers, and wherein the object broker computer stores an object index table for relating at least one predetermined search term to at least one object identifier.

53. The method of claim 52, further comprising the steps of:

in response to an add request at one of the user computers to add a subject to the system, providing selected data items associated with the subject to be added from the customer database to the remote database;

at the remote database, carrying out the step of creating new object instance by assigning a new object identifier to data items associated with the subject;

communicating information relating the new object identifier to at least one corresponding search term to the object broker computer;

at the object broker computer, updating the object index table to reflect the association of the new object identifier, the corresponding search term;

at the object broker computer, updating the mapping table to reflect the location of the user computer that added the new object instance identified by the new object identifier.

54. The method of claim 52, further comprising the steps of:

in response to a get request at a requesting one of the user computers based on a particular object identifier, communicating the particular object identifier to the object broker computer;

at the object broker computer, consulting the mapping table based on the particular object identifier to identify a particular remote database at a particular user computer site;

communicating a get message to the particular remote database at the particular user computer site including the particular object identifier;

at the particular remote database, consulting an object attribute table index to obtain retrieval information corresponding to the particular object identifier in the particular object attribute table;

retrieving object attributes associated with the particular object identifier from the particular object attribute table; and communicating retrieved object attributes to the object broker computer and thence to the requesting user computer.

55. The method of claim 52, further comprising the steps of:

in response to a get all request at a requesting one of the user computers based on a particular object identifier that is related to one or more related object identifiers, communicating the particular object identifier to the object broker computer;

at the object broker computer, consulting an object index table that relates object identifiers of a first type to object identifiers of a second type to retrieve one or more related object identifiers associated with the particular object identifier;

at the object broker computer, consulting the mapping table based on retrieved related object identifiers to identify a one or more object attribute tables at one or more particular remote databases at one or more user computer sites containing data on the related object identifiers;

communicating a get message to the one or more remote databases including the related object identifiers;

at the one or more particular remote databases, consulting one or more object attribute table indexes to obtain retrieval information corresponding to the related object identifiers in the one or more object attribute tables;

retrieving object attributes associated with the related object identifiers from the one or more object attribute tables; and communicating retrieved object attributes to the object broker computer and thence to the requesting user computer.

56. The method of claim 52, further comprising the steps of:

in response to an update request at an updating one of the user computers based on a particular object identifier for which one or more object attributes are to be updated, communicating the particular object identifier to the object broker computer together with the one or more object attributes to be updated;

at the object broker computer, consulting the mapping table based the particular object identifier to identify an object attribute table at a particular remote database at a user computer site containing the most current data corresponding to the particular object identifier;

communicating a get message to the particular remote database including the particular object identifier;

at the particular remote database, consulting an object attribute table index to obtain retrieval information corresponding to the particular object identifier in the object attribute table;

retrieving object attributes associated with the particular object identifier from the object attribute table;

communicating retrieved object attributes to the object broker computer;

at the object broker computer, updating the retrieved object attributes with the one or more object attributes to be updated, to obtain updated object attributes associated with the particular object attribute;

communicating the updated object attributes to the updating user computer for storage in the associated remote database.

57. A method of operating a distributed data processing system including a plurality of independent remotely located user computers that process user data in user databases and at least one object broker computer, the user computers being interconnected with the object broker computer by data communication hardware over a data communication network, the user computers being operative to perform data operations of storing, updating, and retrieving user data items in response to user commands, comprising the steps of:

(a) for a subject at one of the user computers for which data is to be processed in the system, creating an object instance by assigning a unique object identifier to data items associated with the subject;

(b) storing the data items associated with the subject at the user computer in association with the object identifier;

(c) at the object broker computer, storing the locations of the user computers in a mapping table in association with object identifiers;

(d) in response to a query to the object broker computer for data relating to a particular subject in question, retrieving a selected object identifier for the subject in question;

(e) in response to retrieval of an object identifier for the subject in question in the preceding step, retrieving the location of a remote user computer associated with the selected object identifier;

(f) retrieving data stored at the remote user computer associated with the selected object identifier via the data communication network;

(g) maintaining an object index table at the object broker computer for relating at least one predetermined search term to at least one object identifier, wherein the object index table for relating at least one predetermined search term to at least one object identifier is a relational data base table; and (h) maintaining a junction index table relating object identifiers corresponding to a first class of objects to object identifiers corresponding to a second class of objects.

58. The method of claim 57, wherein each of the remotely located user computers comprises a heterogeneous data structure, and further comprising the steps of:

at the user computers, mapping predetermined data items stored in the user computers to corresponding object attributes associated with a predetermined instance of an object;

storing the object attributes in an object attribute table in the remote user computers in association with object identifiers.

59. The method of claim 57, wherein the mapping table stores information relating object identifiers, status information, and location information.

60. The method of claim 57, wherein the query to the object broker originates at a first user computer, and the data associated with the selected object identifier is stored at a second user computer, and further comprising the step of communicating data retrieved, associated with the selected object identifier, to the object broker and then to the first user computer via the data communication network.

61. The method of claim 57, wherein the data items associated with the subject stored at the user computer in association with the object identifier are stored in an object attribute table.

62. The method of claim 61, wherein the remotely located user computers include at least one customer database and at least one remote database associated therewith, and wherein the object attribute table is stored in the remote database.

63. The method of claim 57, wherein the step of assigning a unique object identifier to data items associated with a subject comprises the steps of:

providing a global object identification address space corresponding to a range of object identifiers for association with a plurality of subjects;

allocating a predetermined range of object identifiers within the global object identification address space to each remotely located user computer.

64. The method of claim 63, wherein the step of allocating a predetermined range of object identifiers is carried out at the object broker computer, and wherein a new object instance is created by assigning a unique object identifier from a predetermined range of object identifiers is carried out at the user computers.

65. The method of claim 57, wherein the user computers are located at a user computer site including at least one customer database and at least one remote database associated therewith, the at least one remote database storing an object attribute table for relating object attributes to object identifiers, and wherein the object broker computer stores an object index table for relating at least one predetermined search term to at least one object identifier.

66. The method of claim 65, further comprising the steps of:

in response to an add request at one of the user computers to add a subject to the system, providing selected data items associated with the subject to be added from the customer database to the remote database;

at the remote database, carrying out the step of creating new object instance by assigning a new object identifier to data items associated with the subject;

communicating information relating the new object identifier to at least one corresponding search term to the object broker computer;

at the object broker computer, updating the object index table to reflect the association of the new object identifier, the corresponding search term;

at the object broker computer, updating the mapping table to reflect the location of the user computer that added the new object instance identified by the new object identifier.

67. The method of claim 65, further comprising the steps of:

in response to a search request at a querying one of the user computers to determine whether an object exists corresponding to a selected search term, communicating the selected search term to the object broker computer;

at the object broker computer, consulting the object index table to determine whether there is an object identifier associated with the selected search term;

in response to a determination that there is an object identifier associated with the selected search term, retrieving the corresponding object identifier;

providing a message to the querying user computer via the data communication network including the corresponding object identifier.

68. The method of claim 65, further comprising the steps of:

in response to a get request at a requesting one of the user computers based on a particular object identifier, communicating the particular object identifier to the object broker computer;

at the object broker computer, consulting the mapping table based on the particular object identifier to identify a particular remote database at a particular user computer site;

communicating a get message to the particular remote database at the particular user computer site including the particular object identifier;

at the particular remote database, consulting an object attribute table index to obtain retrieval information corresponding to the particular object identifier in the particular object attribute table;

retrieving object attributes associated with the particular object identifier from the particular object attribute table; and communicating retrieved object attributes to the object broker computer and thence to the requesting user computer.

69. The method of claim 65, further comprising the steps of:

in response to a get all request at a requesting one of the user computers based on a particular object identifier that is related to one or more related object identifiers, communicating the particular object identifier to the object broker computer;

at the object broker computer, consulting an object index table that relates object identifiers of a first type to object identifiers of a second type to retrieve one or more related object identifiers associated with the particular object identifier;

at the object broker computer, consulting the mapping table based on retrieved related object identifiers to identify a one or more object attribute tables at one or more particular remote databases at one or more user computer sites containing data on the related object identifiers;

communicating a get message to the one or more remote databases including the related object identifiers;

at the one or more particular remote databases, consulting one or more object attribute table indexes to obtain retrieval information corresponding to the related object identifiers in the one or more object attribute tables;

retrieving object attributes associated with the related object identifiers from the one or more object attribute tables; and communicating retrieved object attributes to the object broker computer and thence to the requesting user computer.

70. The method of claim 65, further comprising the steps of:

in response to an update request at an updating one of the user computers based on a particular object identifier for which one or more object attributes are to be updated, communicating the particular object identifier to the object broker computer together with the one or more object attributes to be updated;

at the object broker computer, consulting the mapping table based the particular object identifier to identify an object attribute table at a particular remote database at a user computer site containing the most current data corresponding to the particular object identifier;

communicating a get message to the particular remote database including the particular object identifier;

at the particular remote database, consulting an object attribute table index to obtain retrieval information corresponding to the particular object identifier in the object attribute table;

retrieving object attributes associated with the particular object identifier from the object attribute table;

communicating retrieved object attributes to the object broker computer;

at the object broker computer, updating the retrieved object attributes with the one or more object attributes to be updated, to obtain updated object attributes associated with the particular object attribute;

communicating the updated object attributes to the updating user computer for storage in the associated remote database.

71. The method of claim 57, wherein each of the user computers are located at a user computer site including at least one customer database and at least one remote database associated therewith.

72. The method of claim 71, wherein at least one customer database is a heterogeneous database structure relative to at least one other computer system in the distributed system, and wherein the at least one remote database is homogeneous relative to the object broker computer.

73. The method of claim 71, wherein the at least one customer database runs on a different computer system than a computer system that runs the at least one remote database.

74. The method of claim 71, wherein the at least one customer database runs on the same computer system as the at least one remote database.

75. The method of claim 71, wherein the remote database associated with each user computer site is operative for performing the steps of creating a new object instance, storing data items in association with the object identifier, and retrieving data stored at the remote user computer associated with an object identifier provided by the object broker computer.

76. The method of claim 71, wherein the step of storing the data items associated with the subject at the user computer in association with the object identifier comprises the steps of:

importing data items from a customer database into an associated remote database as selected data attributes associated with a particular object identifier, and communicating the particular object identifier to the object broker computer.

77. The method of claim 76, wherein the step of communicating the particular object identifier to the object broker computer includes communicating predetermined search terms associated with the selected data attributes to the object broker computer.

78. The method of claim 77, further comprising the step of storing the predetermined search terms in an object attribute index stored at the object broker computer, the object attribute index relating object identifiers and search terms, and storing location information and status information indicative of the source and status of the object attributes and the object identifier in the mapping table.

79. The method of claim 76, wherein the step of importing data items from the customer database comprises the steps of:

importing a first set of data items from the customer database as object attributes associated with a first object identifier;

determining that the first object identifier is related to at least one additional second object identifier; and importing a second set of data items from the customer database as object attributes associated with the second object identifier.

80. The method of claim 79, further comprising the steps of:

storing object attributes associated with the first object identifier in a first object attribute table;

storing the first object identifier and the second object identifier in a junction table relating object identifiers to each other;

storing object attributes associated with the second object identifier in a second object attribute table;

in response to a determination that the storing of object attributes for the second object identifier calls for information corresponding to the first object identifier, storing the first object identifier in a corresponding field in the second object attribute table, whereby reference to the second object identifier causes referral to the first object identifier for selected object attributes.

81. The method of claim 71, wherein at least one user computer in the distributed data processing system includes a customer database of a first database structure, and at least one other user computer in the distributed data processing system includes a customer database of a second database structure different from the first database structure so that such database structures are heterogeneous.

82. The method of claim 81, wherein each remote database at each user computer site comprises a homogeneous data structure, and further comprising the step of importing selected data items from an associated customer database into the remote database.

83. The method of claim 82, wherein the step of importing selected data items from an associated customer database into the remote database comprises the step of mapping data items in a heterogeneous data structure on a customer database into predetermined object attributes stored in the associated remote database.

84. The method of claim 83, wherein the step of importing occurs in response to a put request message provided by a user at a user computer site.

85. The method of claim 83, wherein the step of importing comprises entering data items from the heterogeneous data structure into an object attribute table maintained at the associated remote database.

* * * * *